US010075937B2

(12) United States Patent
Zhang et al.

(10) Patent No.: US 10,075,937 B2
(45) Date of Patent: Sep. 11, 2018

(54) TARGET CELL SELECTION FOR MULTIMEDIA BROADCAST MULTICAST SERVICE CONTINUITY

(71) Applicant: QUALCOMM Incorporated, San Diego, CA (US)

(72) Inventors: Xiaoxia Zhang, San Diego, CA (US); Jun Wang, La Jolla, CA (US); Zhengwei Liu, San Diego, CA (US); Andrea Garavaglia, Bavaria (DE); Kuo-Chun Lee, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 14/838,209

(22) Filed: Aug. 27, 2015

(65) Prior Publication Data

US 2016/0007321 A1 Jan. 7, 2016

Related U.S. Application Data

(62) Division of application No. 13/421,819, filed on Mar. 15, 2012, now Pat. No. 9,173,192.

(Continued)

(51) Int. Cl.
*H04W 72/00* (2009.01)
*H04W 36/08* (2009.01)
(Continued)

(52) U.S. Cl.
CPC .......... *H04W 72/005* (2013.01); *H04L 12/18* (2013.01); *H04W 8/205* (2013.01); *H04W 36/08* (2013.01);
(Continued)

(58) Field of Classification Search
None
See application file for complete search history.

(56) References Cited

U.S. PATENT DOCUMENTS

| 2004/0085926 | A1 | 5/2004 | Hwang et al. |
| 2005/0041608 | A1 | 2/2005 | Jeong et al. |

(Continued)

FOREIGN PATENT DOCUMENTS

| CN | 1836387 A | 9/2006 |
| CN | 1910833 A | 2/2007 |

(Continued)

OTHER PUBLICATIONS

3GPP TS 25.346 V7.5.0., http://www.quintillion.co.jp/3GPP/Specs/25346-750.pdf, Sep. 2007, pp. 28-34, 39-43, 49, and 51.

(Continued)

*Primary Examiner* — Yaotang Wang
(74) *Attorney, Agent, or Firm* — Anthony R. Morris

(57) ABSTRACT

Transfer of Multimedia Broadcast/Multicast Services (MBMS) over a Single Frequency Network (MBSFN) service and idle mode unicast service for a mobile entity from a source base station to a target base station may be managed by a base station or mobile entity of a cellular wireless communications system (WCS). Operations related to the transfer may include obtaining an MBMS status of the mobile entity, and/or obtaining MBMS support information for the base station. A network entity may facilitate MBMS discovery by a mobile entity, by transmitting a data element to the mobile entity including service identifiers mapped to corresponding cell identifiers to indicate respective MBMS services to be broadcast in an WCS area on adjacent cells identified by respective ones of the cell identifiers. The
(Continued)

MBMS services may be broadcast within the WCS area using the adjacent cells previously indicated in the data element.

20 Claims, 39 Drawing Sheets

Related U.S. Application Data

(60) Provisional application No. 61/494,795, filed on Jun. 8, 2011, provisional application No. 61/453,893, filed on Mar. 17, 2011.

(51) Int. Cl.
| | |
|---|---|
| *H04W 8/20* | (2009.01) |
| *H04L 12/18* | (2006.01) |
| *H04W 60/00* | (2009.01) |
| *H04W 48/20* | (2009.01) |
| *H04W 48/12* | (2009.01) |
| *H04W 88/08* | (2009.01) |

(52) U.S. Cl.
CPC ............ *H04W 48/12* (2013.01); *H04W 48/20* (2013.01); *H04W 60/00* (2013.01); *H04W 88/08* (2013.01)

(56) References Cited

U.S. PATENT DOCUMENTS

| | | |
|---|---|---|
| 2006/0034225 A1 | 2/2006 | Jung et al. |
| 2006/0079242 A1 | 4/2006 | Vaittinen et al. |
| 2007/0055990 A1 | 3/2007 | Seppala et al. |
| 2007/0280257 A1 | 12/2007 | Vare et al. |
| 2008/0287129 A1 | 11/2008 | Somasundaram et al. |
| 2009/0196213 A1* | 8/2009 | Zhong ................ H04W 36/06 370/312 |
| 2010/0113030 A1* | 5/2010 | Kanazawa ........... H04J 11/0093 455/437 |
| 2010/0157969 A1 | 6/2010 | Swamy et al. |
| 2010/0159933 A1 | 6/2010 | Kim et al. |
| 2011/0058513 A1 | 3/2011 | Ai et al. |
| 2011/0077006 A1 | 3/2011 | Hsu |
| 2011/0149827 A1 | 6/2011 | Na et al. |
| 2011/0255460 A1 | 10/2011 | Lohmar et al. |
| 2011/0261743 A1 | 10/2011 | Futaki et al. |
| 2011/0305183 A1* | 12/2011 | Hsu ..................... H04W 72/005 370/312 |
| 2011/0305184 A1 | 12/2011 | Hsu |
| 2012/0026929 A1 | 2/2012 | Wang et al. |
| 2012/0170547 A1* | 7/2012 | Oprescu-Surcobe ................. H04W 36/0083 370/331 |
| 2012/0236776 A1 | 9/2012 | Zhang et al. |
| 2012/0281610 A1 | 11/2012 | Ai et al. |
| 2013/0294320 A1 | 11/2013 | Jactat et al. |
| 2015/0373533 A1 | 12/2015 | Zhang |
| 2015/0373638 A1 | 12/2015 | Zhang |

FOREIGN PATENT DOCUMENTS

| | | |
|---|---|---|
| CN | 101150773 A | 3/2008 |
| CN | 101222685 A | 7/2008 |
| CN | 101283532 A | 10/2008 |
| CN | 101529742 A | 9/2009 |
| CN | 102037703 A | 4/2011 |
| EP | 1509056 A2 | 2/2005 |
| EP | 1933584 A2 | 6/2008 |
| EP | 2131603 A1 | 12/2009 |
| EP | 2200366 A1 | 6/2010 |
| EP | 2302969 A1 | 3/2011 |
| KR | 20050015729 | 2/2005 |
| KR | 100487231 | 5/2005 |
| KR | 20080071909 | 8/2008 |
| KR | 20090053920 | 5/2009 |
| KR | 20100007941 | 1/2010 |
| KR | 20100071675 A | 6/2010 |
| WO | WO-2005020474 A1 | 3/2005 |
| WO | WO-2005067172 A1 | 7/2005 |
| WO | 2005101886 A2 | 10/2005 |
| WO | 2008137354 A1 | 11/2008 |
| WO | 2008153474 A1 | 12/2008 |
| WO | 2009053933 A1 | 4/2009 |
| WO | WO-2009140994 A1 | 11/2009 |
| WO | 2009148383 | 12/2009 |
| WO | 2011011956 A1 | 2/2011 |

OTHER PUBLICATIONS

European Search Report—EP14176291—Search Authority—Munich—dated Dec. 1, 2014.
International Search Report and Written Opinion—PCT/US2012/029540—ISA/EPO—dated Oct. 19, 2012.
Orange: "Text proposal for MBMS Service continuity when moving between SFN and non-SFN zones", 3GPP Draft; R3-070712 MBMS Service Continuity Text Proposal, 3rd Generation Partnership Project (3GPP), Mobile Competence Centre ; 650, Route Des Lucioles ; F-06921 Sophia-Antipolis Cedex; France, vol. RAN WG3, No. St. Julian, Malta; Apr. 2, 2007, Apr. 2, 2007 (Apr. 2, 2007), XP050161609, [retrieved on Apr. 2, 2007].
Partial International Search Report—PCT/US2012/029540—ISA/EPO—dated Jul. 4, 2012.

* cited by examiner

610
IDENTIFYING CANDIDATE TARGET BASE STATIONS BASED ON EACH HAVING PAGING SIGNAL STRENGTH AND SYSTEM INFORMATION SIGNAL STRENGTH SUFFICIENT TO SUPPORT CAMPING ON BY THE MOBILE ENTITY IN IDLE MODE

620
PRIORITIZING THE CANDIDATE TARGET BASE STATIONS IN A PRIORITY ORDER BASED IN PART ON AN MBMS STATUS OF THE MOBILE ENTITY AND ON MBMS SERVICES SUPPORT BY RESPECTIVE ONES OF THE CANDIDATE TARGET BASE STATIONS

630
IN RESPONSE TO DETERMINING THAT NONE OF THE CANDIDATE TARGET BASE STATIONS SUPPORTS THE MBSFN SERVICE FOR THE MOBILE ENTITY, SELECTING A TARGET BASE STATION THAT DOES NOT SUPPORT THE MBSFN SERVICE FOR THE MOBILE ENTITY

640
TRANSMITTING AN IDENTIFIER FOR THE TARGET BASE STATION FROM THE SOURCE BASE STATION, FOR USE IN TRANSFERRING THE MBSFN SERVICE AND UNICAST SERVICE TO THE TARGET BASE STATION

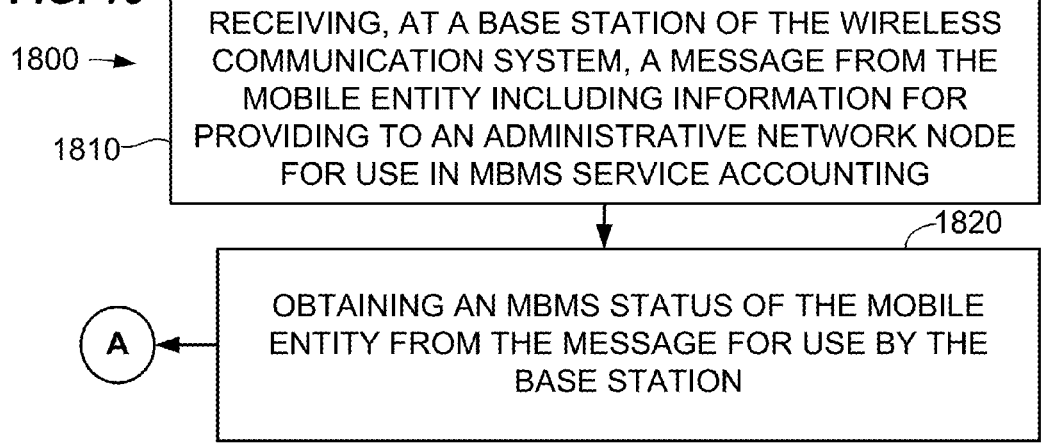
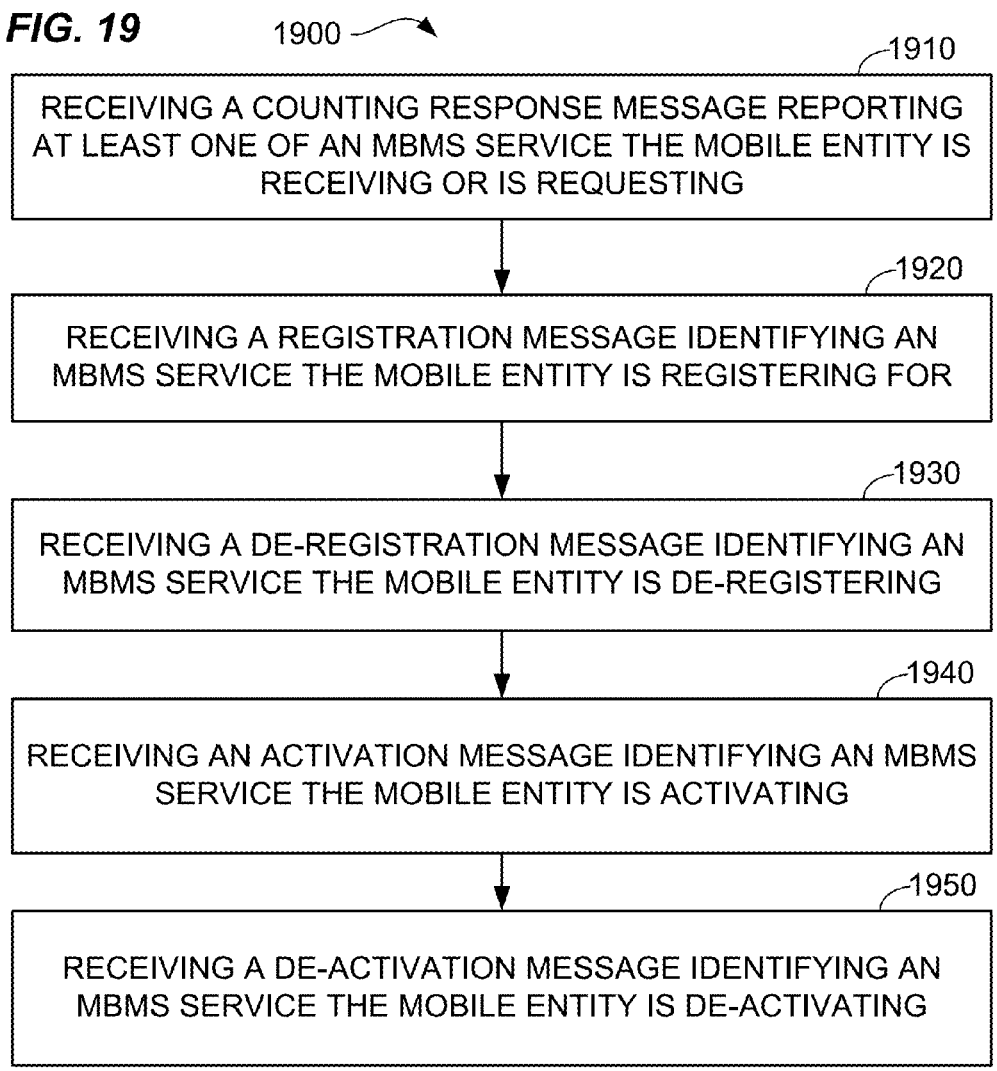

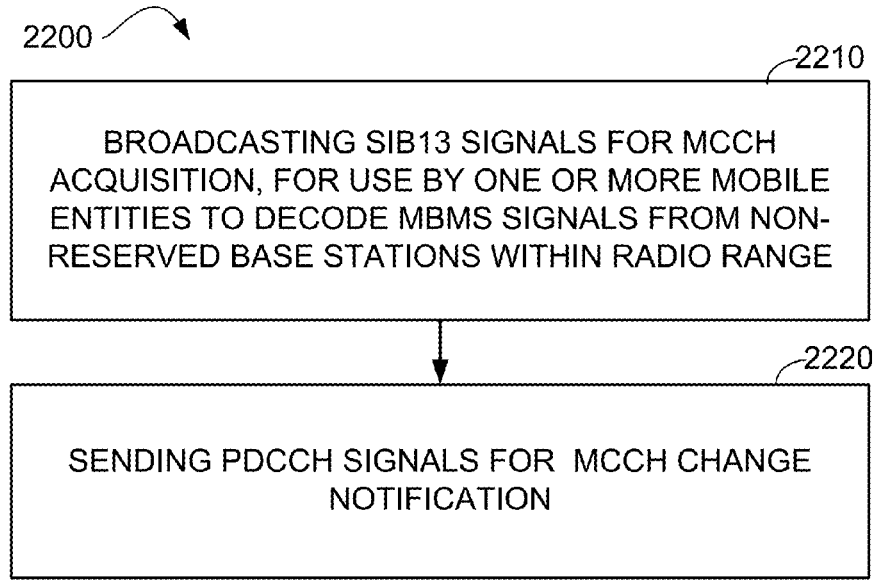
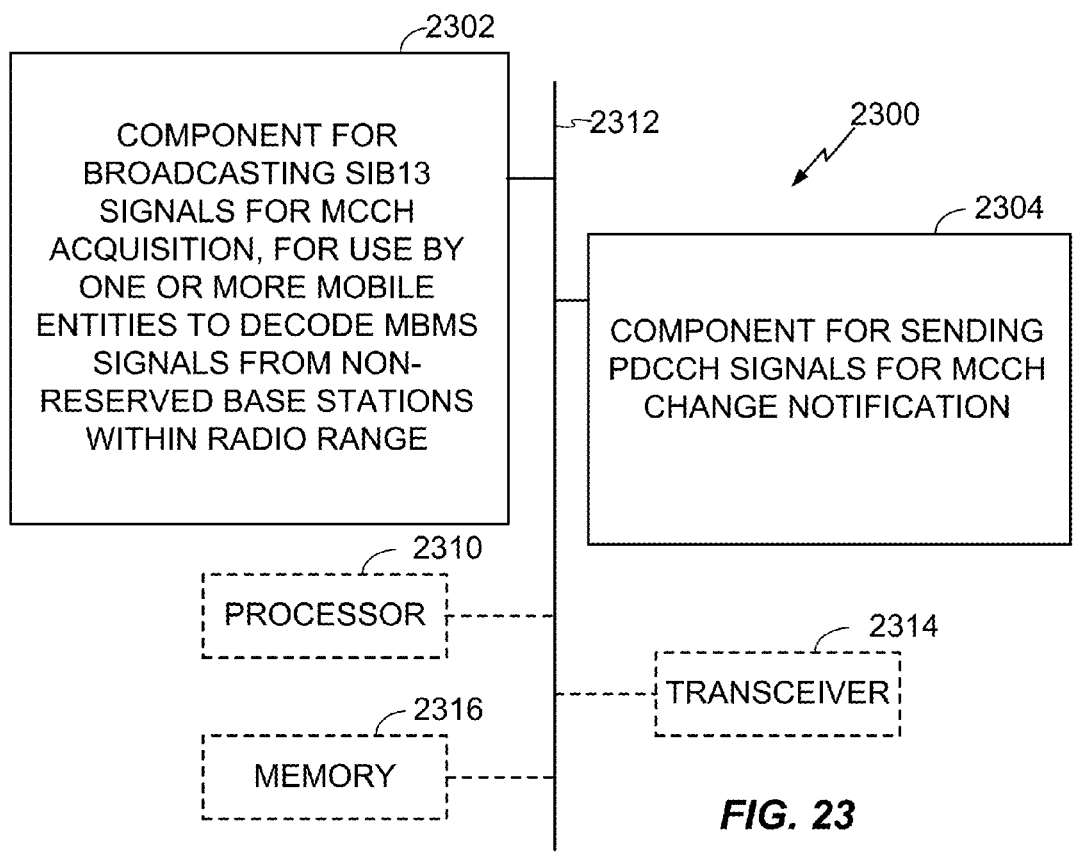

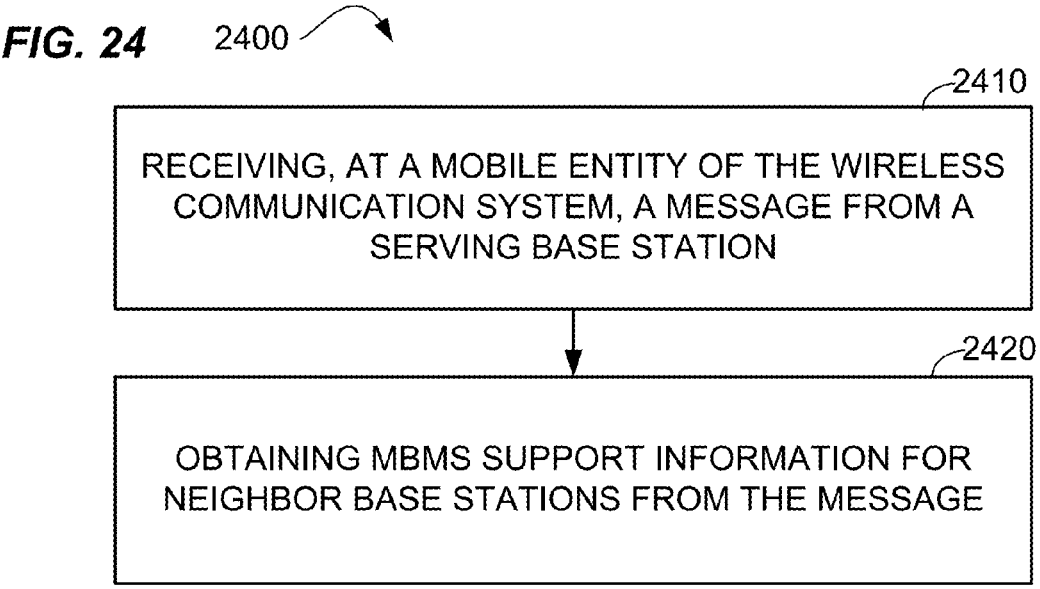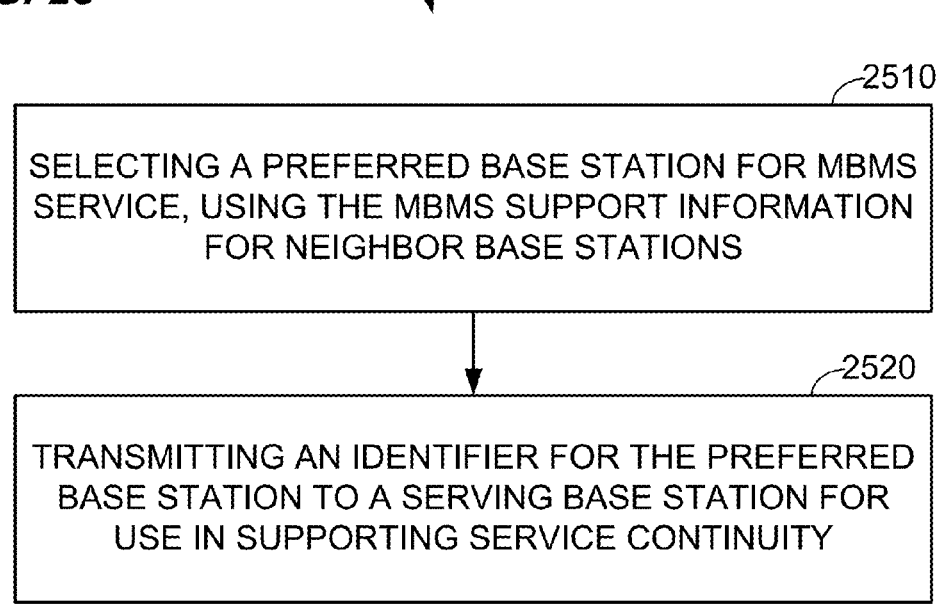

*FIG. 34A*     M2 Setup Request:    Direction: eNB → MCE

| IE/Group Name | Presence | Range | IE type and reference | Semantics description |
|---|---|---|---|---|
| Message Type | M | | 9.2.1.1 | |
| Global eNB ID | M | | 9.2.1.10 | |
| eNB Name | O | | Printable String (1..150,...) | |
| eNB MBMS Configuration data per cell | | 1 | | |
| >eNB MBMS Configuration data Item IEs | | 1 to <maxnoofCells> | | |
| >>eNB MBMS Configuration data Item | M | | 9.2.1.12 | |

| Range bound | Explanation |
|---|---|
| maxnoofCells | Maximum no. of cells that may be served by an eNB. The value for maxnoofCells is 256. |

Global eNB ID:

| IE/Group Name | Presence | Range | IE type and reference | Semantics description |
|---|---|---|---|---|
| PLMN Identity | M | | 9.2.3.7 | |
| CHOICE eNB ID | M | | | |
| >Macro eNB ID | | | BIT STRING (20) | Equal to the 20 leftmost bits of the Cell Identity IE contained in the E-UTRAN CGI IE (see section 9.2.1.11) of each cell served by the eNB |

*FIG. 34B*    MCCH related BCCH Configuration Item:

| IE/Group Name | Presence | Range | IE type and reference | Semantics description |
|---|---|---|---|---|
| E-UTRAN CGI | M | | 9.2.1.11 | |
| MBSFN Synchronisation Area Id | M | | INTEGER (0..65535) | The MBSFN Synchronisation Area |
| MBMS Service Area List | | 1 | | |
| >MBMS Service Area Item | | 1 to <maxnoofMBMSServiceAreasPerCell> | | |
| >>MBMS Service Area | M | | OCTET STRING | Value part coded per MBMS Service Area AVP. |

| Range bound | Explanation |
|---|---|
| maxnoofMBMSServiceAreasPerCell | Maximum no. of Service Areas per cell. The value for maxnoofMBMSServiceAreasPerCell is 256 |

*FIG. 34C*    E-UTRAN CGI:

| IE/Group Name | Presence | Range | IE type and reference | Semantics description |
|---|---|---|---|---|
| PLMN Identity | M | | 9.2.3.7 | |
| Cell Identity | M | | BIT STRING (28) | The 20 leftmost bits of the Cell Identity correspond to the eNB ID (Global eNB ID IE defined in section 9.2.1.10). |

FIG. 35A

M2 SETUP RESPONSE: Direction: MCE -> eNB

| IE/Group Name | Presence | Range | IE type and reference | Semantics description |
|---|---|---|---|---|
| Message Type | M | | 9.2.1.1 | |
| Global MCE ID | M | | 9.2.1.16 | |
| MCE Name | O | | Printable String (1..150,...) | |
| MCCH related BCCH Configuration data per MBSFN area | | 1 | | |
| >MCCH related BCCH Configuration data Item IEs | | 1 to <maxnoofMBSFNareas> | | |
| >> MCCH related BCCH Configuration Item | M | | 9.2.1.13 | |

Global MCE ID

| IE/Group Name | Presence | Range | IE type and reference | Semantics description |
|---|---|---|---|---|
| PLMN Identity | M | | .8 | |
| MCE ID | M | | OCTET STRING(SIZE(2)) | |

FIG. 35B

MCCH related BCCH Configuration Item

| IE/Group Name | Presence | Range | IE type and reference | Semantics description |
|---|---|---|---|---|
| MBSFN Area Id | M | | INTEGER (0..255) | The same encoding as the mbsfn-AreaId. |
| PDCCH Length | M | | ENUMERATED (s1, s2,...) | This IE is encoded along the number of OFDM symbols for PDCCH as of table 6.7-1. in [12]. |
| Repetition Period | M | | ENUMERATED (rf32, rf64, rf128, rf256) | The same encoding as the mcch-RepetitionPeriod in mcch-Config as specified in [11] |
| Offset | M | | INTEGER (0..10) | The same encoding as the mcch-Offset in mcch-Config as specified in [11] |
| Modification Period | M | | ENUMERATED (rf512, rf1024) | The same encoding as the mcch-ModificationPeriod in mcch-Config as specified in [11] |
| Subframe Allocation Info | M | | BIT STRING (SIZE(6)) | The same encoding as the sf-AllocInfo specified in [11] |
| Modulation and Coding Scheme | M | | ENUMERATED (n2, n7, n13, n19) | The same encoding as the signallingMCS specified in [11] |
| Cell Information List | | 0..1 | | |
| >Cell Information | | 1 to <maxnoofCells> | | |
| >>E-UTRAN CGI | M | | .11 | |
| >>Cell Reservation Info | M | | ENUMERATED (reservedCell, nonReservedCell, ...) | |

| Range bound | Explanation |
|---|---|
| maxnoofCells | Maximum no. of cells that may be served by an eNB. The value for maxnoofCells is 256. |

FIG. 36

MBMS Session Start Request: Direction: MCE-> eNB
Direction: MCE → eNB.

| IE/Group Name | Presence | Range | IE type and reference | Semantics description |
|---|---|---|---|---|
| Message Type | M | | 9.2.1.1 | |
| MCE MBMS M2AP ID | M | | INTEGER (0 .. $2^{24}$-1) | |
| TMGI | M | | 9.2.3.3 | |
| MBMS Session Identity | O | | OCTET STRING (SIZE (1)) | Coded same way as the MBMS Session Identity IE. |
| MBMS Service Area | M | | OCTET STRING | Value part coded per MBMS Service Area AVP. |
| TNL Information | | 1 | | |
| >IP Multicast Address | M | | OCTET STRING (4..16) | The Radio Network Layer is not supposed to interpret the address information. It should pass it to the transport layer for interpretation |
| >IP Source Address | M | | OCTET STRING (4..16) | The Radio Network Layer is not supposed to interpret the address information. It should pass it to the transport layer for interpretation |
| >GTP DL TEID | M | | GTP-TEID OCTET STRING (4) | |

The TMGI uniquely identifies the MBMS Bearer Service.

| IE/Group Name | Presence | Range | IE type and reference | Semantics description |
|---|---|---|---|---|
| TMGI | | | | |
| >PLMN identity | M | | 9.2.3.7 | |
| >Service ID | M | | OCTET STRING (SIZE (3)) | |

3702: TRANSMITTING A DATA ELEMENT CONFIGURED FOR A MOBILE ENTITY WITHIN A WCS AREA, THE DATA ELEMENT INCLUDING SERVICE IDENTIFIERS MAPPED TO CORRESPONDING CELL IDENTIFIERS TO INDICATE RESPECTIVE EMBMS SERVICES TO BE BROADCAST IN THE WCS AREA ON ADJACENT CELLS IDENTIFIED BY RESPECTIVE ONES OF THE CELL IDENTIFIERS

3704: BROADCASTING THE EMBMS SERVICES WITHIN THE WCS AREA USING THE ADJACENT CELLS PREVIOUSLY INDICATED IN THE DATA ELEMENT

3705

3706: PROVIDING A SERVICE AREA INDEX TO THE MOBILE ENTITY, INDICATING EMBMS SERVICE AREAS SUPPORTED BY AT LEAST ONE OF A CELL SERVING THE MOBILE ENTITY OR A NEIGHBOR CELL

3708: APPENDING THE INDEX IN SYSTEM INFORMATION BLOCK (SIB) 13

3710: PROVIDING A SECOND SERVICE AREA INDEX TO THE MOBILE ENTITY INDICATING MBMS SERVICE AREAS SUPPORTED BY AN ADJACENT CELL THAT IS NOT SERVING THE MOBILE ENTITY

FIG. 37B

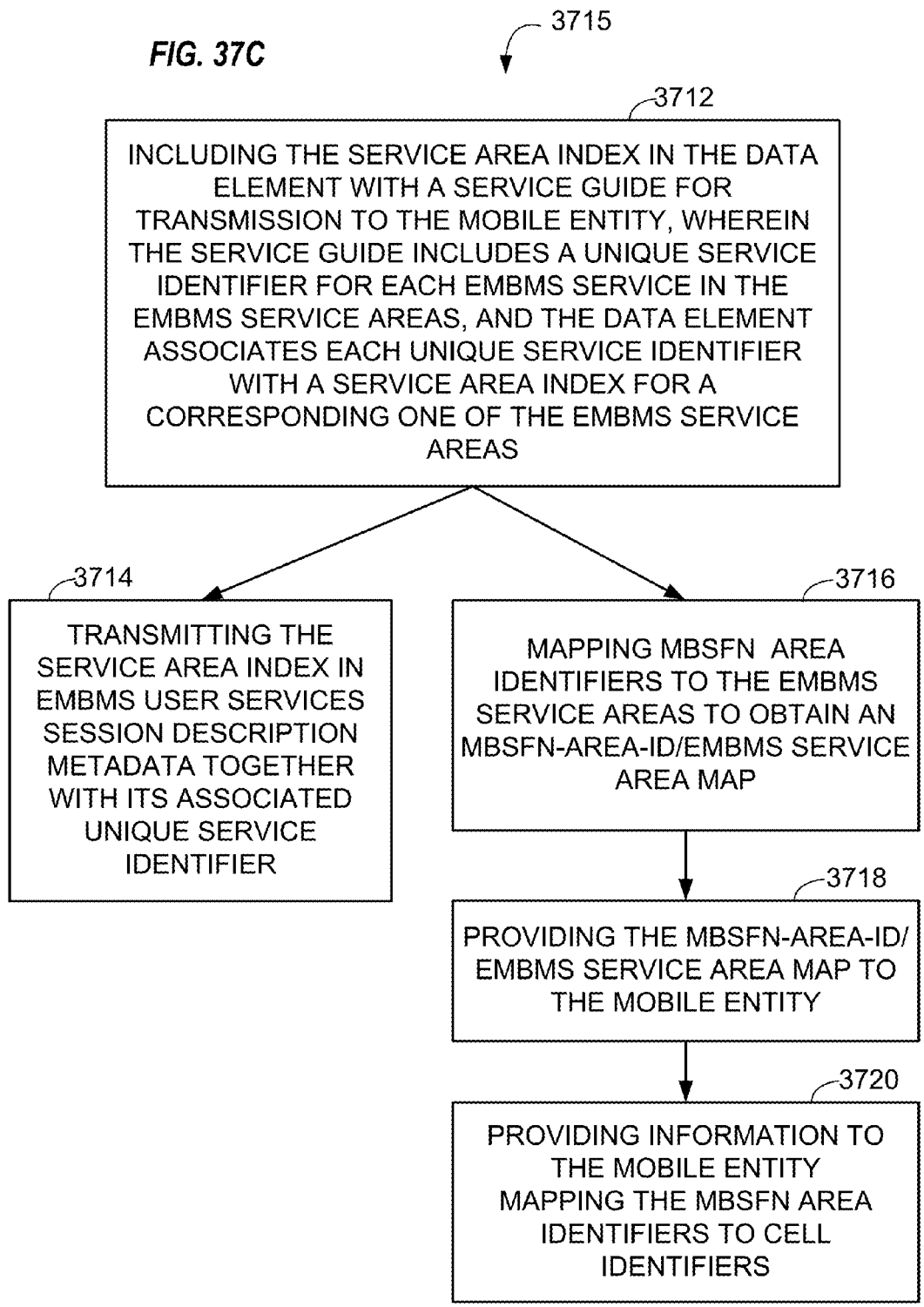

FIG. 37F 3745

3740
DETERMINING, INDEPENDENTLY OF MBSFN AREAS, SETS OF SERVICE IDENTIFIERS FOR THE EMBMS SERVICES TO BE BROADCAST IN THE WCS AREA, EACH SET INDICATING A GROUP OF EMBMS SERVICES TO BE TRANSMITTED ON A RESPECTIVE ONE OF THE ADJACENT CELLS

3742
PROVIDING THE SETS OF SERVICE IDENTIFIERS TO THE MOBILE ENTITY USING A SERVICE ANNOUNCEMENT PROCEDURE

3744
PROVIDING ONE OR MORE OF THE SETS OF SERVICE IDENTIFIERS FOR ONE OR MORE OF THE ADJACENT CELLS TO A BASE STATION SERVICING THE MOBILE ENTITY

3746
PROVIDING INFORMATION MAPPING EACH OF THE ONE OR MORE SETS OF SERVICE IDENTIFIERS TO ITS RESPECTIVE ONE OF THE ADJACENT CELLS FROM THE BASE STATION TO THE MOBILE ENTITY

3750 — ADVERTISING A COUNT OF ADJACENT CELLS THAT CARRY RESPECTIVE ONES OF THE EMBMS SERVICES

3752 — HASHING INFORMATION MAPPING AT LEAST ONE OF THE SERVICE IDENTIFIERS TO A CORRESPONDING ONE OF THE ADJACENT CELLS, USING A HASH FUNCTION OPERATING ON INPUT PARAMETERS INCLUDING THE COUNT OF ADJACENT CELLS TO PROVIDE THE DATA ELEMENT AS A HASHED OUTPUT

3754 — HASHING THE INFORMATION USING A SERVICE IDENTIFIER AS AN ADDITIONAL ONE OF THE INPUT PARAMETERS, TO PROVIDE THE HASHED OUTPUT FROM WHICH AT LEAST ONE OF THE ADJACENT CELLS USED FOR TRANSMITTING THE SERVICE IDENTIFIER CAN BE DETERMINED BY THE MOBILE ENTITY

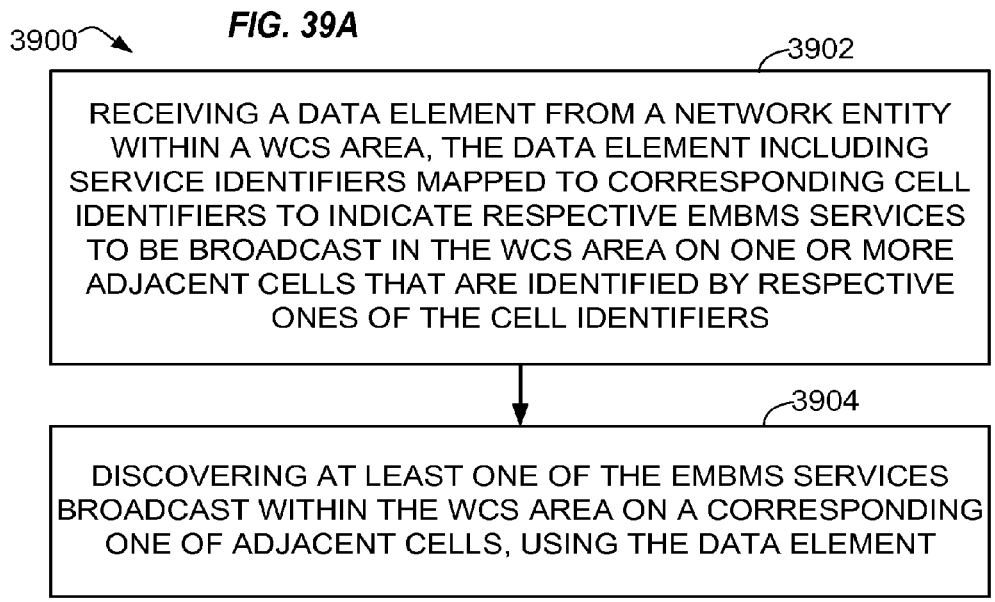
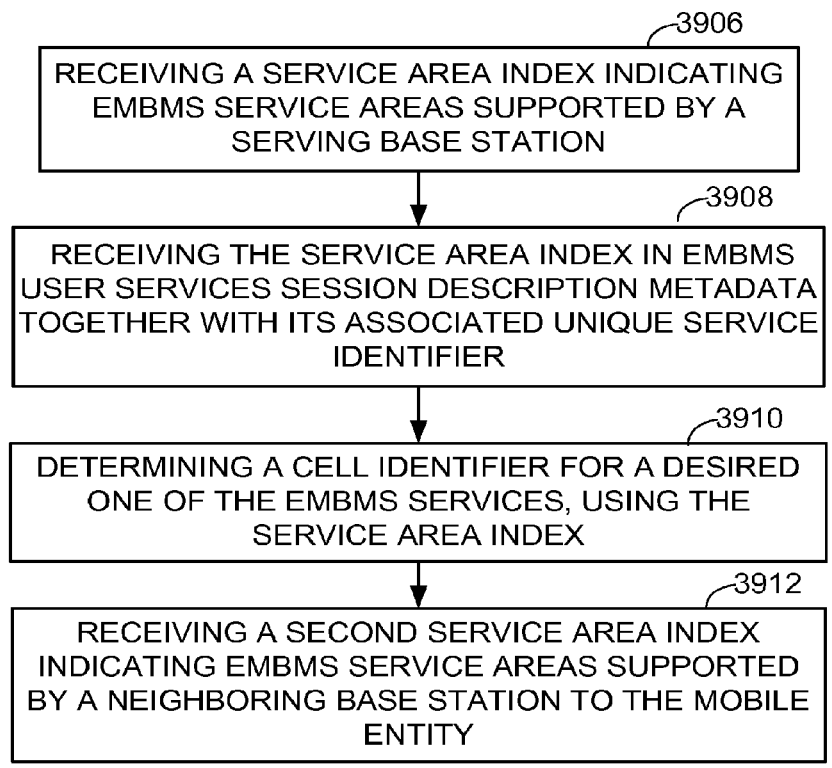

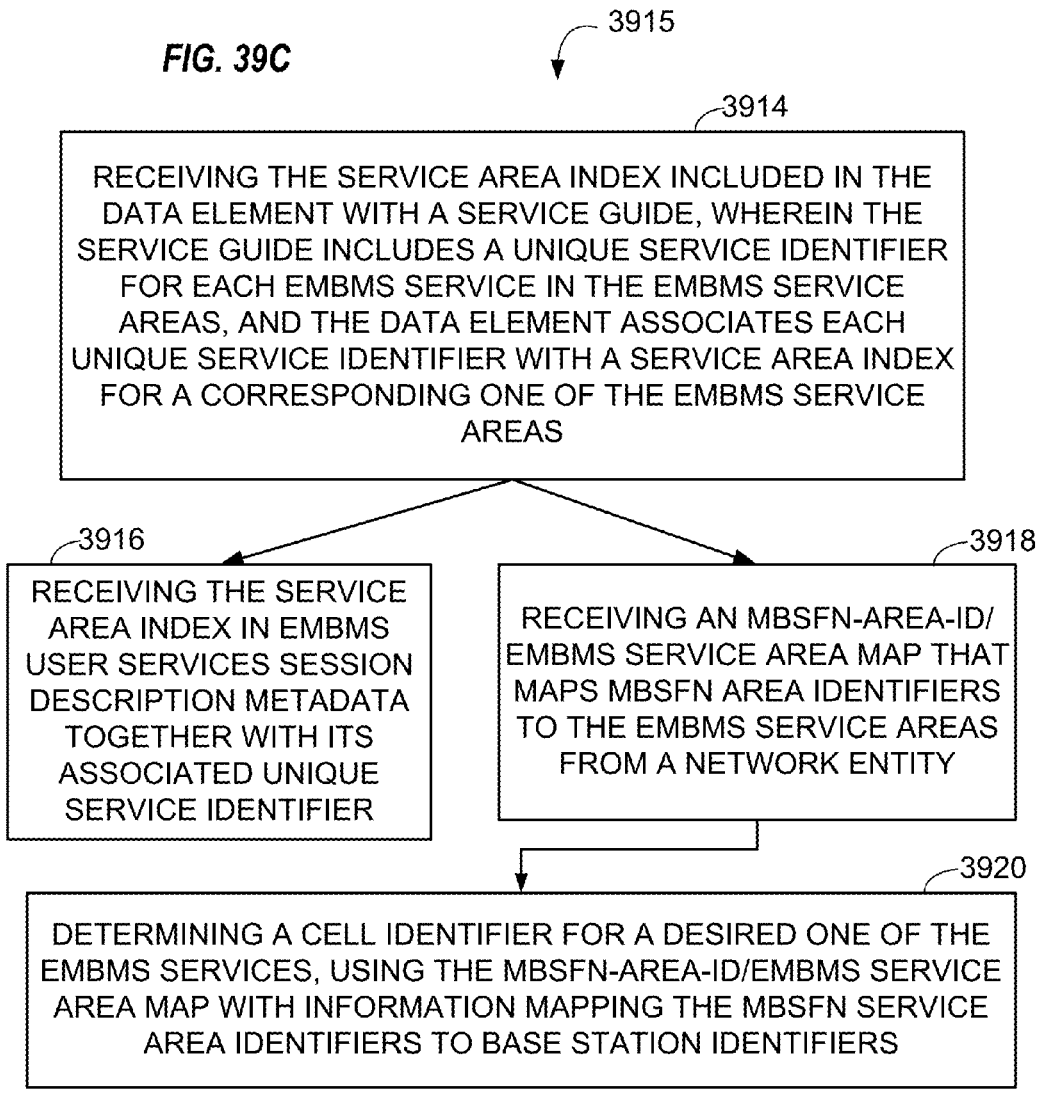

TARGET CELL SELECTION FOR MULTIMEDIA BROADCAST MULTICAST SERVICE CONTINUITY

CROSS-REFERENCE TO RELATED APPLICATION

This application is a divisional of and claims priority pursuant to 35 U.S.C. § 121 to U.S. application Ser. No. 13/421,819, entitled "TARGET CELL SELECTION FOR MULTIMEDIA BROADCAST MULTICAST SERVICE CONTINUITY", which was filed on Mar. 15, 2012, and now published as U.S. Pat. App. Pub. No. 2012/0236776, which claims priority pursuant to 35 U.S.C. § 119(e) to U.S. provisional application Ser. No. 61/453,893, filed Mar. 17, 2011, and to U.S. provisional application Ser. No. 61/494,795, filed Jun. 8, 2011, which applications are hereby incorporated by reference, in their entireties.

FIELD

Aspects of the present disclosure relate generally to wireless communication systems, and more particularly, to providing Multimedia Broadcast Multicast (MBMS) service continuity for mobile entities.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs), also referred to as mobile entities. A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

SUMMARY

Methods, apparatus and systems for target cell selection and MBMS service continuity in a wireless communication system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for managing transfer of MBMS over a Single Frequency Network (MBSFN) and idle mode unicast service for a mobile entity from a source base station to a target base station of a cellular wireless communications system may include identifying a plurality of candidate target base stations based on each having paging signal strength and system information signal strength sufficient to support camping on by the mobile entity in idle mode. The method may further include prioritizing the candidate target base stations in a priority order based in part on an MBMS status of the mobile entity and on MBMS services support by respective ones of the candidate target base stations. The method may further include transmitting an identifier for the target base station from the source base station, for use in transferring the MBSFN service and unicast service to the target base station.

In an aspect, the method may include in response to determining that none of the candidate target base stations supports the MBSFN service for the mobile entity, selecting a target base station that does not support the MBSFN service for the mobile entity. In such case, the method may further include transmitting buffered MBMS content from the source base station to the target base station for unicast transmission to the mobile entity. Likewise, the method may further include stopping transmission of the buffered MBMS content to the target base station in response to a signal indicating the target base station is receiving the MBMS content from another source.

In other aspects, a method for handling transfer of MBSFN service and unicast service by a mobile entity from a source base station to a target base station of a cellular wireless communications system may include receiving a signal from the source base station designating a target base station, completing a handover to the target base station, and receiving MBMS content from the target base station in a unicast transmission for an initial period. The method may further include receiving MBMS content in one of multicast or unicast transmissions from the source base station, prior to completing the handover. In an aspect wherein the target base station supports the MBSFN service for the mobile entity, the method may include acquiring Multicast Control Channel (MCCH) signals from the target base station for decoding MBMS content on MBSFN subframes. In such case, the method may include receiving MBMS content from the target base station in multicast transmissions, and decoding the MBMS content using information from the acquired MCCH signals.

In other aspects, a method for obtaining an MBMS status of a mobile entity in a cellular wireless communications system may include receiving, at a base station of the wireless communication system, a message from the mobile entity including information for providing to an administrative network node for use in MBMS service accounting, and obtaining an MBMS status of the mobile entity from the message for use by the base station. Receiving the message may further include receiving a counting response message reporting at least one of an MBMS service the mobile entity is receiving or is requesting. In an alternative aspect, receiving the message may include receiving at least one of a registration message identifying an MBMS service the mobile entity is registering for, a de-registration message identifying an MBMS service the mobile entity is de-registering, an activation message identifying an MBMS service the mobile entity is activating, or a de-activation message identifying an MBMS service the mobile entity is de-activating. The method may further include reading the message at the base station to obtain the MBMS status.

In other aspects, a method for obtaining MBMS support information for a base station in a cellular wireless communications system may include receiving, at a mobile entity of the wireless communication system, a message from a serving base station, obtaining an MBMS Service Area Identifier (SAI) for neighbor base stations from the message, and selecting a preferred base station for MBMS service, using the SAI for neighbor base stations. The method may further include transmitting an identifier for the preferred base station to a serving base station for use in supporting service continuity. The method may further include receiving the message on a Broadcast Control Channel (BCCH). The method may further include determining, for the neighbor base stations, at least one of an MBMS service support indicator, MBSFN synchronization area identifier, MBSFN service identifier, and a MBSFN area identifier from the BCCH message.

In other aspects, a method for facilitating MBMS discovery in a wireless communications system (WCS), may include transmitting a data element configured for a mobile entity within a WCS area, the data element including service identifiers mapped to corresponding cell identifiers to indicate respective MBMS services to be broadcast in the WCS area on adjacent cells identified by respective ones of the cell identifiers, and broadcasting the MBMS services within the WCS area using the adjacent cells previously indicated in the data element. The method may further include providing a service area index to the mobile entity, indicating MBMS service areas supported by a cell serving the mobile entity. Providing the service area index may include, for example, appending the index in a System Information Block (SIB). For further example, preparing the service area index may include sorting the list of recognized service areas by a corresponding identifier to obtain a sorted list, removing duplicate identifiers from the sorted list, numbering the sorted list using a sequence of index numbers, and storing the sequence of index numbers for use in a service area index for the recognized service areas.

The method may include providing the service area index in the data element with a service guide for transmission to the mobile entity, wherein the service guide includes a unique service identifier for each MBMS service in the MBMS service areas, and the data element associates each unique service identifier with a service area index for a corresponding one of the MBMS service areas. The method may include generating information defining the data element including a service area index of recognized service areas, using a network entity managing broadcasting within the WCS area. The method may include determining, independently of MBMS Single Frequency Network (MBSFN) service areas, sets of service identifiers for the MBMS services to be broadcast in the WCS area, each set indicating a group of MBMS services to be transmitted on a respective one of the adjacent cells. The method may include advertising a count of adjacent cells that carry respective ones of the MBMS services. In such case, the method may include hashing information mapping at least one of the service identifiers to a corresponding one of the adjacent cells, using a hash function operating on input parameters including the count of adjacent cells to provide the data element as a hashed output.

In an other aspect, a method for discovering MBMS in a WCS may include receiving a data element from a network entity within a WCS area, the data element including service identifiers mapped to corresponding cell identifiers to indicate respective MBMS services to be broadcast in the WCS area on one or more adjacent cells that are identified by respective ones of the cell identifiers, and discovering at least one of the MBMS services broadcast within the WCS area on a corresponding one of adjacent cells, using the data element. The method may include receiving a service area index indicating MBMS service areas supported by a serving base station. The method may further include receiving a second service area index indicating MBMS service areas supported by a neighboring base station. Receiving the service area index may include receiving the data element with a service guide, wherein the service guide includes a unique service identifier for each MBMS service in the MBMS service areas, and the data element associates each unique service identifier with a service area index for a corresponding one of the MBMS service areas.

In related aspects, the method may include receiving an MBSFN Area ID/MBMS service area map that maps MBMS Single Frequency Network (MBSFN) area identifiers to the MBMS service areas from a network entity, and determining a cell identifier for a desired one of the MBMS services, using the MBSFN Area ID/MBMS service area map with information mapping the MBSFN area identifiers to base station identifiers received from a base station. The method may include acquiring a program start time for a desired MBMS service, using a service guide, and scanning ones of the adjacent cells to detect the MBMS service, starting at a time determined in relation to the program start time.

Receiving the data element may include receiving at least one of sets of service identifiers for the MBMS services to be broadcast in the WCS area from a network entity, each set indicating a group of MBMS services to be transmitted on a respective one of the adjacent cells. In an alternative, or in addition, receiving the data element may include receiving information mapping each of one or more sets of service identifiers to a respective one of the adjacent cells from a base station. In such case, the method may include determining a adjacent cell for the at least one of the MBMS services, using the at least one of the sets of service identifiers and the information mapping each of one or more sets of service identifiers to a respective one of the adjacent cells.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium holding encoded instructions, which when executed by a processor, cause a wireless communications apparatus to perform the methods and aspects of the methods as summarized above.

BRIEF DESCRIPTION OF THE DRAWINGS

FIGS. 6-10 illustrate embodiments of a methodology for managing transfer of MBMS over a Single Frequency Network (MBSFN) services, using a source base station of a wireless communications system.

FIGS. 18-20 illustrate embodiments of a methodology for obtaining an MBMS status of a mobile entity.

FIG. 22 illustrates an embodiment of a methodology for operating a reserved base station in an MBMS area.

FIG. 23 illustrates an embodiment of an apparatus for operating a reserved base station, in accordance with the methodology of FIG. 22.

FIGS. 24-26 illustrate embodiments of a methodology for obtaining MBMS support information for a base station.

FIGS. 34A-C are protocol tables illustrating examples of M2 interface setup messages.

FIGS. 35A-B are protocol tables illustrating a further example of an M2 interface setup message and an example of a session start request message.

FIG. 36 is a protocol table illustrating an example of an M2 session start response message.

FIGS. 37A-G illustrate embodiments of a methodology for providing information facilitating discovery of broadcast services, by a network entity providing broadcast control services.

FIGS. 39A-G illustrate embodiments of a methodology for discovery of broadcast services by a mobile entity.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
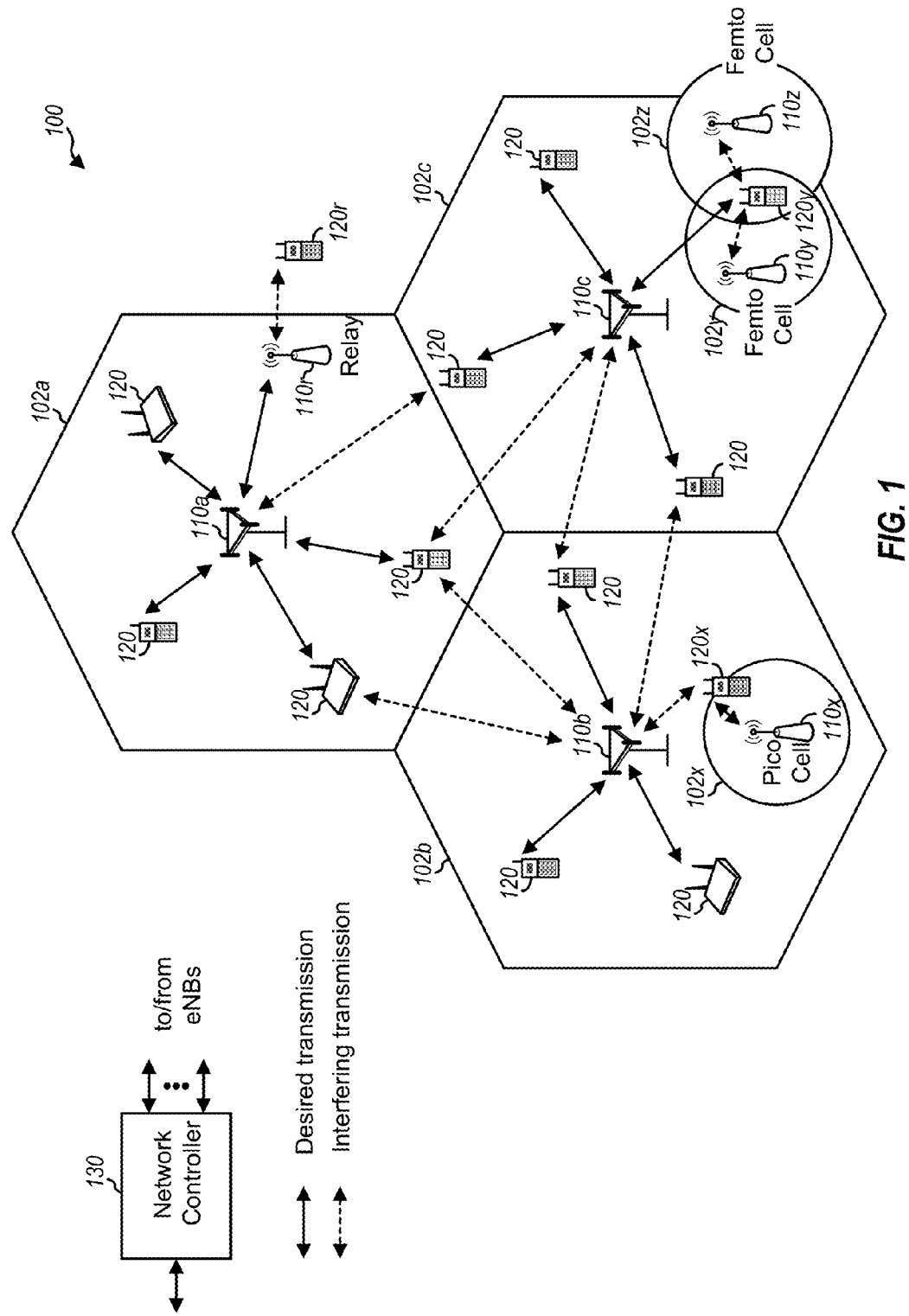
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a corresponding particular geographic area 102a, 102b, 102c. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, for example, macro eNBs, pico eNBs, femto eNBs, or relays. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul connection. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile entity, a mobile station, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones or bins. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
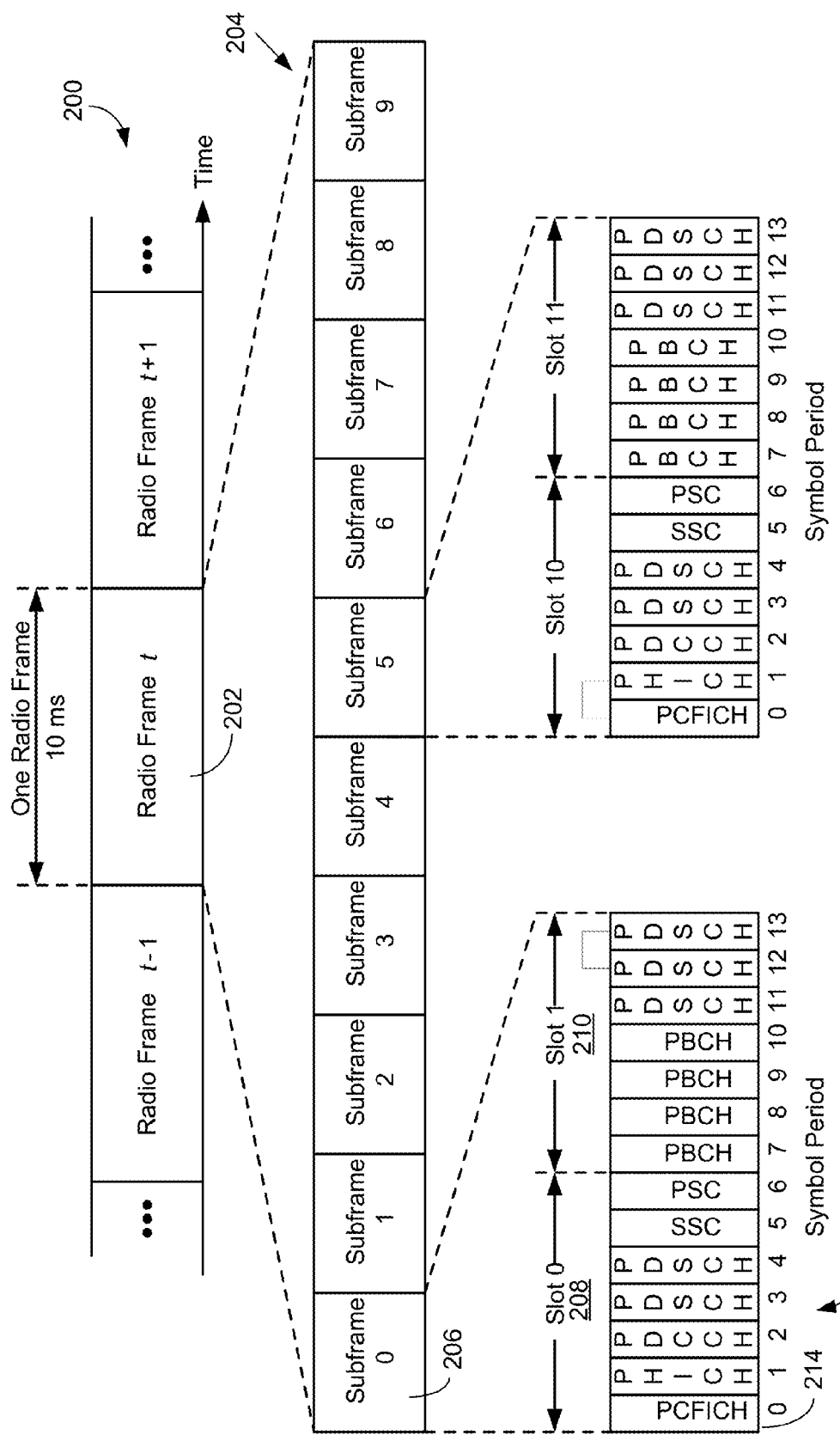
FIG. 2 is a block diagram conceptually illustrating an example of a down link frame structure in a telecommunications system.

FIG. 2 shows a down link frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
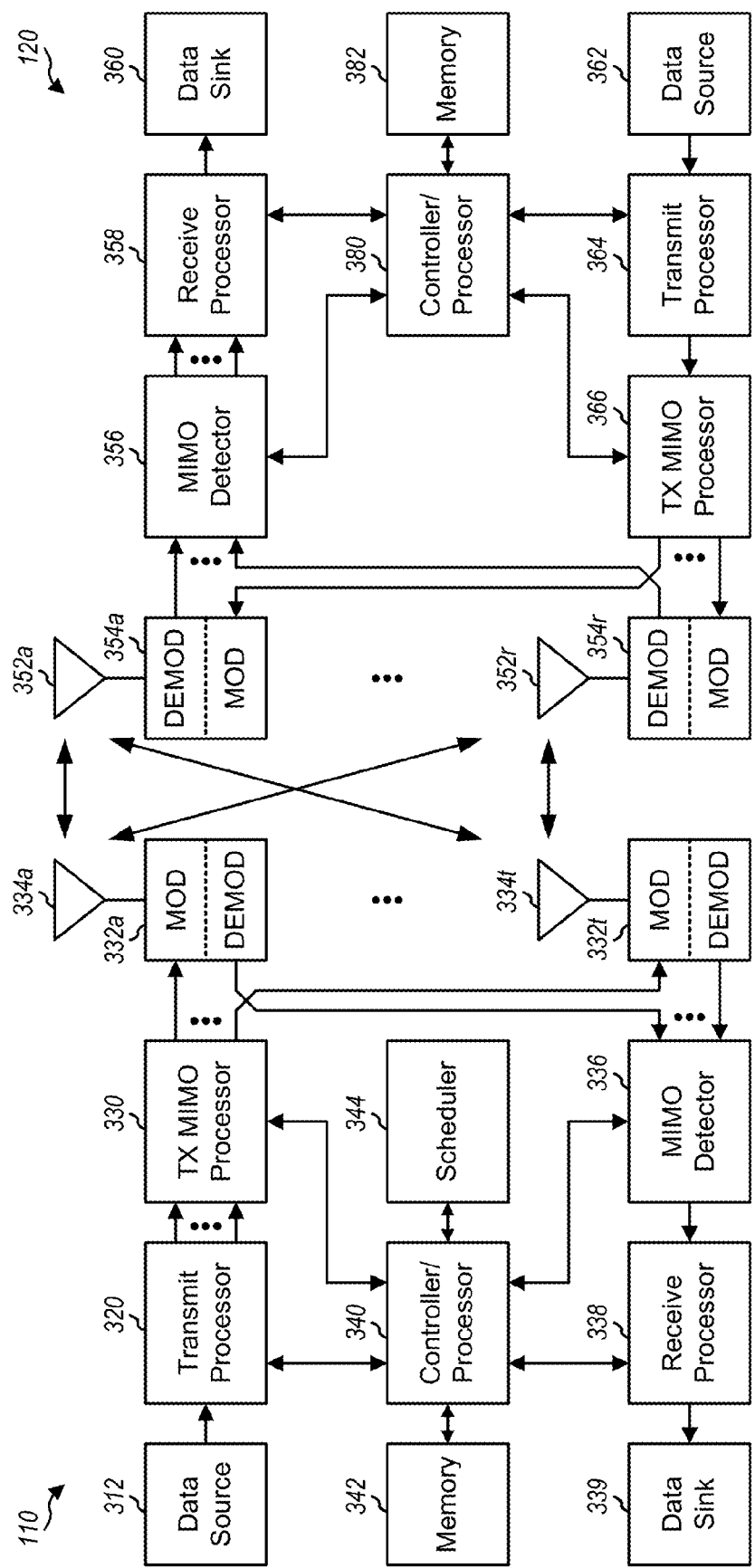
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For example, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. In addition, the processor 340 and/or other processors and modules at the eNB 110 may also perform or direct the execution of the functional blocks illustrated in FIG. 11, 13, 14A-C, 16, or 17, and/or other processes for the techniques described herein. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in the flow diagrams of the figures herein, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information intended for more than one UE in a synchronized manner, so that signals reinforce one another rather than interfere with each other. In the context of eMBMS, multicast content is transmitted from multiple eNB's of a LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit multicast content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
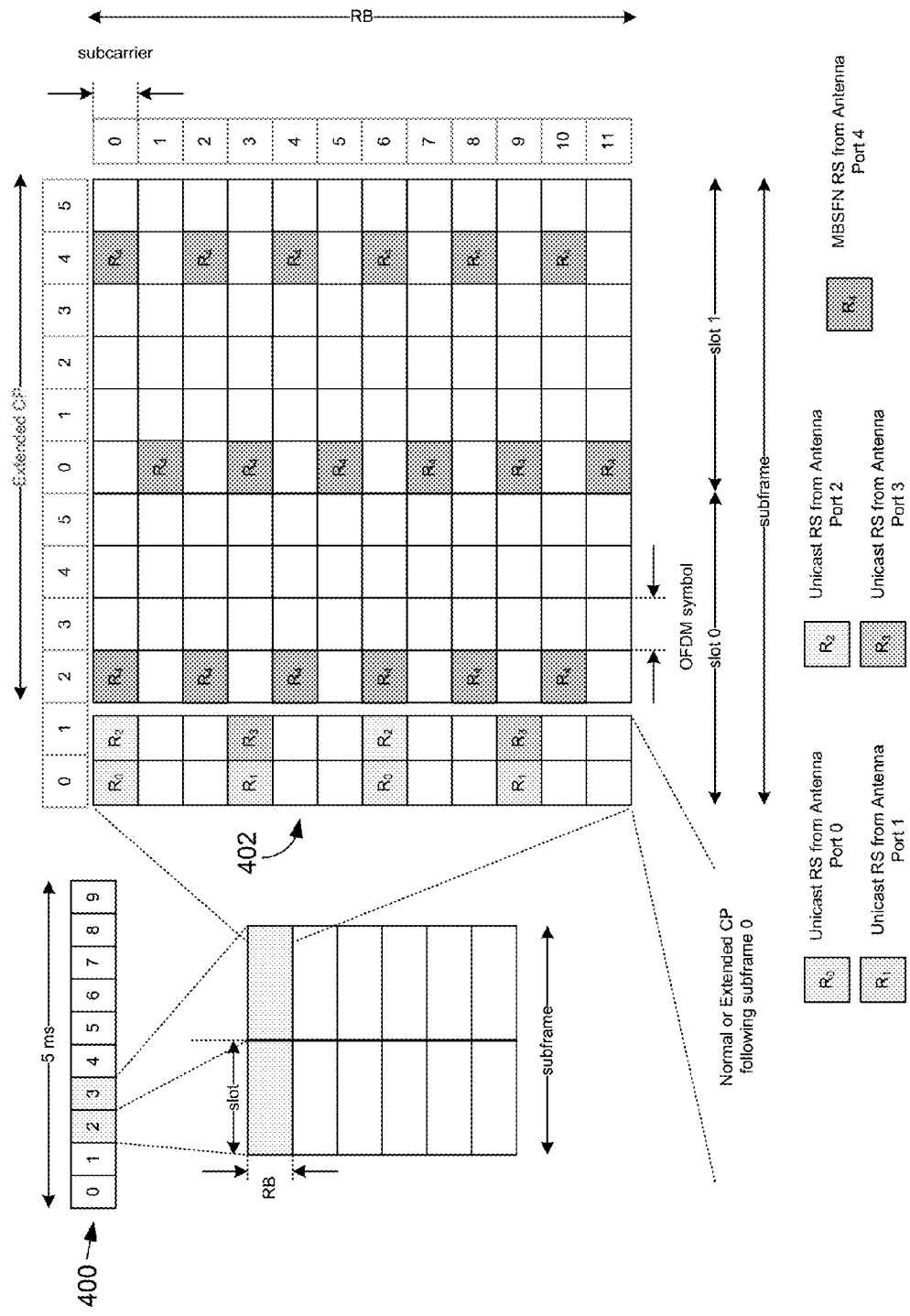
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 400 labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 402, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs.

eMBMS Service Continuity

Movement of a mobile entity from a source cell to a target cell may give rise to eMBMS service continuity problems, whether or not the eMBMS service of interest is available in the target cell. These issues are independent of unicast service continuity handling, and may be resolved in coordination with handling of unicast service continuity according to known techniques. However, current unicast mobility procedures do not support MBMS service continuity, and therefore MBMS service can be interrupted or discontinued when a mobile entity moves from one cell into another. As specified in 3GPP Technical Specification (TS) 36.300, mobile entities that are receiving MBMS service while in an RRC_IDLE state performing cell reselection, or are in an RRC_CONECTED state, obtain target cell MBMS Traffic Channel (MTCH) information from the target cell MCCH. The presence of an MBMS service does not affect unicast mobility for the mobile entity, except to the extent that the frequency layer carrying the MBMS transmission may be set to a high priority to help service continuity for mobile entities in the RRC_IDLE state.

Certain eMBMS service continuity problems require novel approaches for resolution as described in more detail below. One approach calls for introducing a bit into mobile entity capability indication to indicate whether or not the mobile entity supports MBMS service. The source eNB then hands off RRC connected-state mobile entities to a target cell providing MBMS service, when possible. Another approach calls for the mobile entity to indicate whether or not it is currently receiving MBMS service to the source eNB, which hands off the mobile entity to a target eNB providing the MBMS service, if possible. Both of these approaches provide greater support for MBMS service continuity than presently available, but provide limited applicability and functionality. Going beyond these basic solutions, the present disclosure introduces enhanced unicast and multicast mobility procedures to support eMBMS service continuity in a variety of different circumstances. In addition, multicast-to-unicast procedures are used to extend MBMS service continuity into cells outside of current MBSFN areas.

As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas." As used herein, an MBSFN area refers to a group of cells currently broadcasting a particular program in a synchronized fashion (i.e., transmitting the same signal at synchronized times) using an MBSFN protocol. An "MBSFN synchronization area" refers to a group of cells that are interconnected in a way such that they are capable of operating in a synchronized fashion to broadcast a particular program using an MBSFN protocol. Each eNB can belong to only one MBSFN synchronization area, on a given frequency layer. It is worth noting that an MBMS service area may include one or more MBSFN synchronization areas. Conversely, an MBSFN synchronization area may include one or more MBSFN areas or MBMS service areas. Generally, an MBSFN area is made up of all, or a portion of, a single MBSFN synchronization area and a single MBMS service area. Overlap between various MBSFN areas is supported, and a single eNB may belong to several different MBSFN areas. For example, up to 8 independent MCCHs may be configured in System Information Block (SIB) 13.

Figure 5:
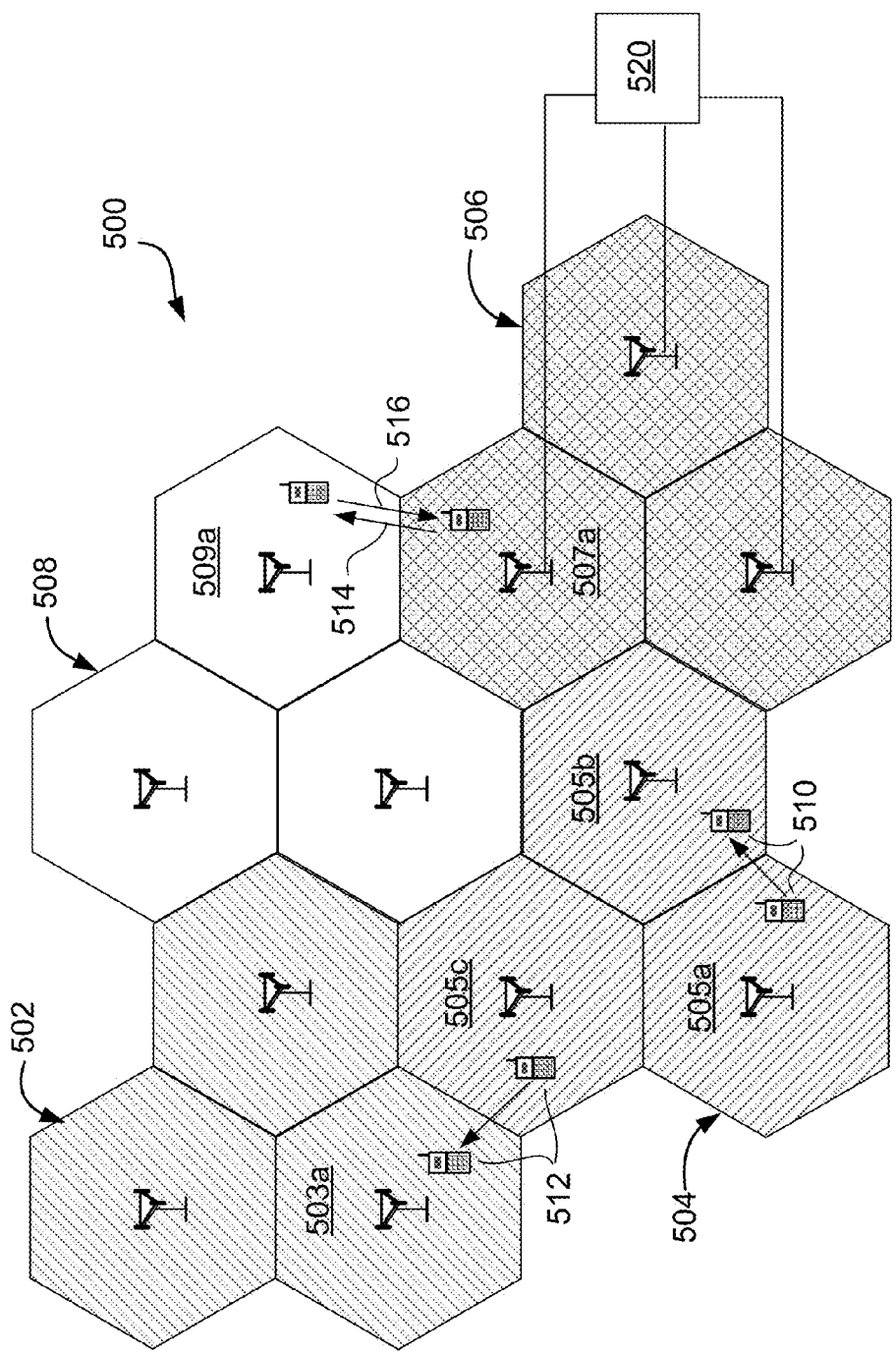
FIG. 5 is a schematic diagram illustrating various service continuity scenarios for multicast services.

Complexity in the underlying MBMS architecture may give rise to numerous different mobility scenarios, which are described in connection with FIG. 5, illustrating a wireless communications network 500 including multiple cells and groups of cells 502, 504, 506 and 508. The groups of cells 502, 504 and 506 are indicated by different cross-hatching patterns, and represent different MBSFN areas. Group 508 represents an area in which MBMS service is not being provided. The different groups 502, 504, 506 and 508 may themselves belong to various MBMS service areas and MBSFN synchronization areas. For example, and not by way of limitation, groups 502 and 504 may belong to a first MBSFN synchronization area, while groups 506 and 508 belong to a second MBSFN synchronization area. For further example, groups 502, 504, and 506 may belong to a common MBMS service area, while group 508 is outside of the MBMS service area.

A first Group 'A' of mobility scenarios is represented by movement of a mobile entity 510 from a source cell 505a to a target cell 505b within the same MBSFN area 504. Scenarios within Group A may be distinguished on the basis of whether or not the target cell 505b is a reserved cell; and if not, whether it has an immediate neighbor that is a reserved cell. In the MBMS context, a reserved cell is a cell that does not broadcast MBSFN signals, to avoid interference with nearby cells that are not in the same MBSFN area. Reserved cells are generally located at or near the boundary of an MBSFN area. At least three mobility scenarios exist within Group A:

A1: The target cell is not a reserved cell, and has no immediate neighbor that is a reserved cell.
A2: The target cell is not a reserved cell, and has an immediate neighbor that is a reserved cell.
A3: The target cell is a reserved cell.

Current procedures only support MBMS service continuity under Scenarios A1 and A2. Under Scenario A3, the mobile entity 510 loses MBMS service once handed over to the reserved target cell, regardless of whether or not the mobile entity can actually receive the MBMS signal at its current location. This is because, according to current procedures, a reserved cell does not transmit SIB 13 or the PDCCH for MCCH acquisition or change notification. Therefore, the mobile entity cannot acquire the MBMS parameter required to decode the MCCH and/or MTCH, even if it is able to receive these channels.

A second Group 'B' of mobility scenarios is represented by movement of a mobile entity 512 from a source cell 505c to a target cell 503a in a different MBSFN area 502. Scenarios within Group B may be distinguished on the basis of whether or not the different MBSFN 502 is in the same MBMS service area; and if it is in the same MBMS service area, whether or not it is in the same MBSFN synchronization area. At least three mobility scenarios exist within Group B:

B1: The target cell is in the same MBMS service area as the source cell, AND in the same MBSFN synchronization area.
B2: The target cell is in the same MBMS service area as the source cell, and NOT in the same MBSFN synchronization area.
B3: The target cell is NOT in the same MBMS service area as the source cell.

A third mobility Scenario 'C' is represented by movement of a mobile entity 514 from a source cell 507a to a target cell 509a in an area that does not provide MBMS service. Conversely, a forth mobility Scenario 'D' is represented by movement of a mobile entity 516 from a source cell 509a in an area that does not provide MBMS service to a target cell 507a in an area that provides MBMS service. All scenarios in Group B, and Scenario C, may involve a multicast-to-unicast procedure and/or an inter-frequency or inter-Radio Access Technology (RAT) mobility procedure. Scenarios in Group A may sometimes involve a multicast-to-unicast procedure, not related to movement of the mobile entity but resulting from a network-side decision to turn on/off MBSFN transmission of a particular service. Multicast-to-unicast procedures are already specified in the Internet Protocol (IP layer) of 3GPP Release 10, and may entail an interruption period.

The eNBs for some or all cells of the system 500 may be connected to a core network 520, including various components, the details of which are generally beyond the scope of the present disclosure. For illustrative simplicity, the core network components 520 are shown connected to the eNBs of MBSFN area 506 only, but it should be appreciated that the core components 520 may be connected to all eNBs of system 500. The core components 520 may include, or may be connected to, network components related to MBMS services, for example a Broadcast-Multicast Service Center (BM-SC) or a Multicast Coordinating Entity (MCE).

Solutions for RRC-Connected Entities

Backward handover is used for mobile entities in an RRC_CONNECTED state, in which the eNB selects the target cell, with or without mobile assistance. In this situation, the eNB may obtain knowledge of MBMS status of the mobile entity in various ways, none of which require changing existing protocols to add an MBMS status bit to communications from the mobile entity. One possibility is for the eNB of the source cell to obtain MBMS status by parsing a counting response message from the mobile entity. Normally, the eNB passes counting response information to the MCE, for example by compiling information from counting result responses from mobile entities, and forwarding the compiled information to the MCE. It may continue to do so; however, in addition, it processes information in the counting response message to determine a current MBMS status. In a counting response message, the mobile entity reports information about one or more MBMS services it is currently receiving, or is interesting in receiving. This information may be used by the MCE for administrative purposes, and by the eNB for supporting enhanced service continuity. Similarly, the eNB may process MBMS subscription or registration information that it would otherwise merely pass on to the MCE, BM-SC, or other system node for uses unrelated to service continuity, to use in supporting MBMS service continuity. This information may be updated whenever the mobile entity registers or de-registers an MBMS service. In the alternative, or in addition, the eNB may process MBMS service activation information that it would otherwise merely pass on to the MCE or BM-SC or other system node for uses unrelated to service continuity. In addition to passing this information on, the eNB may process the service activation information to obtain the MBMS status of the mobile entity for use in supporting service continuity. The MBMS activation information may be updated whenever the mobile entity activates or deactivates an MBMS service.

Based on the mobile entity's MBMS status, in a handover context the eNB can prioritize candidate target cells based on their MBMS capabilities and status, in addition to conventional metrics used in unicast handovers, for example, measurement reports or open/close closed subscriber group (CSG) cells. Therefore, the eNB enables providing the best possible MBMS service continuity permitted by applicable unicast mobility requirements.

The mobile entity may provide input to a selection process carried out by the eNB. From the Broadcast Control Channel (BCCH), the mobile entity obtains information about MBMS service support of cells in its neighbor list. For example, the neighbor list as currently configured in SIB 3 indicates the MBSFN subframe configuration of neighbor cells. The subframe configuration can be used as a rough indication of MBMS service support by neighbor cells. In addition, more detailed information may be added to the BCCH. For example, an indicator of MBMS service support, MBSFN synchronization area identifier, MBSFN area identifier, or other MBMS information may be added to the BCCH for each cell in the mobile entity's neighbor list. Such information may be added in SIB 3, SIB 13, or other system information blocks. Using available MBMS information about neighbor cells, the mobile entity may prioritize (rank) neighbor cells based on MBMS parameters, and indicate one or more top-ranking neighbor cells to the eNB. The eNB may then select the target cell using a ranking process that weights the preferences indicated by the mobile entity appropriately.

The eNB may use available MBMS information about prospective cells to prioritize (rank) prospective target cells in order of MBMS capability. This ranking may be performed after first excluding (or later rejecting) candidate target cells that are not capable of providing an adequate level of unicast service continuity for the mobile entity. Exactly what constitutes an adequate level of unicast service continuity may vary, and is beyond the scope of the present disclosure. It should be apparent, however, that a candidate target cell that provides poor unicast service continuity may not make a suitable target cell choice regardless of its MBMS service capabilities, in circumstances where the end user is interested in maintaining continuous unicast service. In other circumstances, for example, where the user is not interested in maintaining unicast service, the quality of unicast service may be more lightly weighted or even disregarded in the selection priority. That said, the source eNB may prioritize candidate target cells for MBMS service continuity, according to a scheme as follows, proceeding in priority order from the highest to lowest as shown:

1. A cell satisfying Scenario A1 (same MBSFN area, not a reserved cell, and no reserved neighbors)
2. A cell satisfying Scenario A2 (same MBSFN area, not a reserved cell, with one or more reserved neighbors)

If the eNB cannot determine whether or not a candidate cell has a reserved neighbor cell, Scenarios A1 and A2 may be collapsed into a single scenario. To enable the eNB to determine whether or not a candidate cell has a reserved neighbor, a flag may be placed in a SIB indicating this information. Resuming the priority order:

3. A cell satisfying Scenario A3 (same MBSFN area, reserved cell).

To support MBMS service in a reserved cell, the reserved cell may transmit SIB 13 and PDCCH for MCCH acquisition or change notification, although it does not transmit MBSFN signals (e.g., MCCH or MTCH). The mobile entity decodes the Physical Multicast Channel (PMCH) using the MCCH information from the reserved eNB.

4. A cell satisfying Scenario B1 (different MBSFN area, same MBMS service area and same MBSFN synchronization area.)

Under Scenario B1, the mobile entity continues to decode the PMCH using the previous MTCH/MCCH configuration until a new configuration is received from the target cell. Then, the mobile entity switches to the new MTCH/MCCH configuration of the target cell. The mobile entity's Media Resource Broker (MRB) should be re-established or re-configured for the new MTCH/MCCH configuration.

5. A cell satisfying Scenario B2 (different MBSFN area, same MBMS service area and different MBSFN synchronization area.)

Under Scenario B2, MBMS service continuity can be maintained, provided that the MBMS content can be buffered in advance to resolve the MBMS delivery timing differences between different MBSFN synchronization areas, thereby enabling continuity across the different synchronization areas.

6. A cell satisfying Scenario B3 (different MBSFN area, and different MBMS service area).

In scenario B3, assuming the MBMS data is not available by multicast in the target cell, it may be made available by unicast transmission instead. For example, the source cell may deliver buffered MBMS contents to the target cell until the target cell is able to obtain continuing MBMS content from a network source. The target cell initiates scheduling of the MBMS content to the mobile entity in unicast mode, and continues the service in unicast mode. In the alternative, if there is no support for a multicast-to-unicast handover procedure, the source cell migrates the mobile entity to receive the MBMS content in unicast mode, and initiates scheduling of the MBMS content by unicast. The unicast service is handed over to the target cell, which continues service in unicast mode. If the MBMS data happens to be available in the new MBMS service area, the handover may be handled similarly to Scenario B2.

7. A cell satisfying Scenario C (non-MBSFN area).

Service continuity to a non-MBSFN area may be handled in the same way as Scenario B3 described above. The converse of Scenario C is Scenario D, continuity out of a non-MBSFN area. Under Scenario D, the mobile entity is receiving MBMS content by unicast mode, and is handed over to a cell in which it can receive the content via multicast/broadcast service. Scenario D does not appear in the priority list provided above, pertaining instead to the converse of a handover from a MBSFN area. However, a source cell in a non-MBSFN area may apply a priority order similar to 1-7 above in selecting a target cell for a mobile entity that is receiving MBMS content via unicast. In Scenario D, assuming the target cell is a non-reserved cell of an MBSFN area for the service being received by the mobile entity, the mobile entity is handed over to the target cell using a unicast mobility procedure. The mobile entity starts to acquire SIB 13 and PDCCH from the target cell to acquire MCCH and decode MTCH. The target cell stops unicast MBMS service to the mobile entity once the service is broadcast using MBSFN. The exact timing for stopping unicast MBMS service depends on the timing of MBMS service on MBSFN subframes.

Further disclosure regarding solutions for RRC_CONNECTED state mobile entities is provided under the heading "Example Methodologies" below, which examples should be understood in light of the foregoing disclosure. Before discussing the example methodologies, MBMS solutions for RRC_IDLE state mobile entities are disclosed under the heading below.

Solutions for RRC-Idle Entities

The source eNB does not control selection of target cells for mobile entities in RRC_IDLE state. Instead, the idle mobile entity controls target selection. The same continuity scenarios as discussed above for connected entities apply in the mobile context. Service is interrupted for the idle mobile entity in case of Scenarios A3, B3 or C. Similarly to the eNB, the mobile entity may also prioritize target cells based on MBMS criteria in addition to conventional service metrics. A suitable priority order may be, for example, Scenario A1, A2, B1, B2, ordered from high to low.

Determining the MBMS status of neighboring cells may be useful. One approach may be to read the SIB 13 information for each of the neighboring base stations within radio range. However, acquisition of SIB 13 may take significant time and overhead, and may not be a practical solution. Another approach may be to include an MBSFN area identifier in a SIB 1 for base stations. The mobile entity could then read SIB 1 for each of the neighbor cells to determine whether each cell belongs to the same MBSFN area as the source cell, and assign higher priority to such cells. However, reading of SIB 1 for neighbor cells may also be impractical for reasons of time and overhead. Other approaches may include adding the MBSFN area identifier to a PBCH reserved field, but this may entail significant UE complexity.

In the alternative, neighbor list information in SIB 3 indicates the MBSFN subframe configuration of neighbor cells. Therefore the mobile entity may read the SIB 3 information of the source cell to obtain a rough indication of MBMS support by cells in the neighbor list. This approach eliminates the need to reach candidate cells' BCCH information. To refine information available from the serving cell, more detailed information can be transmitted in the BCCH of the source cell. Such information may include, for example, MBMS service support identifier, MBSFN synchronization area identifier, MBSFN service area identifier, MBSFN area identifier, reserved cell indicator, reserved cell neighbor indicator, or other MBSFN parameter of interest. Such information may be added in SIB 3, SIB 13, or other SIBs of the source cell. If sufficient information is available, the mobile entity may prioritize target cells for MBSM continuity similarly to the way the eNB does for connected mobile entities, except that handover of MBMS service to unicast delivery is not available in idle mode. The priority order therefore becomes (from high to low): Scenario A1, A2, A3, B1 and then B2. Service is interrupted in scenarios where multicast delivery is not available in any suitable candidate target cell, for example, B3 or C.

Example Methodologies and Apparatus

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/operations, it is to be understood and appreciated that the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

FIG. 6 shows a method 600 for managing transfer of MBSFN service and unicast service for a mobile entity from a source base station to a target base station of a cellular wireless communications system. As used herein, a "transfer" includes a forward handoff, which is UE-initiated, a reverse handoff, which is base station-initiated, without being limited to only to forward or reverse handoffs. Also, as used herein, a "base station" means an eNB, a Node B, a Home Node B, or similar network component of a wireless communications system. The method 600 may include the base station, at 610, identifying a plurality of candidate target base stations based on each having paging signal strength and system information signal strength sufficient to support camping on by the mobile entity in idle mode. The mobile entity may be in idle mode. The base station may receive one or more measurement reports from the mobile entity to enable it to determine whether or not a candidate station has sufficient paging signal strength and system information signal strength to support camping on by the mobile entity.

The method 600 may include the base station, at 620, prioritizing the candidate target base stations in a priority order based in part on an MBMS status of the mobile entity and on MBMS services support by respective ones of the candidate target base stations. Specific examples of priority orders have been provided in the disclosure above, and may be implemented using any suitable programming method. Optionally, the method 600 may further include the base station, at 630, selecting a target base station that does not support the MBSFN service for the mobile entity, in response to determining that none of the candidate target base stations supports the MBSFN service for the mobile entity. The method 600 may further include the base station, at 640, transmitting an identifier for the target base station from the source base station, for use in transferring the MBSFN service and unicast service to the target base station. The transmission may be performed wirelessly in accordance with one or more protocols described herein.

Figure 7:
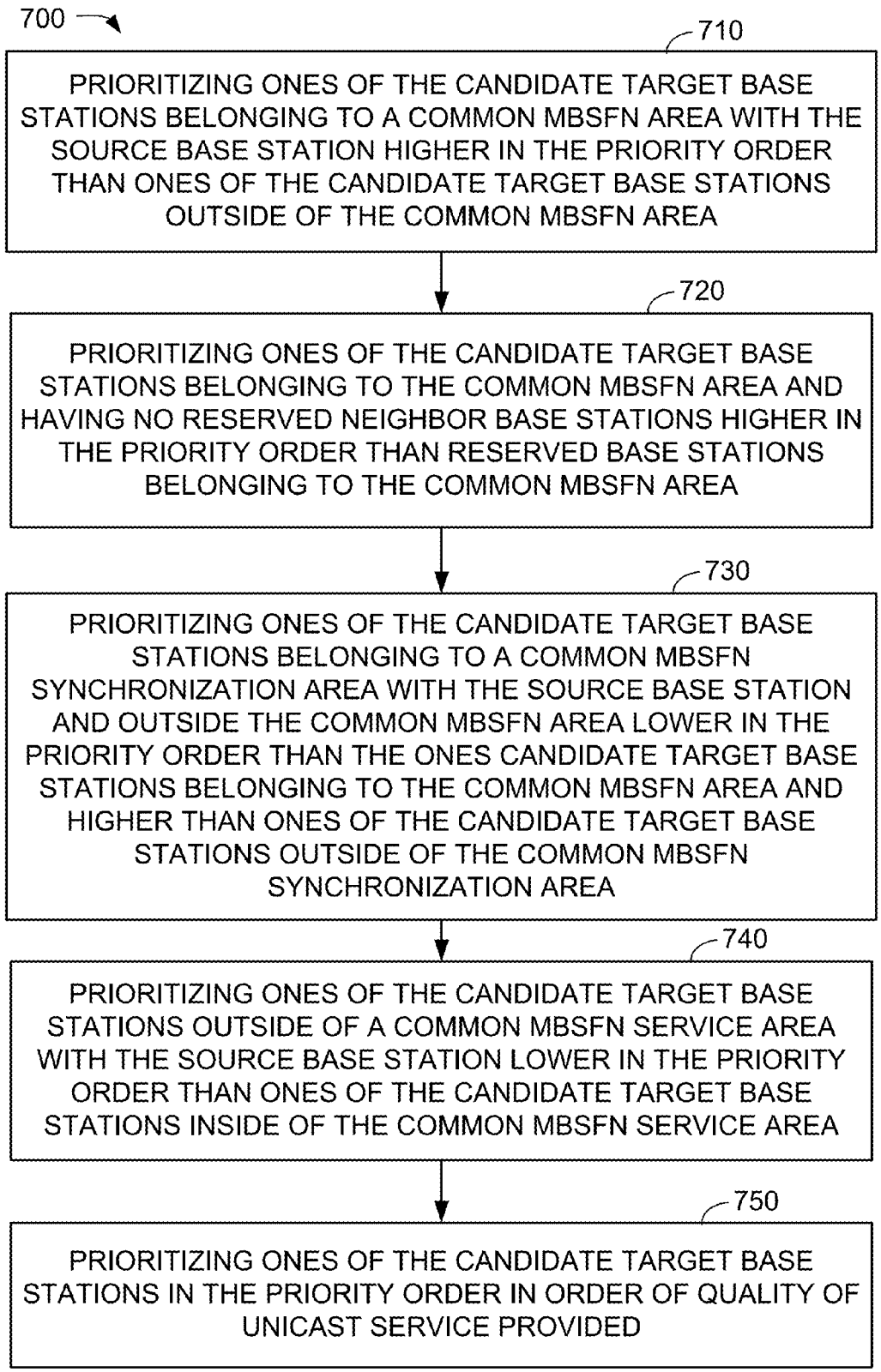

FIG. 7 shows further optional elements 700 that may be implemented for use by the base station in selecting, for example as at 610 shown in FIG. 6, the target base station. The optional elements 700 may arise from programming the base station to operate according to one or more of the priority orders for selection of a target base station, as disclosed above. All of the elements 700 may be combined to provide an overall selection priority order, or one or more elements may be omitted as appropriate for operating conditions. The elements 700 may be performed in any operative order, or may be encompassed by a selection algorithm without requiring a particular chronological order of performance. Operations are independently performed and not mutually exclusive. Therefore any one of such operations may be performed regardless of whether another downstream or upstream operation is performed. For example, if the method 600 includes at least one operation of FIG. 7, then the method 600 may terminate after the at least one operation, without necessarily having to include any subsequent downstream operation(s) that may be illustrated.

The additional elements 700 may include, at 710, the source base station prioritizing ones of the candidate target base stations belonging to a common MBSFN area with the source base station higher in the priority order than ones of the candidate target base stations outside of the common MBSFN area. With respect to all of the additional elements 700, prioritizing a candidate base station higher in the priority order means that the candidate base station will be selected as the target base station instead of the candidate ranked lower in the priority order; unless the higher-ranked candidate is ruled out for some reason, such as for being temporarily out of service or being unable to provide an acceptable quality of service.

The additional elements 700 may further include, at 720, the source base station prioritizing ones of the candidate target base stations belonging to the common MBSFN area and having no reserved neighbor base stations higher in the priority order than reserved base stations belonging to the common MBSFN area. The additional elements 700 may further include, at 730, the source base station prioritizing ones of the candidate target base stations belonging to a common MBSFN synchronization area with the source base station and outside the common MBSFN area lower in the priority order than the ones candidate target base stations belonging to the common MBSFN area and higher than ones of the candidate target base stations outside of the common MBSFN synchronization area. The additional elements 700 may further include, at 740, the source base station prioritizing ones of the candidate target base stations outside of a common MBSFN service area with the source base station lower in the priority order than ones of the candidate target base stations inside of the common MBSFN service area.

The additional elements 700 may further include, at 750, the source base station prioritizing ones of the candidate target base stations in the priority order in order of quality of unicast service provided. It should be appreciated that because quality of unicast service may be independent of MBMS-related parameters as used in elements 710, 720, 730 and 740, it may cause an aggregate ranking for a candidate to differ from what would otherwise be realized. For example, if elements 710 and 750 are used in combination, in some circumstances the combination of quality of unicast service and MBSFN area may result in a candidate in the common MBSFN area with a quality of service ranking, in the aggregate, lower than a candidate outside the common MBSFN area but with a much higher quality of service. The circumstances in which this will occur depends on the relative values of the various parameters considered in the ranking algorithm, and relative weights assigned to the various parameters in ranking, the details of which are beyond the scope of the present disclosure.

Figure 8:
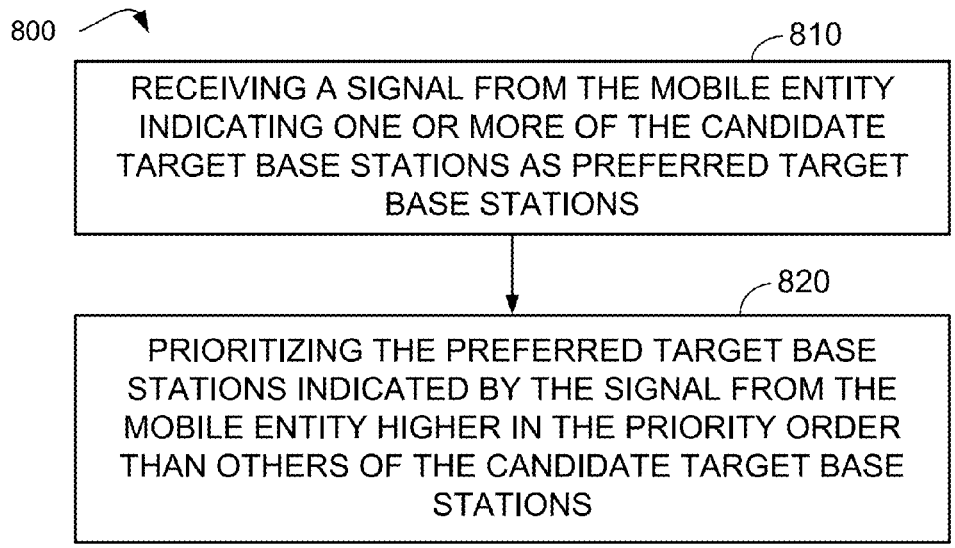

FIG. 8 shows further optional operations or aspects 800 that may be performed by the source base station in conjunction with the method 600 for managing transfer of MBSFN service from a source base station to a target base station. The operations shown in FIG. 8 are not required to perform the method 600. Operations are independently performed and not mutually exclusive. Therefore any one of such operations may be performed regardless of whether another downstream or upstream operation is performed. For example, if the method 600 includes at least one operation of FIG. 8, then the method 600 may terminate after the at least one operation, without necessarily having to include any subsequent downstream operation(s) that may be illustrated. The method 600 may further include, at 810, the source base station receiving a signal from the mobile entity indicating one or more of the candidate target base stations as preferred target base stations. The method 600 may further include, at 820, the source base station prioritizing the preferred target base stations indicated by the signal from the mobile entity higher in the priority order than others of the candidate target base stations.

Figure 9:
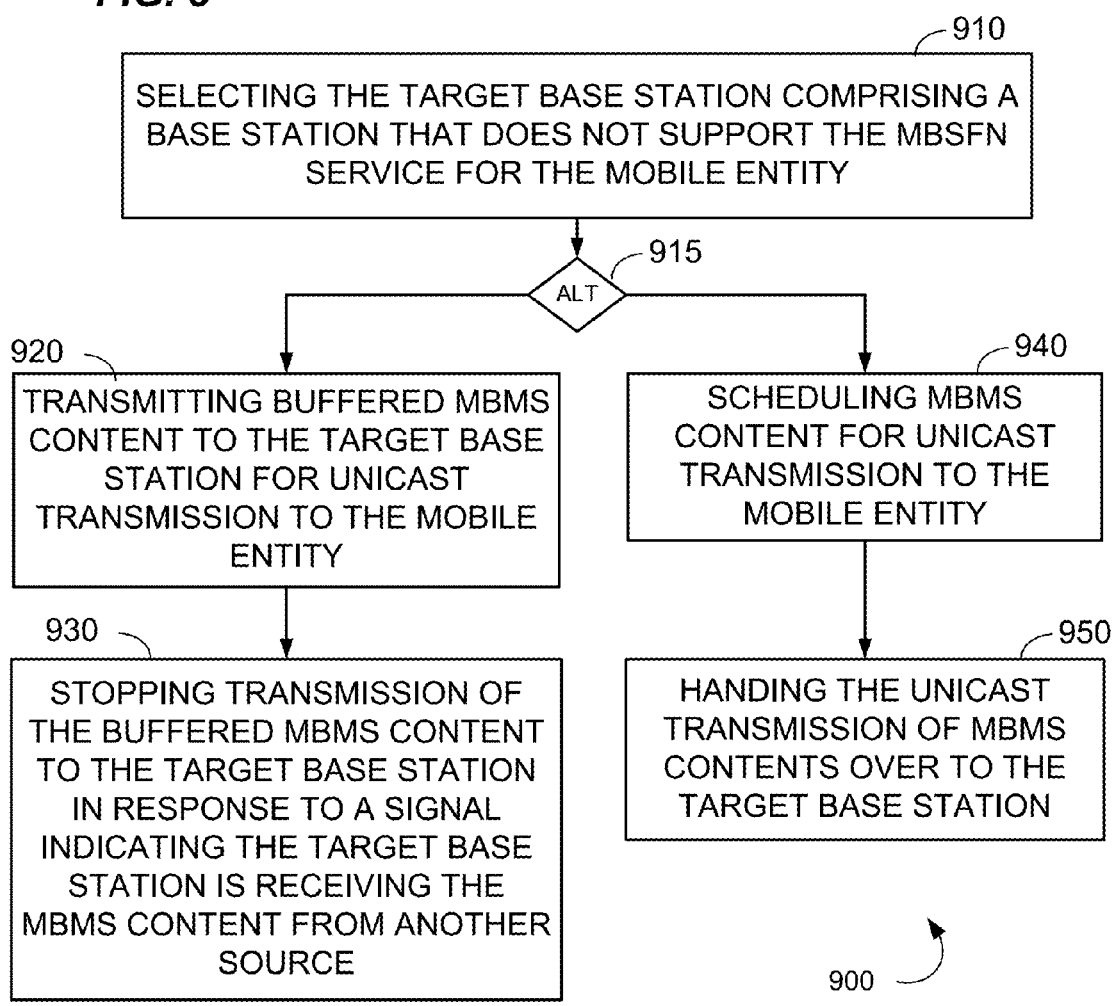

FIG. 9 shows further optional operations or aspects 900 that may be performed by the source base station in conjunction with the method 900 for managing transfer of MBSFN service from a source base station to a target base station. The operations shown in FIG. 9 are not required to perform the method 600. Unless positioned directly on opposing branches off of the "in the alternative" diamond 915, operations are independently performed and not mutually exclusive. Therefore any one of such operations may be performed regardless of whether another downstream or upstream operation is performed. Conversely, operations that are positioned directly on opposing branches off of the "in the alternative" diamond are expected to be mutually exclusive alternatives in any particular instance of the method. If the method 600 includes at least one operation of FIG. 9, then the method 600 may terminate after the at least one operation, without necessarily having to include any subsequent downstream operation(s) that may be illustrated.

The method 600 may further include, at 910, the source base station selecting the target base station comprising a base station that does not support the MBSFN service for the mobile entity. According to an alternative 915, the method 600 may further include, at 920, transmitting buffered MBMS content to the target base station for unicast transmission to the mobile entity. This alternative may be performed in response to determining that the target base station supports a handover functionality for the content delivery, so that, for example, it is able to receive and process the buffered content from the source base station. In addition, the method 600 may further include, at 930, the source base station stopping transmission of the buffered MBMS content to the target base station in response to a signal indicating the target base station is receiving the MBMS content from another source.

In the alternative 915, the method 600 may further include, at 940, the source base station scheduling MBMS content for unicast transmission to the mobile entity. This alternative may be performed in response to determining that the target base station does not support a handover functionality for the content delivery. The method 600 may further include, at 950, the source base station handing the unicast transmission of MBMS contents over to the target base station.

In general, with reference to FIG. 9, decision functionality associated with the branching operation 915, like other operations depicted in these figures, may be implemented by software, hardware, a combination thereof or any other suitable means (e.g., device, system, process, or component). Thus, for example, branching decisions may be made during execution by an entity performing other aspects of the described method, may be predetermined by design prior to execution of other operations, or may be accomplished by some combination of the foregoing over the various branching operations.

Figure 10:
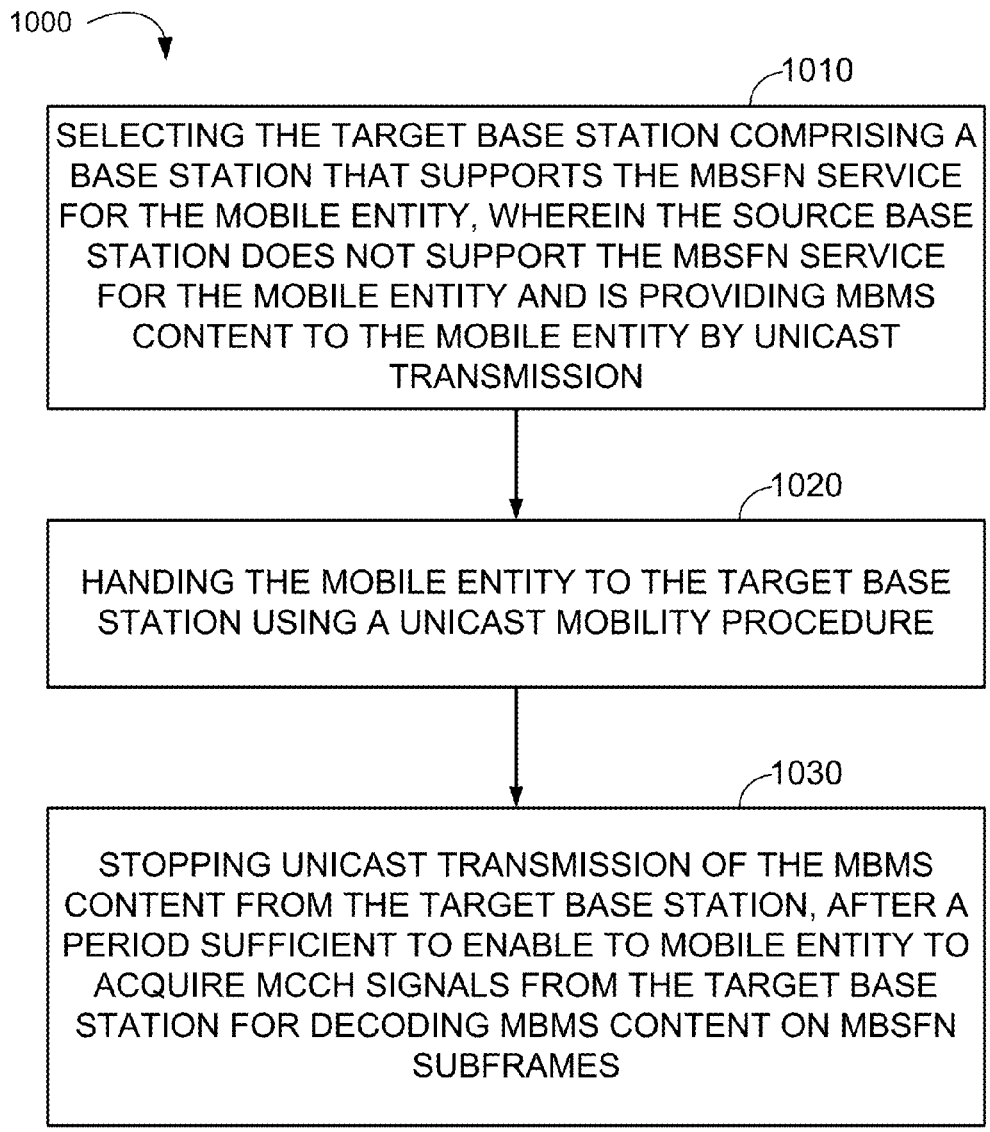

FIG. 10 shows further optional operations or aspects 1000 that may be performed by the source base station in conjunction with the method 600 for managing transfer of MBSFN service from a source base station to a target base station. The operations shown in FIG. 10 are not required to perform the method 600. Operations are independently performed and not mutually exclusive. Therefore any one of such operations may be performed regardless of whether another downstream or upstream operation is performed. For example, if the method 600 includes at least one operation of FIG. 10, then the method 600 may terminate after the at least one operation, without necessarily having to include any subsequent downstream operation(s) that may be illustrated. The method 600 may further include, at 1010, the source base station providing MBMS content to the mobile entity by unicast transmission, further comprising selecting the target base station comprising a base station that supports the MBSFN service for the mobile entity. This operation 1010 and subsequent operations 1020 and 1030 may be performed in circumstances wherein the source base station does not support the MBSFN service for the mobile entity. The method 600 may further include, at 1020, the source base station handing the mobile entity to the target base station using a unicast mobility procedure. Unicast mobility procedures are used for handing off unicast services when a mobile entity moved from one cell to another, and any suitable mobility procedure may be used. The method 600 may further include, at 1030, the source base station stopping unicast transmission of the MBMS content from the target base station, after a period sufficient to enable to mobile entity to acquire MCCH signals from the target base station for decoding MBMS content on MBSFN subframes. The base station may determine the period in any suitable manner, for example by closed-loop computation or in response to signaling from the target base station.

Figure 11:
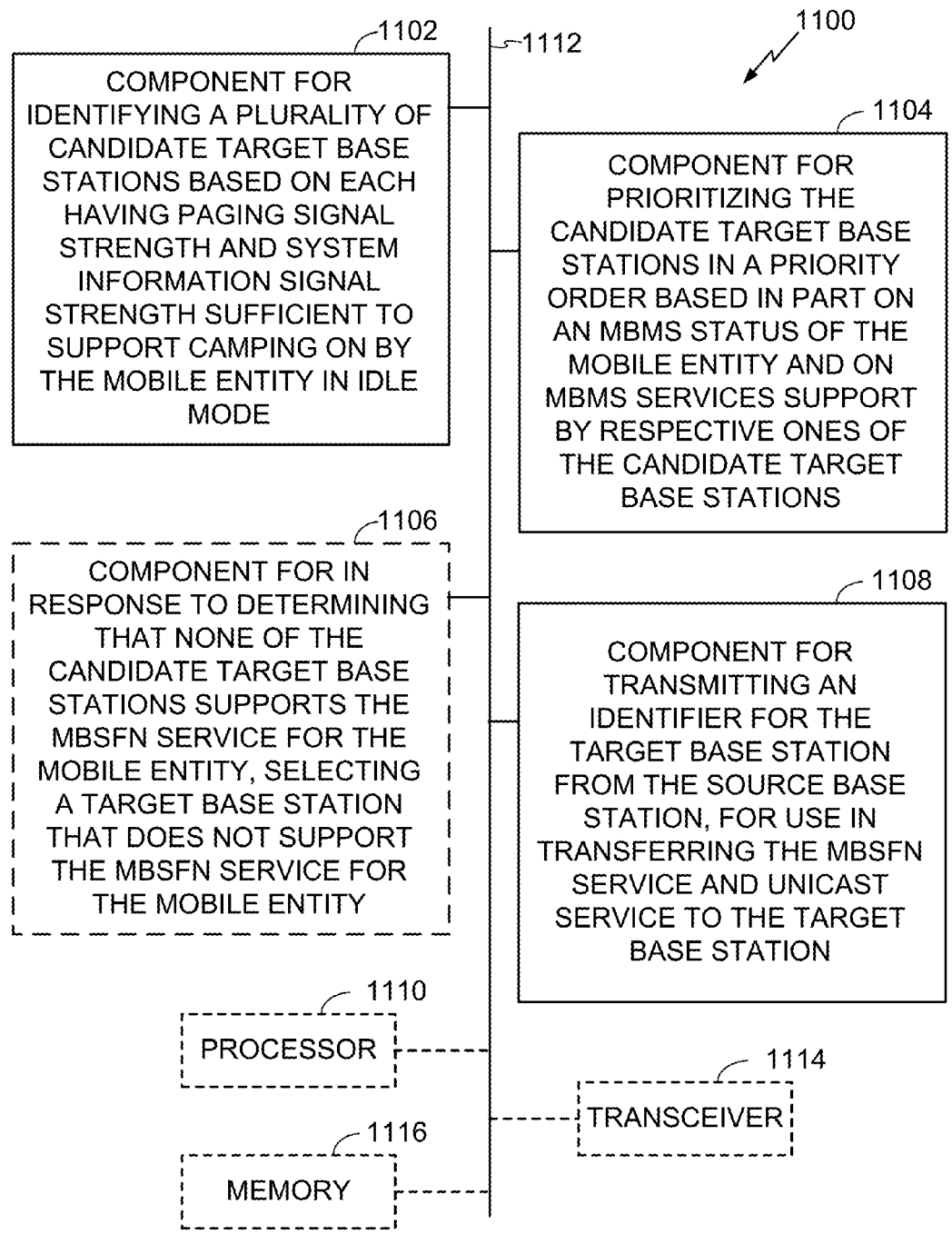
FIG. 11 illustrates an embodiment of an apparatus for managing transfer of MBSFN services, in accordance with the methodologies of FIGS. 6-10.

With reference to FIG. 11, there is provided an exemplary apparatus 1100 that may be configured as a network entity in a wireless network, or as a processor or similar device for use within the network entity, for providing eMBMS. The network entity may be an eNB, or other base station (e.g., Home Node B, etc.) of a wireless communications network. The apparatus 1100 may include functional blocks that can represent functions implemented by a processor, software, or combination thereof (e.g., firmware).

As illustrated, in one embodiment, the apparatus 1100 may include an electrical component or module 1102 for identifying a plurality of candidate target base stations based on each having paging signal strength and system information signal strength sufficient to support camping on by the mobile entity in idle mode. For example, the electrical component 1102 may include at least one control processor coupled to a transceiver or the like and to a memory with instructions for identifying one or more candidates based on a paging signal strength. The electrical component 1102 may be, or may include, a means for identifying a plurality of candidate target base stations based on each having paging signal strength and system information signal strength sufficient to support camping on by the mobile entity in idle mode. Said means may be or may include the at least one control processor operating an algorithm. The algorithm may include, for example, retrieving a neighbor list, receiving paging signal measurement reports from a mobile entity, and filtering the neighbor list based on the measurement reports to exclude neighbor stations having a measured signal strength below a threshold.

The apparatus 1100 may include an electrical component 1104 for prioritizing the candidate target base stations in a priority order based in part on an MBMS status of the mobile entity and on MBMS services support by respective ones of the candidate target base stations. For example, the electrical component 1104 may include at least one control processor coupled to a transceiver or the like and to a memory with instructions for prioritizing the candidate based on the identified independent parameters. Said means may be or may include the at least one control processor operating an algorithm. The algorithm may include, for example, determining an MBMS status of the mobile entity (e.g., channels subscribed to, services receiving, etc.); determining which MBMS services are supported by each candidate using a services index; determining a measurement of congruency (e.g., degree of overlap) between the MBMS mobile entity status and MBMS services supported by each candidate in the list, and ranking the candidates according to the measurement of congruency.

Optionally, the apparatus 1100 may include an electrical component 1106 for, in response to determining that none of the candidate target base stations supports the MBSFN service for the mobile entity, selecting a target base station that does not support the MBSFN service for the mobile entity. For example, the electrical component 1106 may include at least one control processor coupled to a transceiver or the like and to a memory with instructions for determining how many of the candidate target base stations support the MBSFN service for the mobile entity, and selecting a target base station that does not support the MBSFN service if such number is determined to be zero. Said means may be or may include the at least one control processor operating an algorithm. The algorithm may include, for example, determining whether non-zero congruency exists between the MBMS mobile entity status and MBMS services supported by each candidate in the list, and if no congruency is found to exist, selecting one of the remaining candidate stations.

The apparatus 1100 may include an electrical component 1108 for transmitting an identifier for the target base station from the source base station, for use in transferring the MBSFN service and unicast service to the target base station. For example, the electrical component 1108 may include at least one control processor coupled to a transceiver or the like and to a memory holding instructions for transmitting the identifier to a mobile entity that has requested a transfer. The electrical component 1108 may be, or may include, a means for transmitting an identifier for the target base station from the source base station, for use in transferring the MBSFN service and unicast service to the target base station. Said means may be or may include the at least one control processor operating an algorithm. The algorithm may include, for example, encoding the identifier and providing the encoded identifier to a transmitter component. The apparatus 1100 may include similar electrical components for performing any or all of the additional operations 700, 800, 900 or 1000 described in connection with FIGS. 8-10, which for illustrative simplicity are not shown in FIG. 11.

In related aspects, the apparatus 1100 may optionally include a processor component 1110 having at least one processor, in the case of the apparatus 1100 configured as a mobile entity. The processor 1110, in such case, may be in operative communication with the components 1102-1108 or similar components via a bus 1112 or similar communication coupling. The processor 1110 may effect initiation and scheduling of the processes or functions performed by electrical components 1102-1108.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for performing the activity of the components 1102-1108, and subcomponents thereof, or the processor 1110, the additional aspects 700, 800, 900 or 1000, or the methods disclosed herein. The memory component 1116 may retain instructions for executing functions associated with the components 1102-1108. While shown as being external to the memory 1116, it is to be understood that the components 1102-1108 can exist within the memory 1116.

Figure 12:
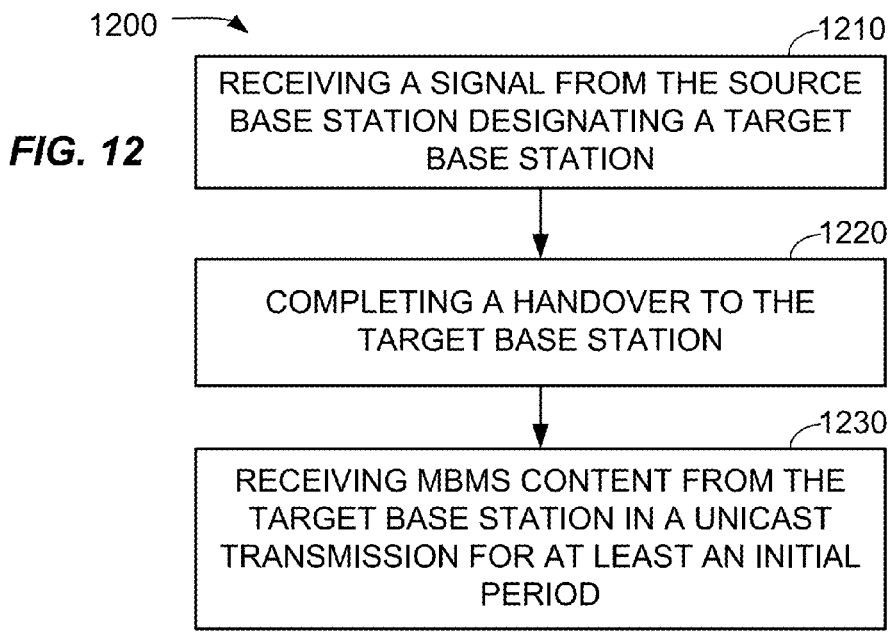
FIGS. 12-13 illustrate embodiments of a methodology for handling transfer of MBSFN service, using a mobile entity of a wireless communications system.

FIG. 12 shows a method 1200 for handling transfer of MBSFN service and unicast service at a mobile entity from a source base station to a target base station of a cellular wireless communications system. The mobile entity may comprise a UE of any of the various forms described herein. The method 1200 may include the mobile entity, at 1210, receiving a signal from the source base station designating a target base station. The method 1200 may further include, at 1220, the mobile entity completing a handover to the target base station. The method 1200 may further include, at 1230, the mobile entity receiving MBMS content from the target base station in a unicast transmission for an initial period. After the initial period is finished, the mobile entity may receive the MBMS content in an MBMS multicast from the target station. The operation 1230 may be performed in circumstances where the target base station is capable of transmitting the MBMS content by multicast.

Figure 13:
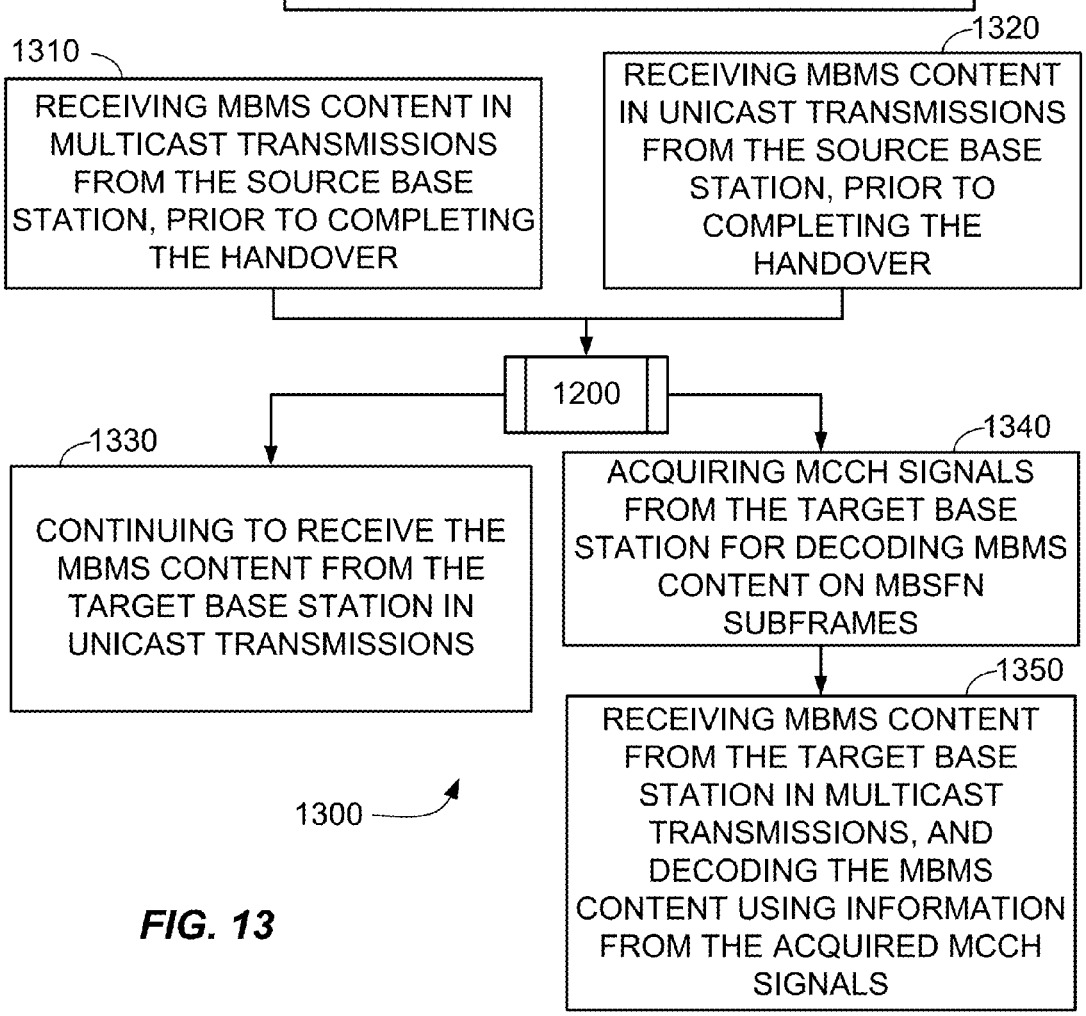

FIG. 13 shows further optional operations or aspects 1300 that may be performed by the mobile entity in conjunction with the method 1200 for handling transfer of MBSFN service from a source base station to a target base station. The operations shown in FIG. 13 are not required to perform the method 1200. Operations are independently performed and not mutually exclusive. Therefore any one of such operations may be performed regardless of whether another downstream or upstream operation is performed. For example, if the method 1200 includes at least one operation of FIG. 13, then the method 1200 may terminate after the at least one operation, without necessarily having to include any subsequent downstream operation(s) that may be illustrated. The method 1200 may further include, at 1310, the mobile entity receiving MBMS content in multicast transmissions from the source base station, prior to completing the handover. In the alternative, or in addition, the method 1200 may further include, at 1320, the mobile entity receiving MBMS content in unicast transmissions from the source base station, prior to completing the handover. Operation 1320 may be performed as an exclusive alternative to operation 1310 in circumstances wherein the source base station is not capable of providing MBMS content by multicast. Operation 1320 may be performed as an additional operation to operation 1310 in circumstances wherein the source base station is capable of providing MBMS content by multicast, but the target base station is not capable of providing MBMS content by multicast. Neither operation 1310 nor 1320 should be performed in circumstances wherein both the source and target base stations are capable of providing MBMS content by multicast to the mobile entity. After performing one or both of operations 1310 or 1320, the mobile entity may proceed to perform the method 1200.

After completing the elements of method 1200 shown in FIG. 12, the mobile entity may perform one or more of the additional operations shown downstream of the process operation 1200. The method 1200 may further include, at 1330, the mobile entity continuing to receive the MBMS content from the target base station in unicast transmissions. Performance of the operation 1330 may be appropriate in circumstances wherein the target base station does not support the MBSFN service for the mobile entity. In the alternative to the operation 1330, the method 1200 may further include, at 1340, the mobile entity acquiring MCCH signals from the target base station for decoding MBMS content on MBSFN subframes. Performance of the operation 1340 may be appropriate in circumstances wherein the target base station supports the MBSFN service for the mobile entity. In addition to the operation 1340, the method 1200 may further include, at 1350, the mobile entity receiving MBMS content from the target base station in multicast transmissions, and decoding the MBMS content using information from the acquired MCCH signals.

Figure 14:
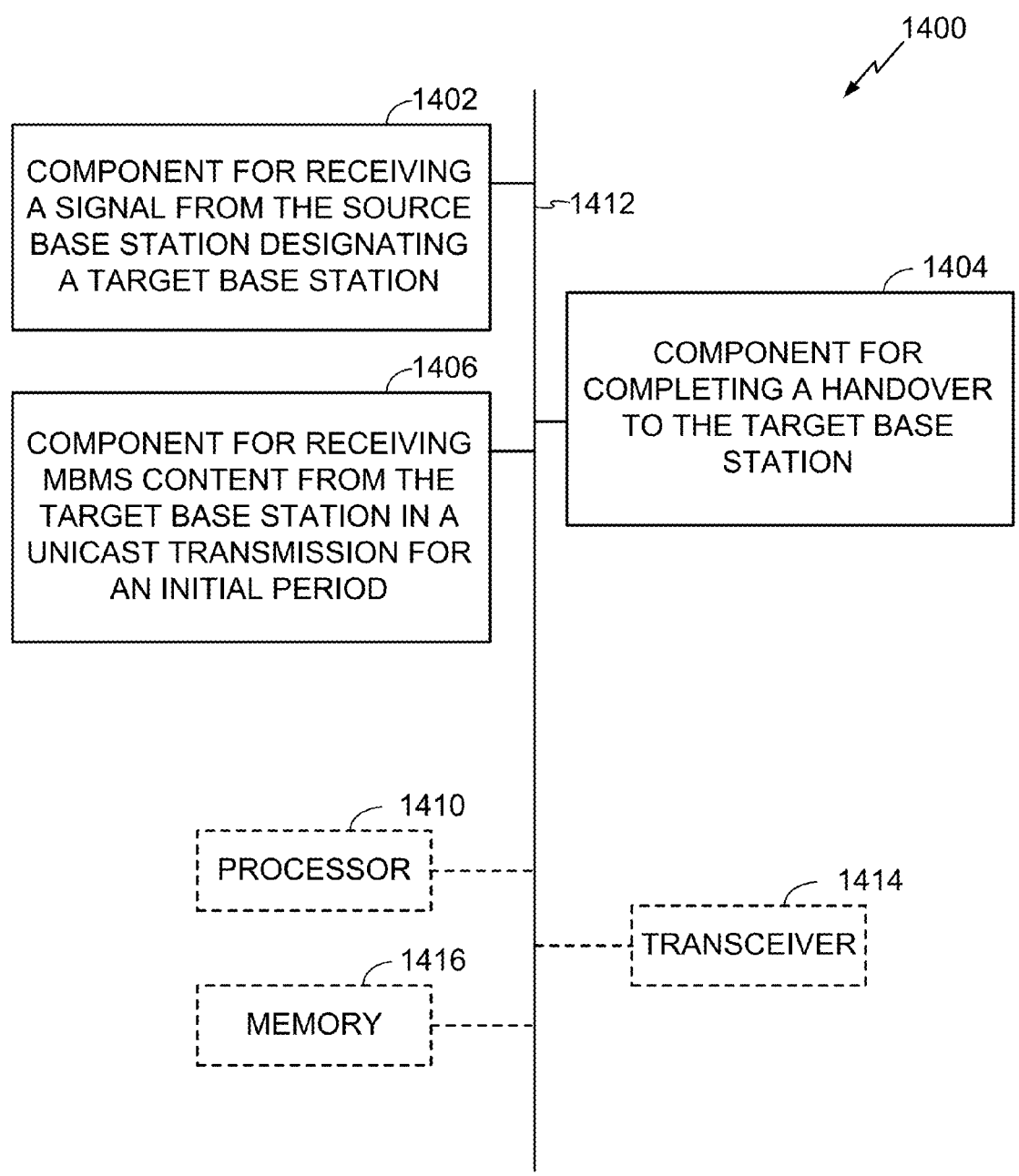
FIG. 14 illustrates an embodiment of an apparatus for handling transfer of MBSFN services, in accordance with the methodologies of FIGS. 12-13.

With reference to FIG. 14, there is provided an exemplary apparatus 1400 that may be configured as a mobile entity or UE in a wireless network, or as a processor or similar device for use within the mobile entity or UE, for handling transfer of MBSFN service from a source base station to a target base station. The apparatus 1400 may include functional blocks that can represent functions implemented by a processor, software, or combination thereof (e.g., firmware).

As illustrated, in one embodiment, the apparatus 1400 may include an electrical component or module 1402 for receiving a signal from the source base station designating a target base station. For example, the electrical component 1402 may include at least one control processor coupled to a transceiver or the like and to a memory with instructions for receiving and processing a transmission from a base station. The electrical component 1402 may be, or may include, a means for receiving a signal from the source base station designating a target base station. Said means may be or may include the at least one control processor operating an algorithm. The algorithm may include, for example, receiving a wireless signal using one or more protocols as referenced herein, decoding the wireless signal to obtain decoded data, recognizing an identifier for a neighbor cell in the decoded data, and storing the identifier in a memory component.

The apparatus 1400 may further include an electrical component 1404 for completing a handover to the target base station. For example, the electrical component 1404 may include at least one control processor coupled to a transceiver or the like and to a memory holding instructions for completing a handover in communication with the source and target base stations. The electrical component 1404 may be, or may include, a means for completing a handover in communication with the source and target base stations. Said means may be or may include the at least one control processor operating an algorithm. The algorithm may include, for example, sending and receiving signals for completing a handover using one or more protocols as referenced herein.

The apparatus 1400 may further include an electrical component 1406 for receiving MBMS content from the target base station in a unicast transmission for an initial period. For example, the electrical component 1406 may include at least one control processor coupled to a transceiver or the like and to a memory holding instructions for receiving MBMS content from the target base station in a unicast transmission for an initial period. The electrical component 1406 may be, or may include, a means for receiving MBMS content from the target base station in a unicast transmission for an initial period. Said means may be or may include the at least one control processor operating an algorithm. The algorithm may include, for example, receiving a unicast transmission from the target base station, decoding the unicast transmission to obtain decoded data, recognizing the MBMS content in the decoded data, and outputting the MBMS data to an output device and/or storing it in a memory component. The apparatus 1400 may include similar electrical components for performing any or all of the additional operations 1300 described in connection with FIG. 13, which for illustrative simplicity are not shown in FIG. 14.

In related aspects, the apparatus 1400 may optionally include a processor component 1410 having at least one processor, in the case of the apparatus 1400 configured as a mobile entity. The processor 1410, in such case, may be in operative communication with the components 1402-1406 or similar components via a bus 1412 or similar communication coupling. The processor 1410 may effect initiation and scheduling of the processes or functions performed by electrical components 1402-1406.

In further related aspects, the apparatus 1400 may include a radio transceiver component 1414. A stand alone receiver and/or stand alone transmitter may be used in lieu of or in conjunction with the transceiver 1414. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for performing the activity of the components 1402-1406, and subcomponents thereof, or the processor 1410, the additional aspects 700, 800, 900 or 1000, or the methods disclosed herein. The memory component 1416 may retain instructions for executing functions associated with the components 1402-1406. While shown as being external to the memory 1416, it is to be understood that the components 1402-1406 can exist within the memory 1416.

Figure 15:
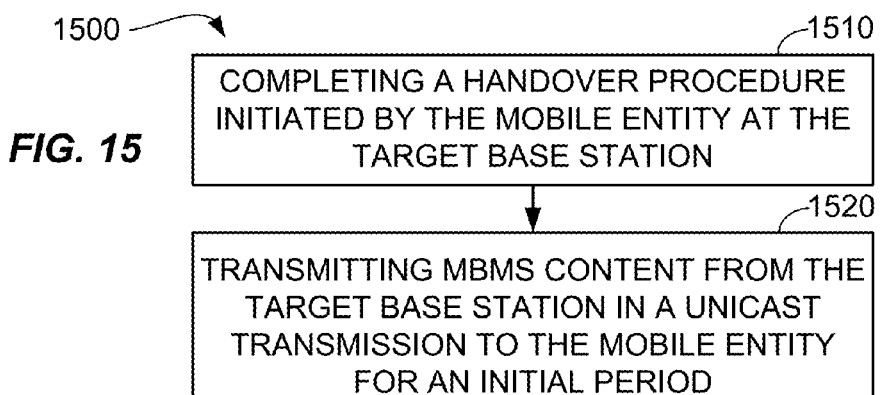
FIGS. 15-16 illustrate embodiments of a methodology for handling transfer of MBSFN service, using a target base station of a wireless communications system.

FIG. 15 shows a method 1500 for handling transfer of MBSFN service and unicast service for a mobile entity from a source base station at a target base station of a cellular wireless communications system. The source base station may comprise a base station of any of the various forms described herein, for example, an eNB. The method 1500 may include the target base station, at 1510, completing a handover procedure initiated by the mobile entity at the target base station. The method 1500 may further include the target base station, at 1520, transmitting MBMS content from the target base station in a unicast transmission to the mobile entity for an initial period.

Figure 16:
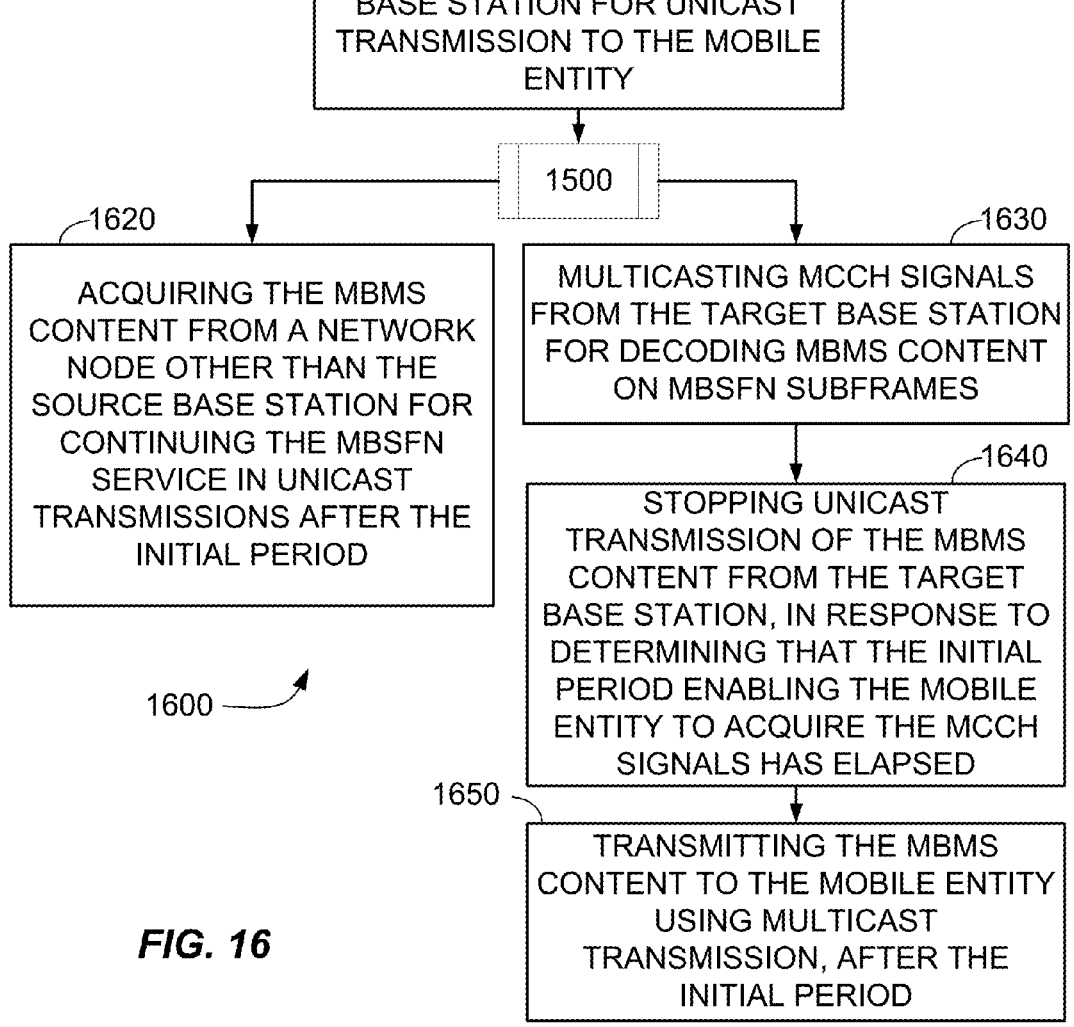

FIG. 16 shows further optional operations or aspects 1600 that may be performed by the source base station in conjunction with the method 1500 for handling transfer of MBSFN service from a source base station to a target base station. The operations shown in FIG. 16 are not required to perform the method 1500. Operations are independently performed and not mutually exclusive. Therefore any one of such operations may be performed regardless of whether another downstream or upstream operation is performed. For example, if the method 1500 includes at least one operation of FIG. 16, then the method 1500 may terminate after the at least one operation, without necessarily having to include any subsequent downstream operation(s) that may be illustrated. The method 1500 may further include, at 1610, the target base station receiving buffered MBMS content from the source base station for the unicast transmission to the mobile entity. After performing the operation 1610, the target base station may proceed to perform the method 1500.

After completing the elements of method 1500 shown in FIG. 15, the target base station may perform one or more of the additional operations shown downstream of the process operation 1500. The method 1500 may further include, at 1620, the target base station acquiring the MBMS content from a network node other than the source base station for continuing the MBSFN service in unicast transmissions after the initial period. Performance of the operation 1620 may be appropriate in circumstances wherein the target base station does not support the MBSFN service for the mobile entity. In the alternative to the operation 1620, the method 1500 may further include, at 1630, the target base station multicasting MCCH signals from the target base station for decoding MBMS content on MBSFN subframes. Performance of the operation 1630 may be appropriate in circumstances wherein the target base station supports the MBSFN service for the mobile entity. In addition to the operation 1630, the method 1500 may further include, at 1640, the target base station stopping unicast transmission of the MBMS content from the target base station, in response to determining that the initial period enabling the mobile entity to acquire the MCCH signals has elapsed. For example, the target base station may use a timer, or other timing mechanism, to determine that sufficient time has passed for one or more transmissions of the MCCH signals from the target base station to have occurred. In the alternative, or in addition, the target base station may determine the period has elapsed in response to determining that one or more transmissions of the MCCH signals from the target base station has in fact occurred. In addition to the operations 1630 and 1640, the method 1500 may further include, at 1650, the target base station transmitting the MBMS content to the mobile entity using multicast transmission, after the initial period.

Figure 17:
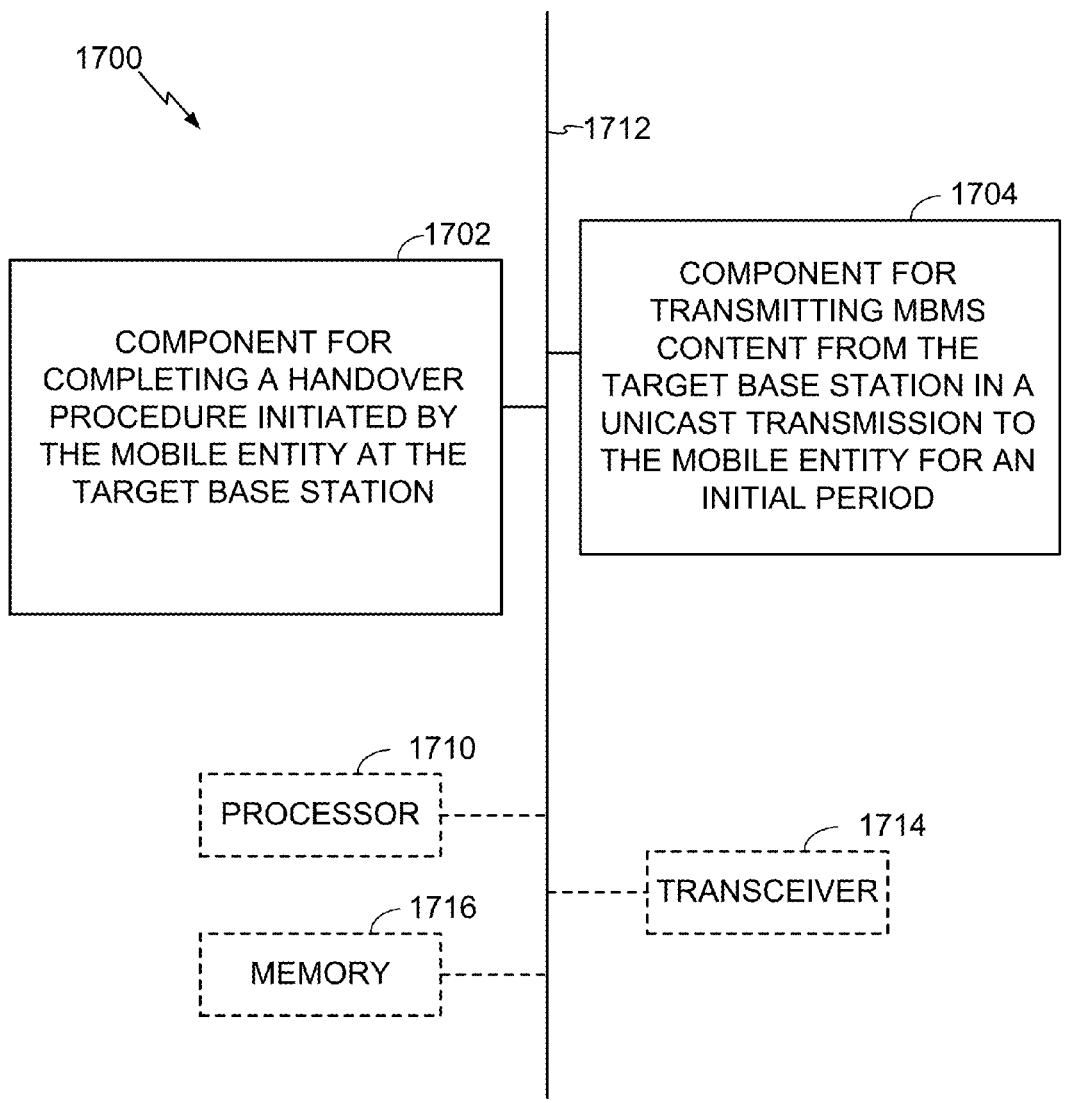
FIG. 17 illustrates an embodiment of an apparatus for handling transfer of MBSFN services, in accordance with the methodologies of FIGS. 15-16.

With reference to FIG. 17, there is provided an exemplary apparatus 1700 that may be configured as a network entity in a wireless network, or as a processor or similar device for use within the network entity, for handling a handover of MBMS services from a source base station. The network entity may be an eNB, or other base station (e.g., Home Node B, etc.) of a wireless communications network. The apparatus 1700 may include functional blocks that can represent functions implemented by a processor, software, or combination thereof (e.g., firmware).

As illustrated, in one embodiment, the apparatus 1700 may include an electrical component or module 1702 for completing a handover procedure initiated by the mobile entity at the target base station. For example, the electrical component 1702 may include at least one control processor coupled to a transceiver or the like and to a memory with instructions for handling a handover in communication with a mobile entity and source base station. The electrical component 1702 may be, or may include, a means for completing a handover procedure initiated by the mobile entity at the target base station. Said means may be or may include the at least one control processor operating an algorithm. The algorithm may include, for example, sending and receiving signals to/from the mobile entity according to a handover protocol, thereby establishing a connection to the mobile entity for unicast transmissions or the like.

The apparatus 1700 may include an electrical component 1704 for transmitting MBMS content from the target base station in a unicast transmission to the mobile entity for an initial period. For example, the electrical component 1704 may include at least one control processor coupled to a transceiver or the like and to a memory holding instructions for transmitting the MBMS content to a mobile entity that has requested a transfer. The electrical component 1704 may be, or may include, a means for transmitting MBMS content from the target base station in a unicast transmission to the mobile entity for an initial period. Said means may be or may include the at least one control processor operating an algorithm. The algorithm may include, for example, receiving MBMS content from a network entity, encoding the MBMS content in a signal for unicast transmission, and transmitting the unicast transmission to the mobile entity. The apparatus 1700 may include similar electrical components for performing any or all of the additional operations 1600 described in connection with FIG. 16, which for illustrative simplicity are not shown in FIG. 17.

In related aspects, the apparatus 1700 may optionally include a processor component 1710 having at least one processor, in the case of the apparatus 1700 configured as a network entity. The processor 1710, in such case, may be in operative communication with the components 1702-1704 or similar components via a bus 1712 or similar communication coupling. The processor 1710 may effect initiation and scheduling of the processes or functions performed by electrical components 1702-1704.

In further related aspects, the apparatus 1700 may include a radio transceiver component 1714. A stand alone receiver and/or stand alone transmitter may be used in lieu of or in conjunction with the transceiver 1714. The apparatus 1700 may optionally include a component for storing information, such as, for example, a memory device/component 1716. The computer readable medium or the memory component 1716 may be operatively coupled to the other components of the apparatus 1700 via the bus 1712 or the like. The memory component 1716 may be adapted to store computer readable instructions and data for performing the activity of the components 1702-1704, and subcomponents thereof, or the processor 1710, the additional aspects 700, 800, 900 or 1000, or the methods disclosed herein. The memory component 1716 may retain instructions for executing functions associated with the components 1702-1704. While shown as being external to the memory 1716, it is to be understood that the components 1702-1704 can exist within the memory 1716.

FIG. 18 shows a method 1800 for obtaining an MBMS status of a mobile entity in a cellular wireless communications system, using a base station. The base station may comprise a base station of any of the various forms described herein, for example, an eNB. The method 1800 may include, at 1810, receiving, at a base station of the wireless communication system, a message from the mobile entity including information for providing to a an administrative network node for use in MBMS service accounting. An administrative network node may include, for example, an MCE or BM-SC. The message including the MBMS administrative information may be in any suitable form. The method 1800 may further include, at 1820, the base station obtaining an MBMS status of the mobile entity from the message for use by the base station.

FIG. 19 shows further optional operations or aspects 1900 that may be performed by the source base station in conjunction with the method 1800 for obtaining an MBMS status. More specifically, each of the additional operations 1900 represent a more particularized method, or a component of a more particularized method, for performing the receiving operation 1810 described in connection with FIG. 18; and consequently, determining a type of the message or messages from which the base station obtains the MBMS status at the operation 1820. The operations shown in FIG. 19 are not required to perform the method 1800. Operations are independently performed and not mutually exclusive. Therefore any one of such operations may be performed regardless of whether another downstream or upstream operation is performed. For example, if the method 1800 includes at least one operation of FIG. 19, then the method 1800 may terminate after the at least one operation, without necessarily having to include any subsequent downstream operation(s) that may be illustrated.

The method 1800 may further include, at 1910, the base station receiving a counting response message reporting at least one of an MBMS service the mobile entity is receiving or is requesting. The method 1800 may further include, at 1920, the base station receiving a registration message identifying an MBMS service the mobile entity is registering for. The method 1800 may further include, at 1930, the base station receiving a de-registration message identifying an MBMS service the mobile entity is de-registering. The method 1800 may further include, at 1940, the base station receiving an activation message identifying an MBMS service the mobile entity is activating. The method 1800 may further include, at 1950, the base station receiving a de-activation message identifying an MBMS service the mobile entity is de-activating.

Figure 20:
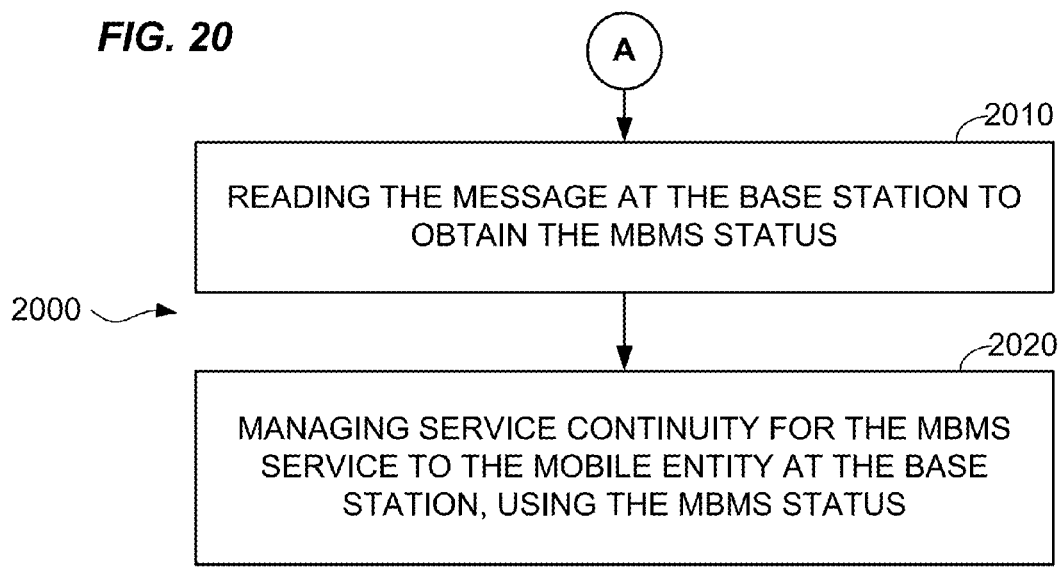

FIG. 20 shows further optional operations or aspects 2000 that may be performed by the source base station in conjunction with the method 1800 for obtaining an MBMS status. The operations shown in FIG. 20 are not required to perform the method 1800. Operations are independently performed and not mutually exclusive. Therefore any one of such operations may be performed regardless of whether another downstream or upstream operation is performed. For example, if the method 1800 includes at least one operation of FIG. 20, then the method 1800 may terminate after the at least one operation, without necessarily having to include any subsequent downstream operation(s) that may be illustrated.

The method 1800 may further include, at 2010, reading the message at the base station to obtain the MBMS status. The method 1800 may further include, at 2020, the base station managing service continuity for the MBMS service to the mobile entity at the base station, using the MBMS status. For example, the base station may use a prioritization procedure as described herein responsive to the MBMS status of the mobile entity requesting a handover.

Figure 21:
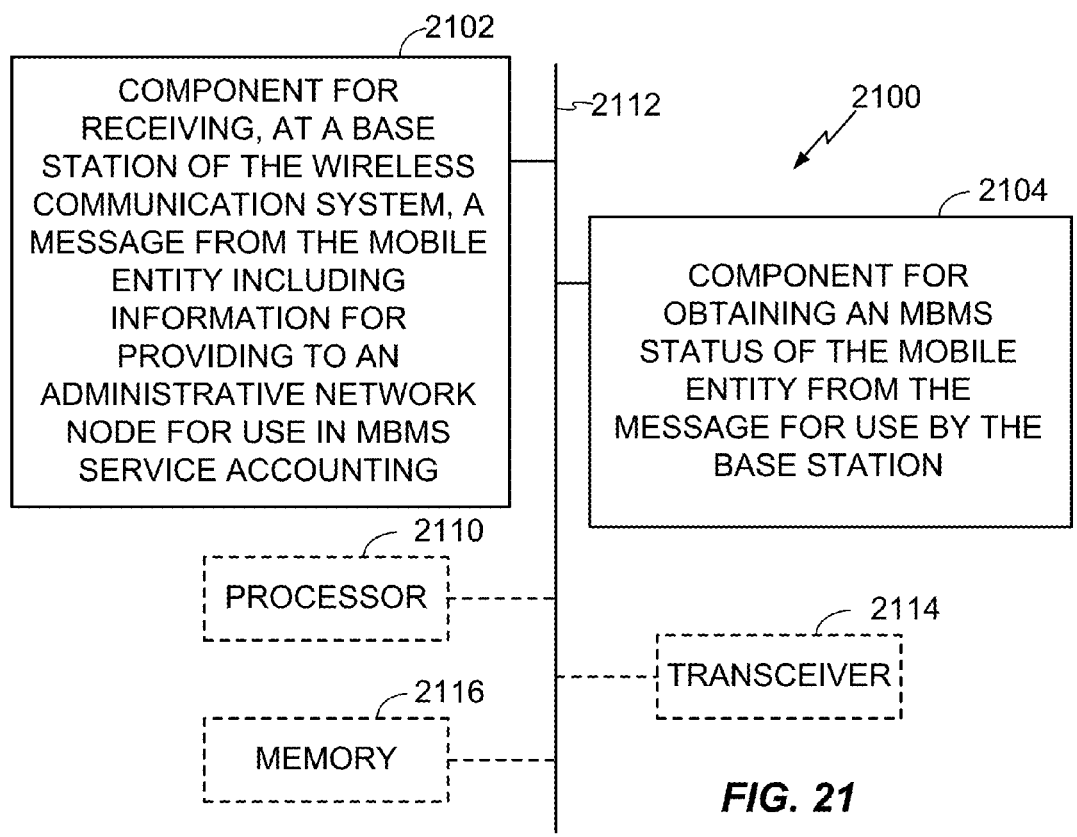
FIG. 21 illustrates an embodiment of an apparatus for obtaining an MBMS status of a mobile entity, in accordance with the methodologies of FIGS. 18-20.

With reference to FIG. 21, there is provided an exemplary apparatus 2100 that may be configured as a network entity in a wireless network, or as a processor or similar device for use within the network entity, for obtaining an MBMS status of a mobile entity. The network entity may be an eNB, or other base station (e.g., Home Node B, etc.) of a wireless communications network. The apparatus 2100 may include functional blocks that can represent functions implemented by a processor, software, or combination thereof (e.g., firmware).

As illustrated, in one embodiment, the apparatus 2100 may include an electrical component or module 2102 for receiving, at a base station of the wireless communication system, a message from the mobile entity configured for providing to an MCE for use in MBMS service accounting. For example, the electrical component 2102 may include at least one control processor coupled to a transceiver or the like and to a memory with instructions for handling an accounting message in communication with a mobile entity and an MCE. The electrical component 2102 may be, or may include, a means for receiving, at a base station of the wireless communication system, a message from the mobile entity configured for providing to an MCE for use in MBMS service accounting. Said means may be or may include the at least one control processor operating an algorithm. The algorithm may include, for example, receiving a message from a mobile entity, determining whether the message is an accounting message destined for an MCE, in response to determining that the message is an accounting message, holding the message or a portion of the message in a memory component, and relaying the message to the MCE.

The apparatus 2100 may include an electrical component 2104 for obtaining an MBMS status of the mobile entity from the message for use by the base station. For example, the electrical component 2104 may include at least one control processor coupled to a transceiver or the like and to a memory holding instructions for processing the message to obtain the MBMS information before passing it on to the MCE. The electrical component 2104 may be, or may include, a means for obtaining an MBMS status of the mobile entity from the message for use by the base station. Said means may be or may include the at least one control processor operating an algorithm. The algorithm may include, for example, reading the message or portion of the message from a memory component (e.g., temporary memory), recognizing one or more items of MBMS status information for the mobile entity, using a protocol defined for the accounting message, and holding the one or more items of MBMS status information in a memory component. The apparatus 2100 may include similar electrical components for performing any or all of the additional operations 1900 or 2000 described in connection with FIGS. 19-20, which for illustrative simplicity are not shown in FIG. 21.

In related aspects, the apparatus 2100 may optionally include a processor component 2110 having at least one processor, in the case of the apparatus 2100 configured as a network entity. The processor 2110, in such case, may be in operative communication with the components 2102-2104 or similar components via a bus 2112 or similar communication coupling. The processor 2110 may effect initiation and scheduling of the processes or functions performed by electrical components 2102-2104.

In further related aspects, the apparatus 2100 may include a radio transceiver component 2114. A stand alone receiver and/or stand alone transmitter may be used in lieu of or in conjunction with the transceiver 2114. The apparatus 2100 may optionally include a component for storing information, such as, for example, a memory device/component 2116. The computer readable medium or the memory component 2116 may be operatively coupled to the other components of the apparatus 2100 via the bus 2112 or the like. The memory component 2116 may be adapted to store computer readable instructions and data for performing the activity of the components 2102-2104, and subcomponents thereof, or the processor 2110, the additional aspects 700, 800, 900 or 1000, or the methods disclosed herein. The memory component 2116 may retain instructions for executing functions associated with the components 2102-2104. While shown as being external to the memory 2116, it is to be understood that the components 2102-2104 can exist within the memory 2116.

FIG. 22 shows a method 2200 for operating a reserved base station in an MBMS area of a wireless communications network. The source base station may comprise a base station of any of the various forms described herein, for example, an eNB. The method 2200 may include the reserved base station, at 2210, broadcasting SIB13 signals for MCCH acquisition, for use by one or more mobile entities to decode MBMS signals from non-reserved base stations within radio range. In addition, the method 2200 may further include, at 2220, the reserved base station sending PDCCH signals for MCCH change notification.

With reference to FIG. 23, there is provided an exemplary apparatus 2300 that may be configured as a network entity in a wireless network, or as a processor or similar device for use within the network entity, for operating a reserved base station of an MBMS area. The network entity may be an eNB, or other base station (e.g., Home Node B, etc.) of a wireless communications network. The apparatus 2300 may include functional blocks that can represent functions implemented by a processor, software, or combination thereof (e.g., firmware).

As illustrated, in one embodiment, the apparatus 2300 may include an electrical component or module 2302 for broadcasting, from a reserved base station of an MBMS area, SIB13 signals for MCCH acquisition, for use by one or more mobile entities to decode MBMS signals from non-reserved base stations within radio range. For example, the electrical component 2302 may include at least one control processor coupled to a transceiver or the like and to a memory with instructions for broadcasting the MCCH signals in SIB13. The electrical component 2302 may be, or may include, a means for broadcasting, from a reserved base station of an MBMS area, SIB 13 signals for MCCH acquisition, for use by one or more mobile entities to decode MBMS signals from non-reserved base stations within radio range. Said means may be or may include the at least one control processor operating an algorithm. The algorithm may include, for example, generating information for decoding MBMS signals from non-reserved base stations within radio range in a SIB 13 of a radio frame, and broadcasting the radio frame from a transmitter component of a reserved base station.

The apparatus 2300 may include an electrical component 2304 for sending PDCCH signals for MCCH change notification. For example, the electrical component 2304 may include at least one control processor coupled to a transceiver or the like and to a memory holding instructions for sending the PDCCH signals at an appropriate time. The electrical component 2304 may be, or may include, a means for sending PDCCH signals for MCCH change notification. Said means may be or may include the at least one control processor operating an algorithm. The algorithm may include, for example, determining periodic sending times using a timer component, generating a PDCCH signal encoding an MCCH change notification in response to the time component, and broadcasting the PDCCH signal using a transmitter component.

In related aspects, the apparatus 2300 may optionally include a processor component 2310 having at least one processor, in the case of the apparatus 2300 configured as a network entity. The processor 2310, in such case, may be in operative communication with the components 2302-2304 or similar components via a bus 2312 or similar communication coupling. The processor 2310 may effect initiation and scheduling of the processes or functions performed by electrical components 2302-2304.

In further related aspects, the apparatus 2300 may include a radio transceiver component 2314. A stand alone receiver and/or stand alone transmitter may be used in lieu of or in conjunction with the transceiver 2314. The apparatus 2300 may optionally include a component for storing information, such as, for example, a memory device/component 2316. The computer readable medium or the memory component 2316 may be operatively coupled to the other components of the apparatus 2300 via the bus 2312 or the like. The memory component 2316 may be adapted to store computer readable instructions and data for performing the activity of the components 2302-2304, and subcomponents thereof, or the processor 2310, or the methods disclosed herein. The memory component 2316 may retain instructions for executing functions associated with the components 2302-2304. While shown as being external to the memory 2316, it is to be understood that the components 2302-2304 can exist within the memory 2316.

FIG. 24 shows a method 2400 for obtaining, at a mobile entity, MBMS support information for a base station in a cellular wireless communications system. The mobile entity station may comprise a mobile entity of any of the various forms described herein, for example, a UE. The method 2400 may include, at 2410, the mobile entity receiving, at a mobile entity of the wireless communication system, a message from a serving base station. The method 2400 may further include, at 2420, the mobile entity obtaining MBMS support information for neighbor base stations from the message.

FIG. 25 shows further optional operations or aspects 2500 that may be performed by the mobile entity in conjunction with the method 2400 for obtaining MBMS support information for neighbor base stations. The operations shown in FIG. 25 are not required to perform the method 2400. Operations are independently performed and not mutually exclusive. Therefore any one of such operations may be performed regardless of whether another downstream or upstream operation is performed. For example, if the method 2400 includes at least one operation of FIG. 25, then the method 2400 may terminate after the at least one operation, without necessarily having to include any subsequent downstream operation(s) that may be illustrated. The method 2400 may further include, at 2510, the mobile entity selecting a preferred base station for MBMS service, using the MBMS support information for neighbor base stations. The method 2400 may further include, at 2520, the mobile entity transmitting an identifier for the preferred base station to a serving base station for use in supporting service continuity.

Figure 26:
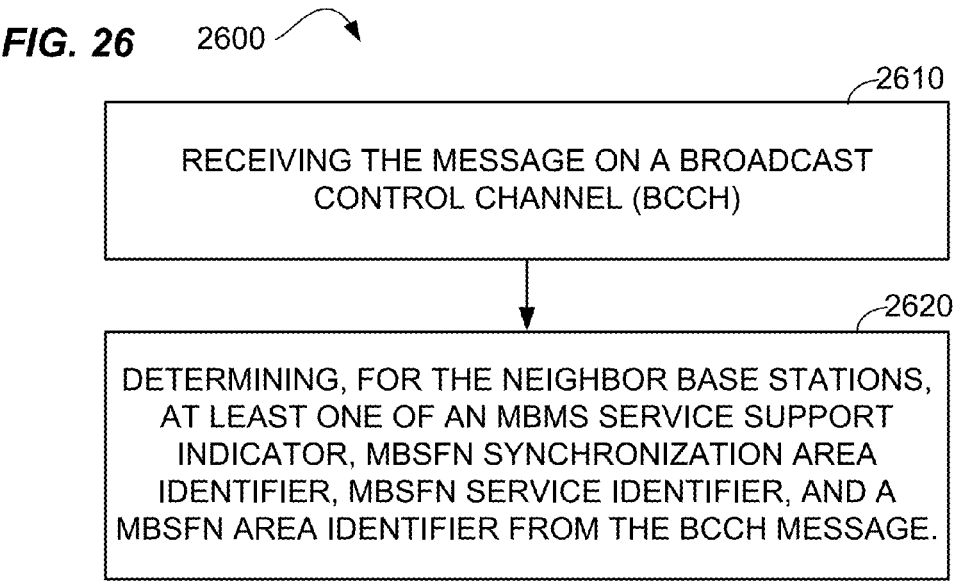

FIG. 26 shows further optional operations or aspects 2600 that may be performed by the mobile entity in conjunction with the method 2400 for obtaining MBMS support information for neighbor base stations. The operations shown in FIG. 26 are not required to perform the method 2400. Operations are independently performed and not mutually exclusive. Therefore any one of such operations may be performed regardless of whether another downstream or upstream operation is performed. For example, if the method 2400 includes at least one operation of FIG. 26, then the method 2400 may terminate after the at least one operation, without necessarily having to include any subsequent downstream operation(s) that may be illustrated. The method 2400 may further include, at 2610, the mobile entity receiving the message on a BCCH. The method 2400 may further include, at 2620, the mobile entity determining, for the neighbor base stations, at least one of an MBMS service support indicator, MBSFN synchronization area identifier, MBSFN service identifier, and a MBSFN area identifier from the BCCH message.

Figure 27:
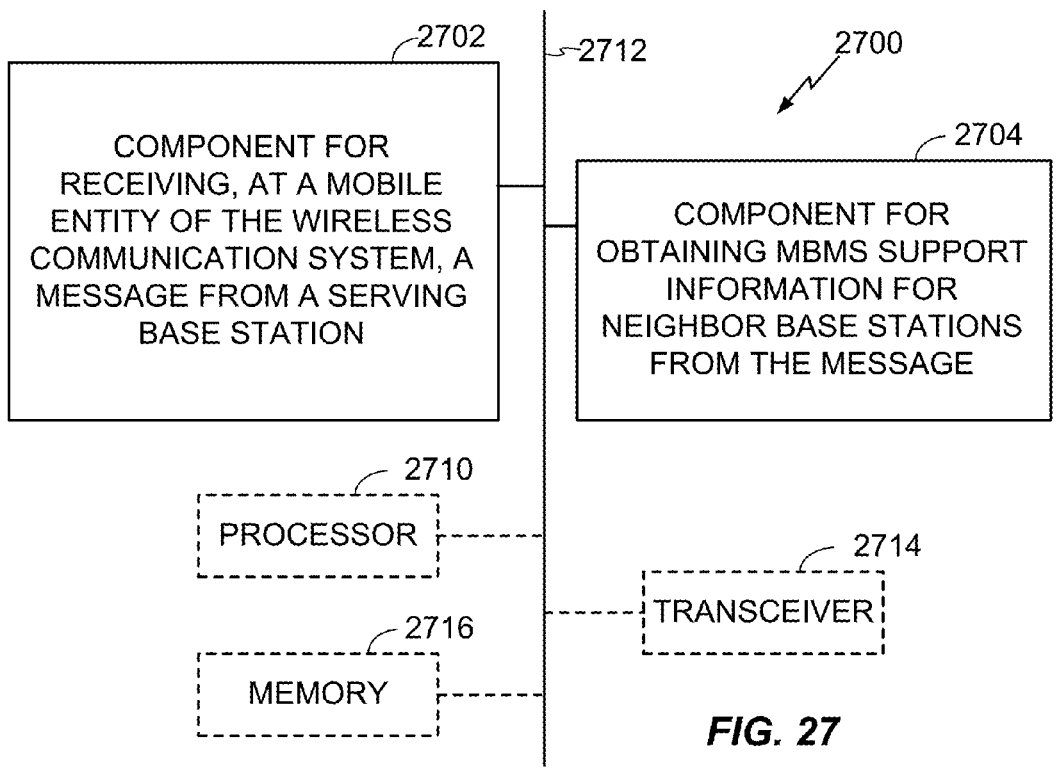
FIG. 27 illustrates an embodiment of an apparatus for obtaining MBMS support information, in accordance with the methodologies of FIGS. 24-26.

With reference to FIG. 27, there is provided an exemplary apparatus 2700 that may be configured as a mobile entity or UE in a wireless network, or as a processor or similar device for use within the mobile entity or UE, for obtaining MBMS support information for neighbor base stations. The apparatus 2700 may include functional blocks that can represent functions implemented by a processor, software, or combination thereof (e.g., firmware).

As illustrated, in one embodiment, the apparatus 2700 may include an electrical component or module 2702 for receiving, at a mobile entity of the wireless communication system, a message from a serving base station. For example, the electrical component 2702 may include at least one control processor coupled to a transceiver or the like and to a memory with instructions for receiving and processing a transmission from a base station. The electrical component 2702 may be, or may include, a means for receiving, at a mobile entity of the wireless communication system, a message from a serving base station. Said means may be or may include the at least one control processor operating an algorithm. The algorithm may include, for example, receiving a wireless signal using one or more protocols as referenced herein, and decoding the wireless signal to obtain decoded data.

The apparatus 2700 may further include an electrical component 2704 for obtaining MBMS support information for neighbor base stations from the message. For example, the electrical component 2704 may include at least one control processor coupled to a memory holding instructions for processing the message to obtain the neighbor MBMS information. The electrical component 2704 may be, or may include, a means for obtaining MBMS support information for neighbor base stations from the message. Said means may be or may include the at least one control processor operating an algorithm. The algorithm may include, for example, processing the decoded data, recognizing MBMS support information for neighbor base stations in the decoded data, and storing the MBMS support information for neighbor base stations in a memory component. The apparatus 2700 may include similar electrical components for performing any or all of the additional operations 2500 or 2600 described in connection with FIGS. 25-26, which for illustrative simplicity are not shown in FIG. 27.

In related aspects, the apparatus 2700 may optionally include a processor component 2710 having at least one processor, in the case of the apparatus 2700 configured as a mobile entity. The processor 2710, in such case, may be in operative communication with the components 2702-2704 or similar components via a bus 2712 or similar communication coupling. The processor 2710 may effect initiation and scheduling of the processes or functions performed by electrical components 2702-2704.

In further related aspects, the apparatus 2700 may include a radio transceiver component 2714. A stand alone receiver and/or stand alone transmitter may be used in lieu of or in conjunction with the transceiver 2714. The apparatus 2700 may optionally include a component for storing information, such as, for example, a memory device/component 2716. The computer readable medium or the memory component 2716 may be operatively coupled to the other components of the apparatus 2700 via the bus 2712 or the like. The memory component 2716 may be adapted to store computer readable instructions and data for performing the activity of the components 2702-2704, and subcomponents thereof, or the processor 2710, the additional aspects 2500 or 2600, or the methods disclosed herein. The memory component 2716 may retain instructions for executing functions associated with the components 2702-2704. While shown as being external to the memory 2716, it is to be understood that the components 2702-2704 can exist within the memory 2716.

EMBMS Service Discovery in Multi-Frequency, Carrier Aggregation and Single Frequency Deployment In other aspects, eMBMS service continuity and target cell selection may be enhanced by new methods of providing eMBMS service discovery for mobile entities. Current approaches may not provide any or sufficiently detailed service discovery information for efficient session initiation and continuity. Prior to describing the service discovery methods in detail, related concepts pertaining to eMBMS service areas and eMBMS system components and functions are reviewed below.

eMBMS Service Areas

Figure 28:
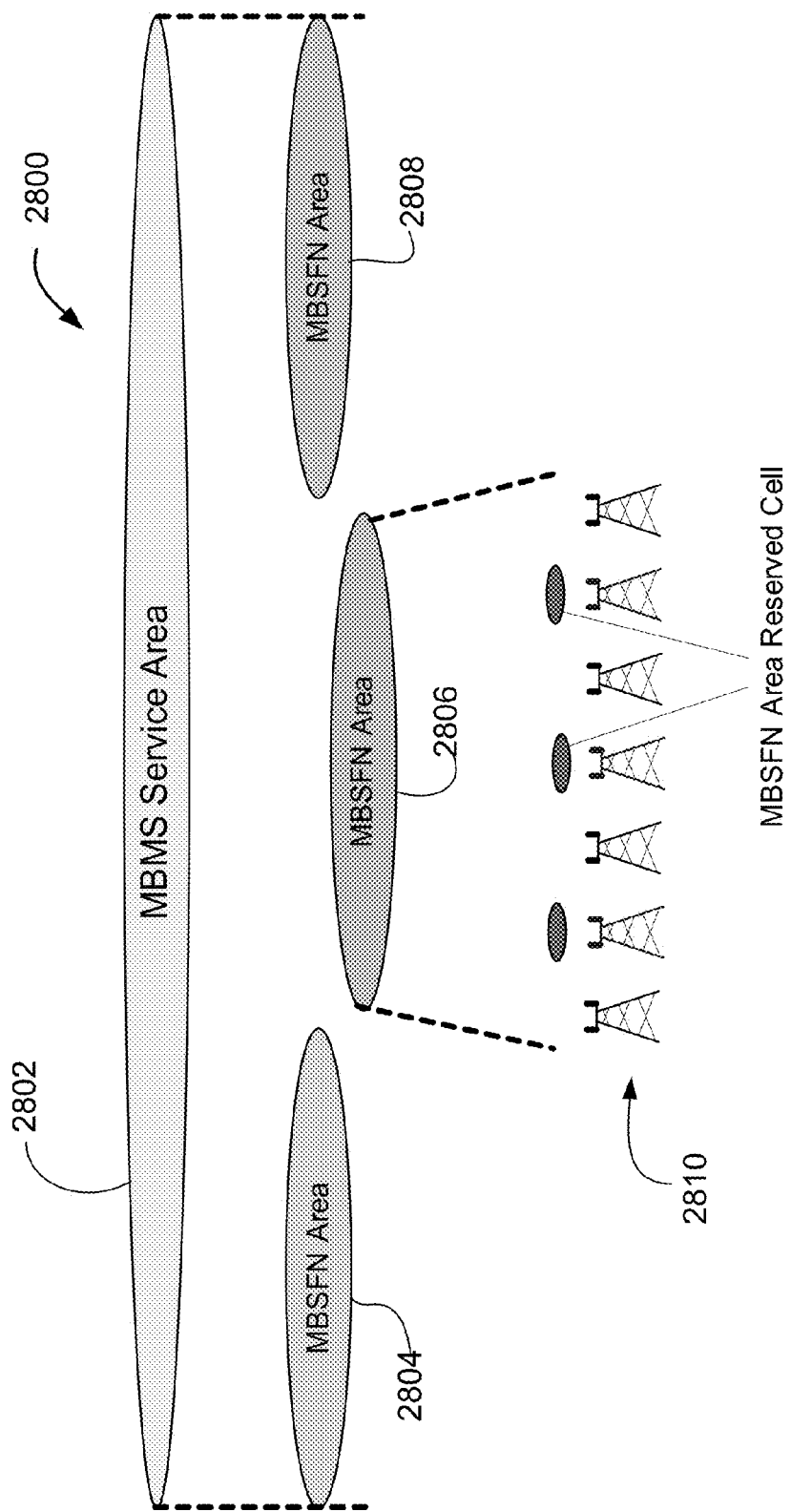
FIG. 28 is a diagram illustrating MBMS over Single Frequency Network (MBSFN) areas.

FIG. 28 illustrates a system 2800 including an MBMS service area 2802 encompassing multiple MBSFN areas 2804, 2806, 2808, which each may include multiple cells or base stations 2810. As used herein, an "MBMS service area" refers to an area where a certain MBMS service is available at a particular time. For example, a particular sports or other program may be broadcast by base stations within the MBMS service area at a particular time. The area where the particular program is broadcast defines the MBMS service area. An MBMS service area may be included in, or may be co-extensive with, a "Broadcast Service Area." A Broadcast Service Area may be defined individually for each MBMS service and may include all of, or less than all of, the Public Land Mobile Network (PLMN) in which a service is offered. The MBMS service area may be made up of one or more "MBSFN areas" as shown at 2804, 2806 and 2808. As used herein, an MBSFN area refers to a group of cells (e.g., cells 2810) currently broadcasting a particular program in a synchronized fashion using an MBSFN protocol. An MBMS service area may be assigned a Service Area Identifier by a network entity.

As noted herein above "MBSFN synchronization area" refers to a group of cells that are interconnected and configured such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 2802 may include one or more MBSFN synchronization areas (not shown). Conversely, an MBSFN synchronization area or Broadcast Service Area may include one or more MBSFN areas or MBMS service areas. Generally, an MBSFN area is made up of all, or a portion of, a single MBSFN synchronization area and is located within a single MBMS service area.

Overlap between various MBSFN areas is supported, and a single eNB may belong to several different MBSFN areas within a single synchronization area. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

MBMS service area Attribute Value Pairs (AVP) may be of an octet string (OctetString) type, and indicate an area over which an MBMS bearer service is to be distributed. An AVP may include or consist of the following parts: a first part being a binary octet value in the range of 1 to 256 (e.g. 0 to 255 interpreted as 1 to 256), and a second part being 2−(2N+1) octets making up a consecutive list of "N" number of MBMS service area identifiers. Each MBMS service area identifier in the AVP list may consist of a 2-octet code that uniquely identifies an MBMS service area, corresponding to an MBMS Service Area Identity. The identifier may be assigned by a network entity such as a Broadcast-Multicast Service Center (BM-SC) and mapped to one or more cells by a Radio Network Controller (RNC) or MME. The MBMS Service Area Identity and its semantics are currently defined in 3GPP TS 23.003. Each MBMS service area identifier should be provided only once in the AVP list.

The MBMS Service Area (MBMS SA) may be as currently defined in 3GPP TS 23.246. The MBMS SA may include one or more MBMS Service Area Identities (MBMS SAIs), and be limited to no more than 256 MBMS SAIs. An MBMS SAI may be used to identify a group of cells within a PLMN, that is independent of an associated location, routing or service area and of the physical location of the cell(s). A cell may belong to one or more MBMS SAs, and therefore may be addressable by one or more MBMS SAIs. The MBMS SAI may be an integer between 0 and 65,535 (inclusive). The value 0 may have special meaning; it may denote an entire PLMN as the MBMS Service Area and indicate to a receiving RNC/BSS that all cells reachable by that RNC/BSS are part of the MBMS Service Area. With the exception of the specific MBMS Service Area Identity value 0, the MBMS Service Area Identity should be unique within a PLMN and should be defined in such a way that all cells in the corresponding MBMS Service Ares are MBMS capable.

eMBMS System Components and Functions

Figure 29:
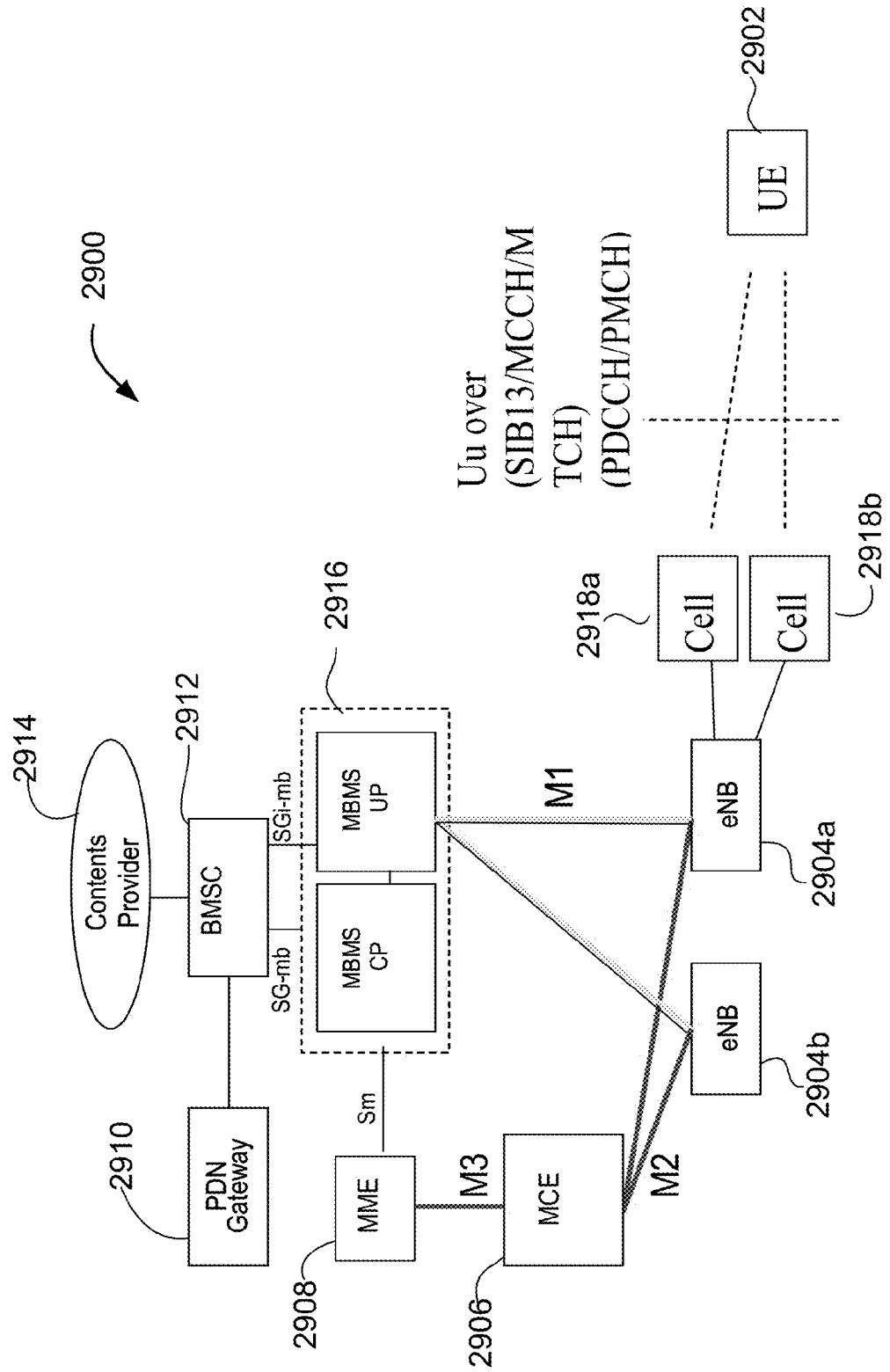
FIG. 29 is a block diagram illustrating components of a wireless communication system for providing or supporting MBSFN service.

FIG. 29 illustrates functional entities of a wireless communication system 2900 for providing or supporting MBSFN service. Regarding Quality of Service (QoS), the system 2900 may use a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling broadcast transmissions.

The system 2900 may include an MBMS Gate Way (MBMS GW) 2916. The MBMS GW 2916 controls Internet Protocol (IP) broadcast distribution of MBMS user plane data to eNodeBs 2904a, 2904b via an M1 interface; two eNBs 2904a,b of many possible eNBs are shown. In addition, the MBMS GW may control IP broadcast distribution of MBMS user plane data to UTRAN Radio Network Controllers (RNCs) (not shown) via an M1 interface. The M1 interface is associated to MBMS data (user plane) and makes use of IP for delivery of data packets. The eNB 2904a may provide MBMS content to a UE/mobile device 2902 via the one or more adjacent cells 2918a, 2918b using an E-UTRAN Uu interface.

The MBMS GW 2916 may further perform MBMS Session Control Signaling, for example MBMS session start and session stop, via the Mobility Management Entity (MME) 2908 and Sm interface. The MBMS GW 2916 may further provide an interface for entities using MBMS bearers through the SGi-mb (user plane) reference point, and provide an interface for entities using MBMS bearers through the SG-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting.

The system 2900 may further include a Multicast Coordinating Entity (MCE) 2906. The MCE 2906 may perform an admission control function for MBMS content, and allocate time and frequency radio resources used by all eNBs in the MBSFN area for multi-cell MBMS transmissions using MBSFN operation. The MCE 2906 may determine a radio configuration for an MBSFN Area, such as, for example, the modulation and coding scheme. The MCE 2906 may schedule and control user plane transmission of MBMS content, and manage eMBMS service multiplexing, by determining which services are to be multiplexed in which Multicast Channel (MCH). The MCE 2906 may participate in MBMS Session Control Signaling with the MME 2908 through an M3 interface, and may provide a control plane interface M2 with the eNBs 2904a, 2904b.

The system 2900 may further include a BM-SC 2912 in communication with a content provider server 2914. The BM-SC 2912 may handle intake of broadcast content from one or more sources such as the content provider 2914, and provide other higher-level management functions as described below. These functions may include, for example, a membership function, including authorization and initiation of MBMS services for an identified UE. The BM-SC 2912 may further perform MBMS session and transmission functions, scheduling of live broadcasts, and delivery, including MBMS and associated delivery functions. The BM-SC 2912 may further provide service advertisement and description, such as advertising content available for broadcast. A separate Packet Data Protocol (PDP) context may be used to carry control messages between UE and BM-SC.

The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 2912 may indicate session start, update and stop to the MBMS-GW 2916 including session attributes such as QoS and MBMS service area.

The system 2900 may further include a Multicast Management Entity (MME) 2908 in communication with the MCE 2906 and MBMS-GW 2916. The MME 2908 may provide a control plane function for MBMS over E-UTRAN. In addition, the MME may provide the eNBs 2904a, 2904b with broadcast related information defined by the MBMS-GW 2916. An Sm interface between the MME 2908 and the MBMS-GW 2916 may be used to carry MBMS control signaling, for example, session start and stop signals.

The system 2900 may further include a Packet Data Network (PDN) Gate Way (GW) 2910, sometimes abbreviated as a P-GW. The P-GW 2910 may provide an Evolved Packet System (EPS) bearer between the UE 2902 and BM-SC 2912 for signaling and/or user data. As such, the P-GW may receive Uniform Resource Locator (URL) based requests originating from UEs in association with IP addresses assigned to the UEs. The BM-SC 2912 may also be linked to one or more content providers via the P-GW 2910, which may communicate with the BM-SC 2912 via an IP interface. In addition, the system may include new interfaces enabling direct communications between certain system components, to facilitate aspects of the methods and apparatus disclosed herein. However, in general new interfaces should not be required.

Multi-Frequency, Carrier Aggregation, or Single Frequency Deployment

In multi-frequency, carrier aggregation or single frequency deployments, a wireless communications network may deploy many MBMS services using a single frequency, using multiple frequencies, or multiple carrier components. Multiple frequencies may be used for implementing carrier aggregation, but are not limited to such use. For example, a base station may use different frequencies to transmit different services. Services deployed on different frequencies or carrier components may differ from one another. In single frequency deployment, services deployed on different neighbor cells may differ from one another. As used herein, an "adjacent cell" means any one of, or any combination of: a frequency, a carrier component, a neighbor cell, or a neighbor base station. In addition, "eMBMS discovery" refers to a process by which a UE identifies one or more adjacent cells carrying a particular eMBMS service of interest.

An MBMS-capable UE may acquire a list of all MBMS services deployed by network, via a service announcement. In contrast, MBMS service discovery currently requires the UE monitor its current cell to discover the beginning of a service, as signaled by an MCCH change notification sent over PDCCH, and MAC control element MBMS Scheduling Information (MSI). On-going service information is currently provided in MCCH and MSI. However, each UE may be limited to monitoring its current camped cell if it is in Idle mode or current serving cell (or primary cell) if it is in connected mode.

Issues with Service Discovery in Multi-Frequency, Carrier Aggregation, or Single Frequency Deployments Current approaches to eMBMS service discovery generally have certain limitations. For example, the UE may be unable to discover MBMS services offered on other available adjacent cells (which as defined herein includes other frequencies on the serving eNB), without switching to another adjacent cell. The UE cannot monitor or discover the service that is available other than on the current serving cell (in the multi-frequency context) or primary cell (in the carrier aggregation context). The UE cannot determine when a scheduled service will be broadcast, or on which cell, frequency, or component carrier a scheduled service will be broadcast. Similar issues may arise with multi-frequency deployment and carrier aggregation deployment alike.

The techniques disclosed herein may be used to resolve these service discovery issues for both multi-frequency and carrier aggregation deployment. These solutions may be adopted for use with all types of neighboring cell, whether operating on the same frequency or on different frequencies; for both carrier aggregation-capable and non carrier aggregation-capable UEs; and for both on-going and scheduled future MBMS service. The proposed techniques are not limited to use within a specific geographic location.

Existing approaches for resolving similar service discovery issues in carrier aggregation are subject to certain disadvantages. In one approach, frequency information for each MBMS-providing carrier component should be transmitted on other component carriers. In another approach, both frequency and MBMS relevant information for each MBMS-providing carrier component should be transmitted on other component carriers. Similarly, it has been proposed that frequency information and MCCH notification of each MBMS-providing carrier component should be transmitted on other component carriers. The foregoing approaches may suffer from the disadvantage of requiring the UE to receive and process System Information Block (SIB) data and MCCH data more frequently than would be desirable. Yet another alternative approach calls for the frequency information for each MBMS-providing component carrier and all MBMS service identifiers included in the Temporary Mobile Group Identity (TMGI) list to be forwarded on other component carriers. This approach, however, may result in excessive overhead on the primary cell. Various aspects of the present disclosure avoid the drawbacks of these existing approaches.

MBMS Service Announcement & Discovery

Figure 30:
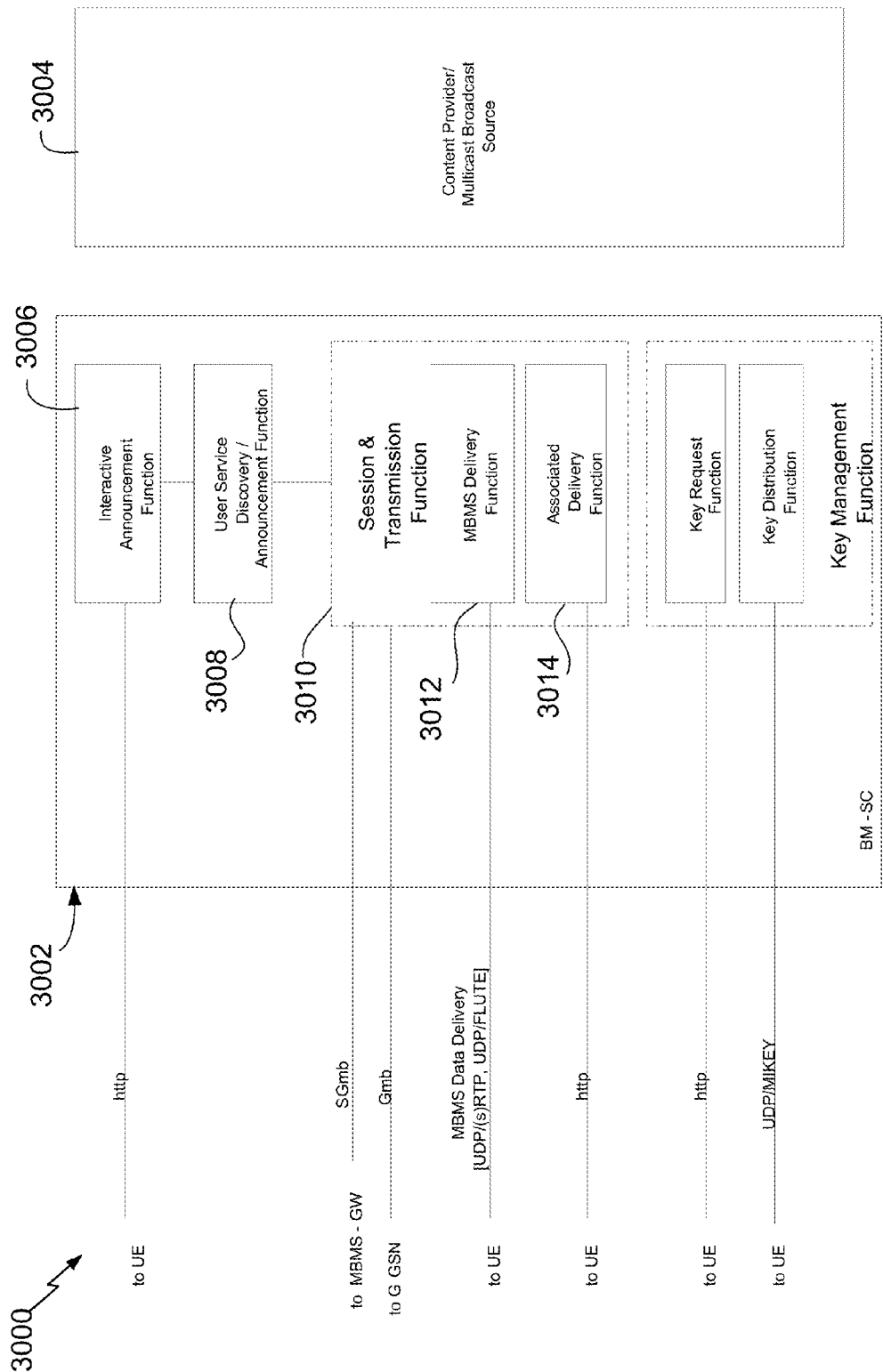
FIG. 30 is a block diagram illustrating functional components of a network entity for providing broadcast services.

Prior to describing various aspects of the present disclosure in more detail, certain details of eMBMS service discovery in single-frequency contexts (e.g., MBSFN) will be summarized below, with reference to FIG. 30 showing functional aspects 3000 of a BM-SC 3002. During network system initialization, each cell may be configured with an MBSFN area identifier and MBMS service area lists. Each MBMS service may be uniquely identified by a corresponding TMGI, which may comprise a PLMN identifier plus a service identifier. The BM-SC 3002 holds data mapping MBMS services to MBMS service areas.

After initialization, the BM-SC 3002 transmits a service guide, also referred to herein as a service announcement, using either unicast or multicast signaling. For example, a UE may access a web site to request a service guide, and receive the guide via a unicast transmission. In the alternative, the BM-SC may provide the service guide via multicast/broadcast using a Multicast Traffic Channel (MTCH). Content may be provided to the BM-SC 3002 from a content provider or source 3004.

An MBMS user service discovery/announcement 3008 may be used to advertise MBMS streaming and MBMS download user services and user service bundles in advance of, and potentially during, the user service sessions. The MBMS user services may be described by metadata (objects/files) delivered using the session and transmission function, or using interactive announcement functions. The MBMS session and transmission function 3010 transfers the actual MBMS session data to a group of UEs using either an MBMS delivery function 3012 or an associated delivery function 3014, such as unicast bearer services. An interactive announcement function 3006 may provide an alternative method for providing service descriptions to the UE using HTTP, or service descriptions may be distributed through other interactive transport methods.

Figure 31:
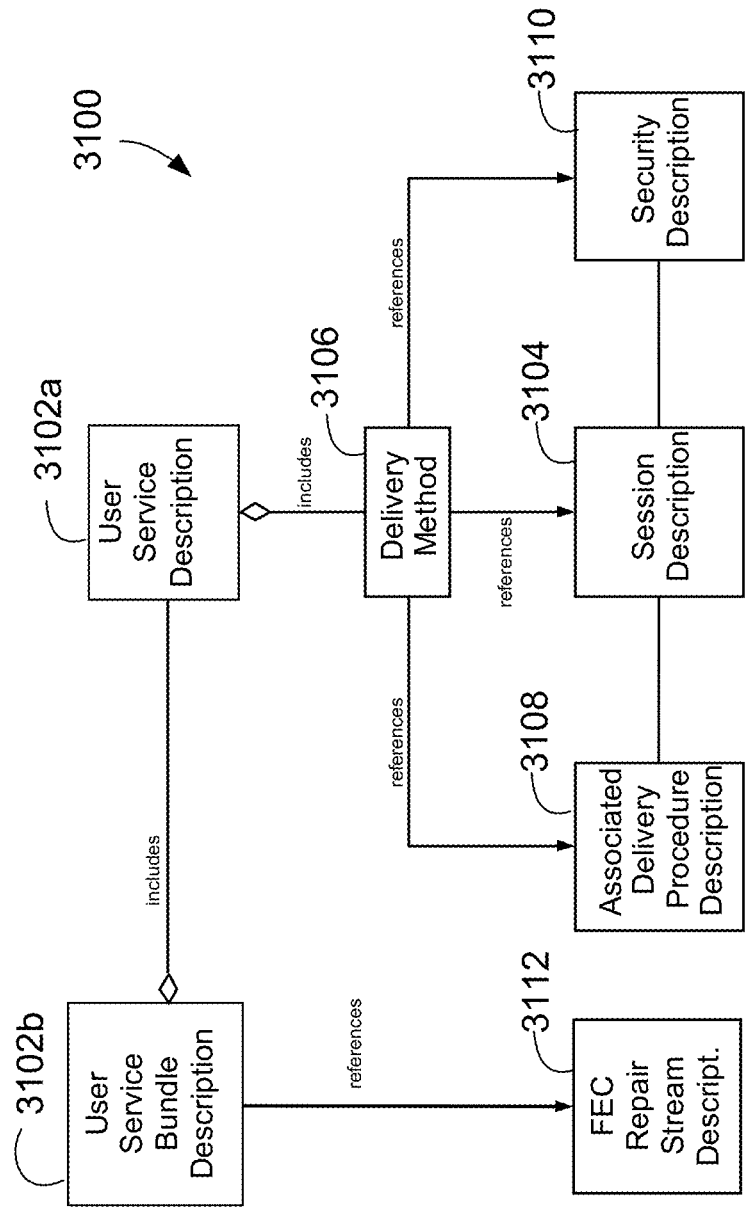
FIG. 31 is a block diagram illustrating functional components in Unified Modeling Language (UML) form of a metadata fragment for MBMS user service discovery/announcement.

MBMS user service discovery/announcement involves the delivery of fragments of metadata to many receivers in a suitable manner. The metadata itself describes details of services. Referring to FIG. 31, metadata 3100 may be a single uniquely identifiable block of metadata and may include various metadata fragments, each of which may be defined as a single identifiable block of metadata. For example, a single Session Description Protocol (SDP) file may be a metadata fragment. The metadata 3100 may include a first metadata fragment describing details of a single MBMS service 3102a or a bundle of MBMS user services 3102b, a second metadata fragment 3104 describing details of MBMS user service sessions, a third metadata fragment 3106 describing details of associated delivery methods and procedures 3108, a fourth metadata fragment 3110 describing details of service protection, and a fifth metadata fragment 3112 describing details of a Forward Error Correction (FEC) repair data stream.

Referring again to FIG. 30, a service announcement may be made using an MBMS Delivery Function (bearer) 3012. To receive a service announcement the client obtains session parameters for a related MBMS download session transport. This may be achieved by storing the related session parameters in the MBMS UE, or using Open Mobile Alliance (OMA) push delivery. In the alternative, a user service announcement may be made using an interactive announcement function 3006. User service descriptions may be transported to the UE using HTTP or other interactive transport methods. A BM-SC 3002 may provide the service descriptions on request. Aggregated MBMS service announcement documents may be used with the interactive announcement functions. UEs may be configured to support the disassembly of aggregated MBMS service announcement documents. A user service announcement may be made using point-to-point push bearers, for example, SMS bearers, or HTTP push bearers. This may have several characteristics that differ from user service announcement over a MBMS bearer.

eMBMS Service Discovery in Single Frequency

When an MBMS session is about to start, BM-SC sends out session start over an eMBMS control plane. A session start command includes a TMGI for the service and an MBMS service area identifier. The command originates from the BM-SC, and may be passed through SG-mb, Sm, M3, M2 interfaces and reaches the MCE.

Figure 32:
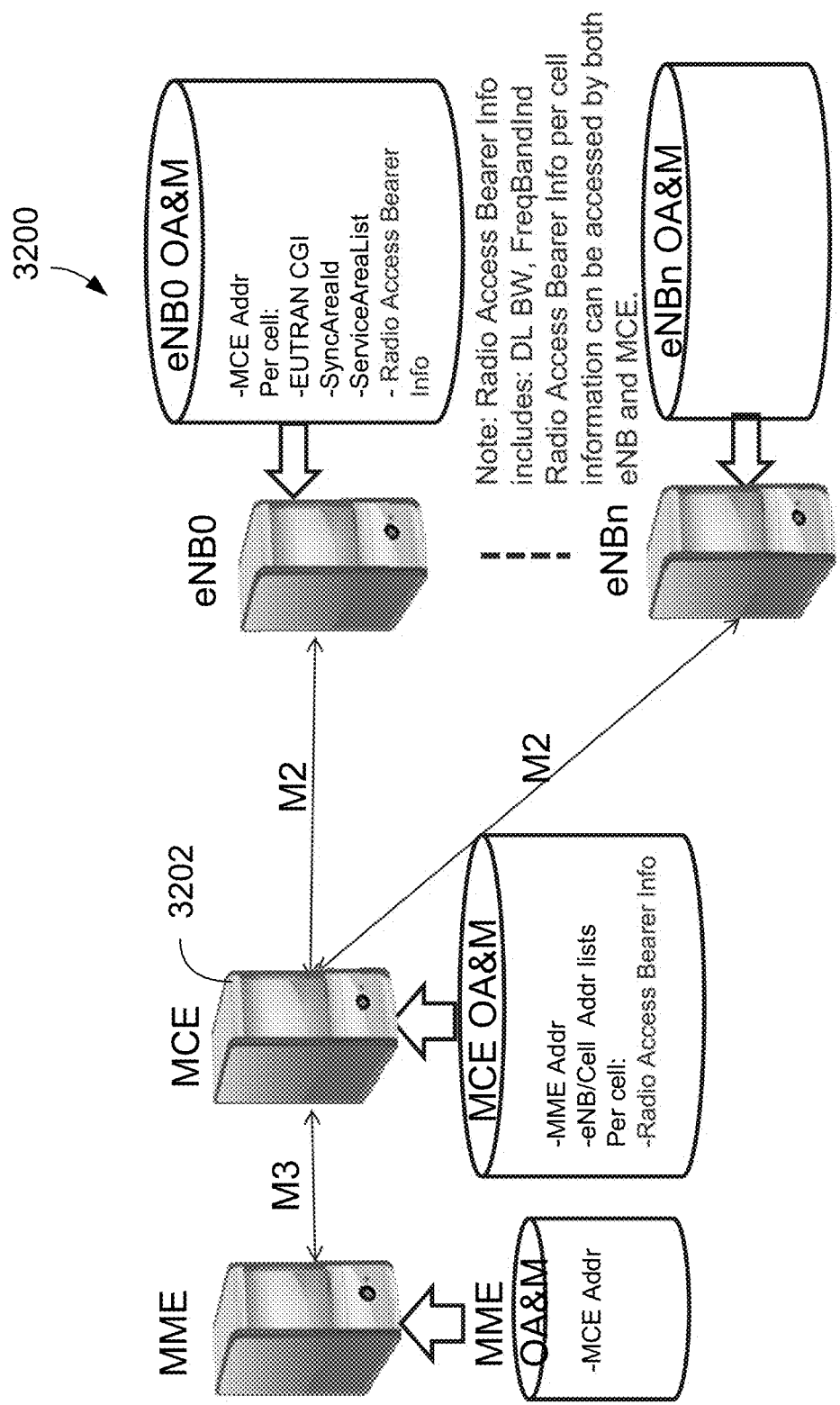
FIG. 32 is a block diagram illustrating components of a network subsystem for coordinating broadcasts.

Referring to FIG. 32, showing an MCE subsystem 3200, the MCE 3202 may determine an impacted MBSFN area identifier and corresponding cells. The MCE 3202 may then send a session start signal to the appropriate cells $eNB_0$ to $eNB_n$. Upon receiving a session start signal, the cell can receive MBMS data over an M1 interface using an MBMS Internet Protocol (IP) multicast address. The MCE 3202 sends MBMS Schedule Information (MSI), to enable $eNB_0$ to $eNB_n$ to transmit PDCCH and updated MCCH at the appropriate times.

Figure 33:
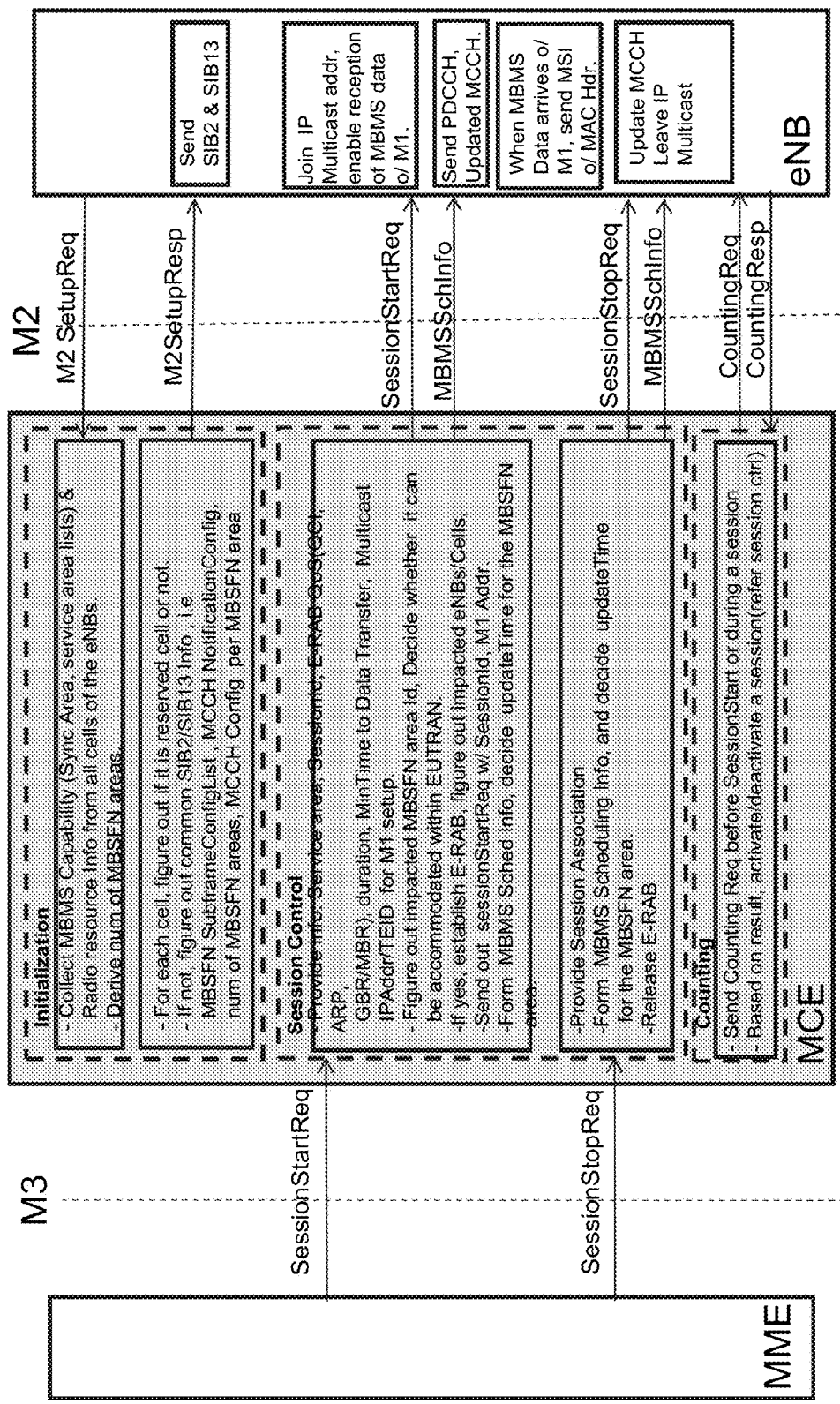
FIG. 33 is a block diagram illustrating functional components of a broadcast coordinating network entity and connected network components.

FIG. 33 shows further details summarizing functionality of the MCE related to MBMS control. For example, the MCE may perform an initialization function, a session control function, and a counting function as described in more detail in FIG. 33. The MCE may receive messages from the MME via the M3 interface, and transmit messages to the eNB via the M2 interface. Examples of such messages and their relation to the functions described are also shown in FIG. 33 using the labeled arrows. FIG. 34A shows an example of a message definition for an M2 setup request message from an eNB to an MCE. FIG. 34B shows an example of an M2 setup request message specifying an MCCH related Broadcast Control Channel (BCCH) configuration item. FIG. 34C shows an example of an M2 setup request message specifying an E-UTRAN Cell Global Identity (CGI). FIG. 35A shows an example of an M2 setup response message. FIG. 35B shows an example of an M2 setup response message for an MCCH related BCCH configuration item. FIG. 36 shows an example of an M2 session start response message.

By monitoring PDCCH and MCCH, the UE discovers the session start. Using schedule information decoded from the MSI, the UE is able to decode the corresponding MBMS service broadcast from the cell on which it is camped or connected. As previously noted, current approaches do not provide an efficient way for service discovery on alternative adjacent cells.

New Approaches to Service Announcement Discovery

According to aspects herein, the network provides enough MBMS related information to the UE, through one of a combination of a service guide or announcement, cell broadcast message, or SIB, such that the UE can determine which cell will provide a service of interest and at what time the service of interest is available.

A First Alternative Embodiment

According to a first alternative, the UE discovers an MBMS service of interest by checking MBMS service area information. Each cell broadcasts the MBMS service areas that it supports. Every cell knows the MBMS service areas the cell supports, and an identifier for each supported service area may be stored in the format of MBMS-Service-Area AVP with type OctetString.

There may be up to "N" number of MBMS service areas in the network system. Assuming that N is not greater than 256, each MBMS service area may be assigned an unique index, herein called a Service Area Index, not to be confused with a Service Area Identity (SAI). Values for an SAI range from zero to $2^{16}-1$; in comparison, values for the Service Area Index as described herein may have a distinct (and smaller) range, for example from zero to 255. The Service Area Index is selected such that there is a one to one mapping between MBMS-Service-Area AVP OctetString values to Service Area Index values. Further details are provided, by way of example, in the section below titled "SERVICE AREA INDEX." The Service Area Index may be described as a hash of the MBMS SAIs for available MBMS service areas served by a particular cell. The Service Area Index is used to compress the information bits passed from the network to the mobile entity (UE).

Both the BMSC and Cell (eNB) have map information describing a one to one mapping between MBMS service area AVP OctetString value to Service Area Index through OAM, using existing interfaces for configuring MBMS service areas. Each cell's Service Area Index list may be appended in SIB13 through a 256(N)bits bitmask, with each Service Area Index status represented by one bit, for example, enabled(1) or disabled(0). The total length of the Service Area Index may be, for example, 32 bytes, determined from a maximum number of service areas (e.g., 256) divided by 8 bits per byte. In addition, the Service Area Index list for a neighbor cell together with the neighbor's FreqbandIndicator(0 . . . 64) and cell identifier may be provided to a mobile entity in SIB 13 or a some other SIB.

The UE may determine which MBMS service areas the current cell supports by decoding SIB 13. The UE may determine which MBMS service areas the neighbor cell supports as well, based on neighbor cell information included in SIB 13.

In another aspect of the first alternative, when the BM-SC provides a service guide, in addition to the TMGI, the BM-SC may also provide the associated Service Area Index value for each MBMS service, for the cell that the Service Area Index pertains to. For example, the BM-SC may pass a TMGI's corresponding Service Area Index in MBMS user services session description metadata together with the TMGI (mode of MBMS bearer per media). The Service Area Index may be generated by an eNB, MCE, MME, or other network entity.

Using the Service Area Index for a service of interest and the current cell provided by the BM-SC, the UE may determine whether the current cell is providing or will provide that service, using the Service Area Index provided from the eNB in SIB 13 or elsewhere. For example, if the BM-SC provides an index value of "2" for particular MBMS service, the mobile entity looks up that index value and reads the status bit indicating "enabled" or "disabled." If the current cell does not provide the service (e.g., status is set to "disabled"), the UE may check one or more Service Area Indices for neighbor cells, until it identifies one or more neighbors in which the service is enabled.

However, if the UE does not possess a Service Area Index for one or more neighbors, the UE may search for a neighbor providing the desired service using a different procedure. For example, if the UE is in IDLE mode, it may initiate one or more cell reselection procedures until it camps on a cell providing the desired service. According to a modified cell reselection criteria, the eNB selecting the neighbor may also use information from a neighbor MBMS Service Area Index and cell identifier to select a target cell providing the desired service. For further example, if the UE is in a connected mode, it may request a handover to a cell providing the desired service, using a modified handover procedure. In addition to providing signal measurements as hand off triggering events, the UE may also supply service discovery information to trigger a handoff or for selection of a target cell. For example, the UE may include MBMS service related information such as a TMGI, Service Area Index or cell identifier in an existing measurement report or other message for an eNB.

If a UE in IDLE mode is able to determine, using a Service Area Index for a neighbor cell, one or more neighbors in which the desired service is enabled, the UE may perform cell reselection to camp on a cell providing the desired service. The UE and eNB may use a modified cell reselection criteria to select a cell within a requested MBMS service area and with the strongest cell reselect signal. If the UE is in connected mode, it may similarly request a handover to a cell providing the desired service, using a modified handover procedure. Besides providing signal measurements as hand off triggering events, the UE may also supply MBMS service discovery information to an eNB to trigger a handoff or for selection of a target cell, as noted above. In either idle or connected modes, if the service start time is relatively far in the future, the cell switch procedure may be postponed until the current time is close to a known service start time, for example, when triggered by an internal clock. For further example, a UE may request a hand over to an adjacent cell several minutes or seconds before a desired service is scheduled to begin on the adjacent cell.

Service discovery on adjacent cells (e.g., frequencies, carrier components, or base station) may thereby be enabled using minimal overhead. Advantageously, the described embodiment should be relatively easy to implement. This method may require minor modifications at various layers of existing protocols, including the service guide, System Information Block (SIB) and UE operational programming Service Area Index Various methods may be used to hash a list of MBSM Service Area Identifiers to obtain a Service Area Index. In an aspect, a network entity, for example an eNB, sorts SAIs for MBMS services that the entity provides according to a first octet of an identifier. For example, the eNB may sort SAIs in ascending or descending order, to obtain a sorted list of SAIs. The sorted list may contain duplicate entries, indicating that the corresponding services are offered in the same service area at different times. The network entity may strip duplicate SAIs from the sorted list to obtain a condensed sorted list. Then, the network entity may assign an index number for each record in the condensed sorted list. For example, the entity may initiate the index number starting at zero and increment the index number by one for each successive record in the condensed sorted list. The resulting index may be a list of numbers from zero to "N," representing "N+1" unique MBMS services areas provided by a particular MBMS deployment. The resulting Service Area Index may then be associated with an identifier for the relevant cell and used by the UE to determine whether the identified cell offers a particular service, using techniques as described elsewhere herein.

A Second Alternative Embodiment

According to a second alternative embodiment, the UE determines a status for a service of interest by checking an MBSFN area identifier (MBSFNAreaID). Currently, every cell broadcasts all the MBSFNAreaIDs it supports in SIB 13 according to conventionally supported protocols. However, unlike conventional practices, when the BMSC provides a service guide, in addition to the TMGI, the BMSC may also provide the associated Service Area Index for each service, as described above for the first alternative embodiment. In addition, the MCE determines a map of cell identifiers to MBSFNAreaIDs during an M2 setup request and M2 setup response procedure. The MCE may also determine a map of MBSFNAreaIDs to MBMS service areas for all the eNBs that the MCE serves. For a more detailed example of such mapping, see the section below titled "MAPPING AN MBSFN AREA ID TO MBMS SERVICE AREAS/CELL LIST."

Then, a network entity (e.g., MCE or eNB) may provide the map of MBSFNAreaIDs to MBMS service areas to the UE. The network entity may also provide a map of MBSFNAreaIDs to cell identifiers. Using these maps, the UE may determine which MBSFN area and cell is providing, or will be providing, an MBMS service of interest to the UE.

In an aspect, the MCE provides the map information to the BM-SC, and the BM-SC provides the map information to the UE with MBMS service guide/announcement information. The BM-SC may use a MBMS session and transmission function, or an interactive announcement function to provide this information to the UE. For example, the BM-SC may provide the MBSFNAreaIDs to MBMS service areas map information in the MBMS user services bundle description, and the TMGI's corresponding service area in an MBMS user service session description. The MBMS session and transmission function transfers the actual MBMS session data to a group of MBMS UEs, using either MBMS bearer services or unicast bearer services. The interactive announcement function provides service descriptions to the UE using HyperText Transport Protocol (HTTP) or other interactive transport method.

Currently, no interface is defined in LTE or similar wireless communications standards to enable direct communication between the MCE and BM-SC. Therefore, the described information can be provided through existing M3, Sm and SG-mb interfaces by using new messages.

In an alternative aspect, the MCE may pass the map information to the eNBs, which may pass the information to UE over the air. The map information may be relatively static, that is, should not require frequent updates. In such cases, the map information may be transmitted to the UE in a SIB. In the alternative, the map information may be sent as a dedicated unicast message using a UE request, network response sequence, and stored by the UE until updated information is provided.

The transmission mode selected for transmitting the map information may depend on the amount of information to be transmitted. In a scenario providing a MBSFNAreaID list to service area list mapping for the whole system, map information for up to 256 MBSFNAreaIDs, each with up to 256 service areas, may need to be transmitted. Such a map may require up to 256*(1 byte+256bits)=8448 bytes. Such a quantity of data may exceed capacity of a SIB. When this much information is provided, the UE can locate the MBSFN Area ID for any service of interest, system wide. In a another scenario where the MBSFNAreaID list to service area list mapping is provided only for the current cell, up to 8 MBSFNAreaIDs, each with up to 256 service areas may be provided, having a lower data requirement of 8*(1+32) =264 bytes. This smaller amount of data may be transmitted in a SIB. In this scenario, the UE may be limited to determining whether the serving cell provides an MBMS service of interest.

As in the first embodiment, when a user indicates an interest in a particular service, the UE can discover whether the serving cell is providing or will provide that service or not, using the mapped information. If the serving cell does not provide the desired service, the UE may request assignment to another cell where the service is available, as previously described.

Mapping an MBSFN Area ID to MBMS Service Areas/Cell List

The following description is provided merely by way of example, and not by way of limitation. Given a list of cell identifiers, for example, Cell[i] where "i" goes from zero to "n" and for each Cell[i], there exists a number "N" of MBMS service areas typically less than or equal to 256, such that for all cells Cell[i] there exists an aggregate matrix of MBMS service areas MBMS SA[i][0], MBMS SA[i][1], . . . MBMS SA[i][N−1] as input for a mapping function. The mapping function should operate to map the MBSFNAreaIDs for MBSFM areas to the MBMS service area list. The mapping function should further map the cell identifiers to the MBMSFNAreaIDs. The service area identifier may be in index (one octet) or AVP (octet string) format.

The map output may be generated as follows. First, a comprehensive list of MBMS service areas served by the MCE may be identified, for example by initializing a 256 bits bitmap, looping through all cell and service area identifiers, and marking the service area in the bit mask. Second, a map between service area identifiers and cell identifiers may be defined by looping through the overall service area list, and for each service area by looping over the cell list. The map may record a list of cell identifiers for cells that support the service area. Third, a map between MBSFNAreaIDs and service areas may be defined by looping through the overall service area list, assigning an MBSFNAreaID to a service area with a different cell list, and recording the MBSFNAreaID to service area list mapping. Fourth, MBSFNAreaID may be mapped to each cell identifier by looping though the MBSFNAreaID list to record each MBSFNAreaID mapped to all cell identifiers that the MBSFNAreaID is associated to. Fifth, map the cell identifier list to each MBSFNAreaID, by looping through the cell identifier list, to record each identifier to all MBSFNAreaIDs it is associated to.

For example, assume an input wherein the MCE serves eNB0, eNB1, eNB2, and each eNB services cells and service areas as follows: eNB0 has two cells, Cell0_0 having three service areas 1,2,3, and Cell0_1 having three service areas 1,2,3; eNB1 has one cell Cell1_0 having three service areas 2,3,4; eNB2 has two cells, Cell2_0 having three service areas 4,5,6 and Cell2_1 having three service areas 4,5,6. Given this input, an MCE executes the described mapping algorithm to determine mapping information, as follows. After the first step, the MCE obtains an overall SA list: {SA1, SA2, SA3, SA4, SA5, SA6}. After the second step, the MCE obtains a map as follows: SA1—Cell0_0, Cell0_1; SA2—Cell0_0, Cell0_1, Cell1_0; SA3—Cell0_0, Cell0_1, Cell1_0; SA4—Cell1_0, Cell2_0, Cell2_1; SA5—Cell2_0, Cell2_1; and SA6—Cell2_0, Cell2_1. After the third step, the MCE obtains a map as follows: MBSFNArea0: SA1; MBSFNArea1: SA2,SA3; MBSFNArea2: SA4; and MBSFNArea3: SA5,SA6. After the fourth step, the MCE obtains a map as follows: Cell0_0/Cell0_1: MBSFNArea0, MBSFNArea1; Cell1_0: MBSFNArea1, MBSFNArea2; and Cell2_0/Cell2_1: MBSFNArea2, MBSFNArea3. After the fifth step, the MCE obtains a map as follows: MBSFNArea0: Cell0_0, Cell0_1; MBSFNArea1: Cell0_0, Cell0_1, Cell1_0; MBSFNArea2: Cell1_0, Cell2_0, Cell2_1; MBSFNArea3: Cell2_0, Cell2_1.

Accordingly, and for further example, if a UE wants to monitor a service in Service Area 3, the UE can determine that it needs to monitor MBSFNArea1. If MBSFNArea1 is not supported by the current cell, the UE can use the map to identify a cell in Service Area 3, in this case the UE may reselect or request handoff to switch to a target cell in MBSFNArea 1, i.e. eNB0 or eNB1 cells.

A Third Alternative Embodiment

According to a third alternative embodiment, a UE may acquire a program start time for a desired eMBMS service and duration of the service, using a service guide. The UE may then scan available adjacent cells to detect the eMBMS service, starting at a time determined in relation to the program start time. This approach may resemble conventional monitoring or any of the first, second, fourth or fifth alternative embodiments described herein, except that monitoring is limited to a schedule-based time window. This approach may be useful for conserving power and other resources, and preventing unnecessary switching to alternative cells, as compared to approaches where scanning is performed more frequently. In addition, the approach may maximize utilization of a best available cell by preventing a UE from switching earlier than necessary to a sub-optimal cell to obtain a desired eMBMS service.

While in idle state, if the UE does not receive any information mapping eMBMS service to network cells or frequencies from any network entity, the UE may scan available frequencies to discover a desired service on an adjacent cell. The UE may perform the scan upon powering up to locate and camp on a cell providing a desired eMBMS service. In the alternative, or in addition, if at any time after powering up the UE determines that a desired eMBMS service is not available on the cell on which the UE is camped, the UE may perform the scan starting at a time determined using a program start time for the desired service. That is, the UE may wait before performing a scan until a relatively short time before the program is scheduled to start, or may scan immediately if the desired program has already started. Once the UE has determined an adjacent cell that provides the service it is looking for, it may raise a priority of a selected cell providing the desired service, thereby triggering a cell reselection procedure to cause the UE to camp on the selected cell to obtain the desired service.

When the UE is in a connected state, the serving base station may provide a list of candidate neighbor cells to the UE. The UE may then scan the neighbors identified on the provided list in any suitable order, for example in descending signal strength order, until the UE identifies a neighbor cell that provides or will be providing the desired eMBMS service. The UE may perform this scan either in a measurement gap or at anytime if the UE is a multi-frequency capable device. The UE will send the measurement report to the serving base station. The UE may also indicate a cell with desired eMBMS service to the serving base station. In the alternative, the UE may increase a value of a measurement reported in the measurement report for a selected neighbor cell providing the desired eMBMS service for the duration of the service, provided that the signal strength from the selected cell is above a defined threshold. In response to receiving a designation of the selected cell, or in response to receiving the increased measurement for the selected cell, the serving base station may then execute procedures for completing a handover of the UE to the neighbor cell providing the desired eMBMS service.

A Fourth Alternative Embodiment

According to a fourth alternative embodiment, TMGI group identity is used to provide information from a network entity such as a BM-SC to a mobile entity. The BM-SC may determine sets of service identifiers (e.g., a TMGI group) for eMBMS services to be broadcast in an area, independently of MBSFN service areas. As used herein, a "TMGI group" refers to a new identity for a group of TMGIs that will be transmitted using the same cell. Services that are 'commonly watched together' may be part of the same "TMGI group", so that a single receiver UE is able to obtain other services on the same cell. That is, each set of service identifiers indicates a group of eMBMS services to be transmitted on a respective one of the adjacent cells. The TMGI group information should be relatively static in nature. Many TMGI groups may be transmitted on the same cell, but no two TMGIs in the same group will be transmitted on different adjacent cells. As noted, TMGI grouping may be independent of MBSFN areas.

In an aspect, the BM-SC may provide the sets of service identifiers (e.g., TMGI group) directly to a mobile entity using a service announcement procedure. In addition, the BM-SC may provide the sets of service identifiers to a base station servicing the mobile entity, via an M3 and M2 interfaces. The base station may then transmit information to the mobile entity mapping each of the sets of service identifiers to a respective one of the adjacent cells. As used herein, "adjacent cells" may include one or more of frequencies, carrier components or neighbor cells. The information provided to the mobile entity may be provided in SIB 13. Techniques for compacting or compressing the map information to be provided in SIB 13 may be used, for example such as described herein.

Using the transmitted information from the BM-SC, the mobile entity can determine a TMGI group for each TMGI. Using the information from the eNB, the mobile entity can determine the adjacent cell for each TMGI group. Thus, the mobile entity can determine the adjacent cell for any MBMS service that can be identified by a TMGI. Once it has determined the adjacent cell, the mobile entity may perform operations as described elsewhere herein to obtain a desired MBMS service on its current cell or on an adjacent cell.

A Fifth Alternative Embodiment

According to a fifth alternative embodiment, information mapping eMBMS services to adjacent cells may be provided using a hashing technique. According to this embodiment, the network advertises a count of adjacent cells that carry respective ones of the eMBMS services. For example, if a network has a total of "N" adjacent cells providing eMBMS services, a network entity advertises the number "N" identified as a adjacent cell count to mobile entities.

In addition, the network entity generates a hash of information mapping each of the service identifiers (e.g., TMGIs) to a corresponding identifier for the adjacent cells. Although any suitable hash function may be used, this hash function operates on input parameters that include the advertised count of adjacent cells and the service identifiers to provide the mapping information as a hashed output. Examples of hashing methods are described herein, which may be adapted for use with this embodiment. The network provides the hashed output to mobile entities, from which an adjacent cell used for transmitting any one of the counted service identifiers can be determined by the mobile entity.

The mobile entity uses the advertised count and an identifier for a desired eMBMS service to perform a reverse hashing procedure and thereby determine an adjacent cell that provides the desired eMBMS service. One it has determined the adjacent cell, the mobile entity may perform operations as described elsewhere herein to obtain a desired MBMS service on its cell or on an adjacent cell.

Further Methodologies and Apparatus Examples

Methodologies that may be implemented in accordance with the disclosed subject matter under the topical heading "EMBMS SERVICE DISCOVERY IN MULTI-FREQUENCY, CARRIER AGGREGATION AND SINGLE FREQUENCY DEPLOYMENT" may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

In the examples below, references to Multimedia Broadcast Multicast Service (MBMS) should be understood as also encompassing evolved MBMS (eMBMS). For example, "MBMS" as used in any method, apparatus or operation described below may be replaced by "eMBMS" throughout to describe an alternative method, apparatus or operation for eMBMS instead of MBMS. It should be appreciated, that MBMS and eMBMS represent distinct protocols and therefore methods and apparatus for MBMS should generally be implemented separately from methods and apparatus for eMBMS.

Network Entity/BM-SC

FIGS. 37A-G illustrate related methodologies for facilitating discovery of Multimedia Broadcast Multicast Service (MBMS) or evolved MBMS (eMBMS) over multiple adjacent cells from a network entity of a wireless communications system (WCS), encompassing at least the alternative embodiments 1-2 and 4-5 discussed under the Alternative Embodiment headings in the preceding sections. The transmission may be broadcast so that multiple mobile devices may receive it. The network entity may comprise a BM-SC as shown at 2912 of FIG. 29. The broadcast protocol may be downlink only, such that any mobile device receiving the broadcast transmission does not provide feedback to the BM-SC. The method 3700 shown in FIG. 37A may include, at 3702, transmitting a data element configured for a mobile entity within a WCS area, the data element including service identifiers mapped to corresponding cell identifiers to indicate respective MBMS services to be broadcast in the WCS area on adjacent cells identified by respective ones of the cell identifiers. As noted previously, an "adjacent cell" may refer to any one or all of a frequency, carrier component, or base station. As such, a "cell identifier" may include one or more of an identifier for a frequency, carrier component, or neighbor cell. Services to be broadcast may include services currently being broadcast, services scheduled for broadcast and not yet being broadcast, or both. The method 3700 may further include, at 3704, broadcasting the MBMS services within the WCS area using the adjacent cells previously indicated in the data element. One or more network entities in addition to, or instead of, the BM-SC may perform or participate in the operations of transmitting a data element 3702 or broadcasting a MBMS service 3704. For example, these operations may also involve participation by a base station.

Additional operations 3705, 3715, 3725, 3735, 3745, and 3755 for facilitating discovery of MBMS are illustrated in FIGS. 37B-G, for performance by the network entity or entities. One or more of these operations 3705, 3715, 3725, 3735, 3745, or 3755 may optionally be performed as part of method 3700. The elements 3705, 3715, 3725, 3735, 3745, or 3755 may be performed in any operative order, or may be encompassed by a development algorithm without requiring a particular chronological order of performance. Operations illustrated in each figure are independently performed and not mutually exclusive. Therefore any one of such operations may be performed regardless of whether another downstream or upstream operation is performed. For example, if the method 3700 includes at least one of the operations 3705, then the method 3700 may terminate after the at least one operation, without necessarily having to include any subsequent downstream operation(s) that may be illustrated. Each of the operations 3705, 3715, 3725, 3735, 3745, and 3755 may pertain to a different one of the embodiments described above, although certain operations, for example the operations 3735 illustrated in FIG. 37E, pertain generally to all embodiments.

Referring to FIG. 37B, the method may include additional operations 3705 pertaining to the first alternative embodiment. The additional operations 3705 may include, at 3706, providing a service area index to the mobile entity indicating MBMS service areas supported by at least one of a cell serving the mobile entity (serving cell) or a neighbor cell). For example, the operations 3705 may further include, at 3708, providing the service area index in System Information Block (SIB) 13. For example, the service area index may be provided by appending the index through a bit mask, wherein each service area is indicated as enabled or disabled using a corresponding bit. The base station may provide the different service area indices each paired to a corresponding frequency (or other identifier) for respective cells. For example, a first position in the SIB may correspond to a first predetermined frequency, and second position to a second frequency, and so forth. The operations 3705 may further include, at 3710, providing a second service area index to the mobile entity indicating MBMS service areas supported by an adjacent cell that is not serving the mobile entity, for example, a neighboring base station. That is, the network entity may prepare and provide service area indices for base stations (cells) not currently serving the mobile entity. These additional indices may be selected for neighbor cells from service area indices prepared for the WCS, or may include all indices without regard for whether the indices pertain to a neighbor cell. Where the neighbor cell uses the same frequency or frequencies as the serving cell for MBMS transmissions (i.e., is an intra-frequency neighbor), the base station may provide a single service area index to the mobile entity pertaining to both the serving cell and intra-frequency neighbor. Where the neighbor cell uses one or more different frequencies for MBMS transmissions (i.e., is an inter-frequency neighbor), the base station may provide different service area indices pertaining to both the serving cell and intra-frequency neighbor. The service area index may be identified by the frequency of the inter-frequency neighbor.

Referring to FIG. 37C, the method may include additional operations 3715 pertaining to the first or second alternative embodiments. The additional operations 3715 may include, at 3712, including the service area index in the data element with a service guide for transmission to the mobile entity, wherein the service guide includes a unique service identifier for each MBMS service in the MBMS service areas, and the data element associates each unique service identifier with a service area index for a corresponding one of the MBMS service areas. In the alternative, or in addition, the service guide may be configured to include frequency information defining one or more frequencies on which respective MBMS services will be broadcast. The additional operations 3715 may include, at 3714, transmitting the data element comprising the service area index in MBMS user services session description metadata together with its associated unique service identifier.

In an alternative pertaining to the second embodiment, the additional operations 3715 may include, at 3716, mapping MBSFN area identifiers to the MBMS service areas to obtain an MBSFNAreaID/MBMS service area map. Furthermore, the additional operations 3715 may include, at 3718, providing the MBSFNAreaID/MBMS service area map to the mobile entity. The additional operations 3715 may further include, at 3720, providing information to the mobile entity mapping the MBSFN area identifiers to cell identifiers.

Figure 37D:
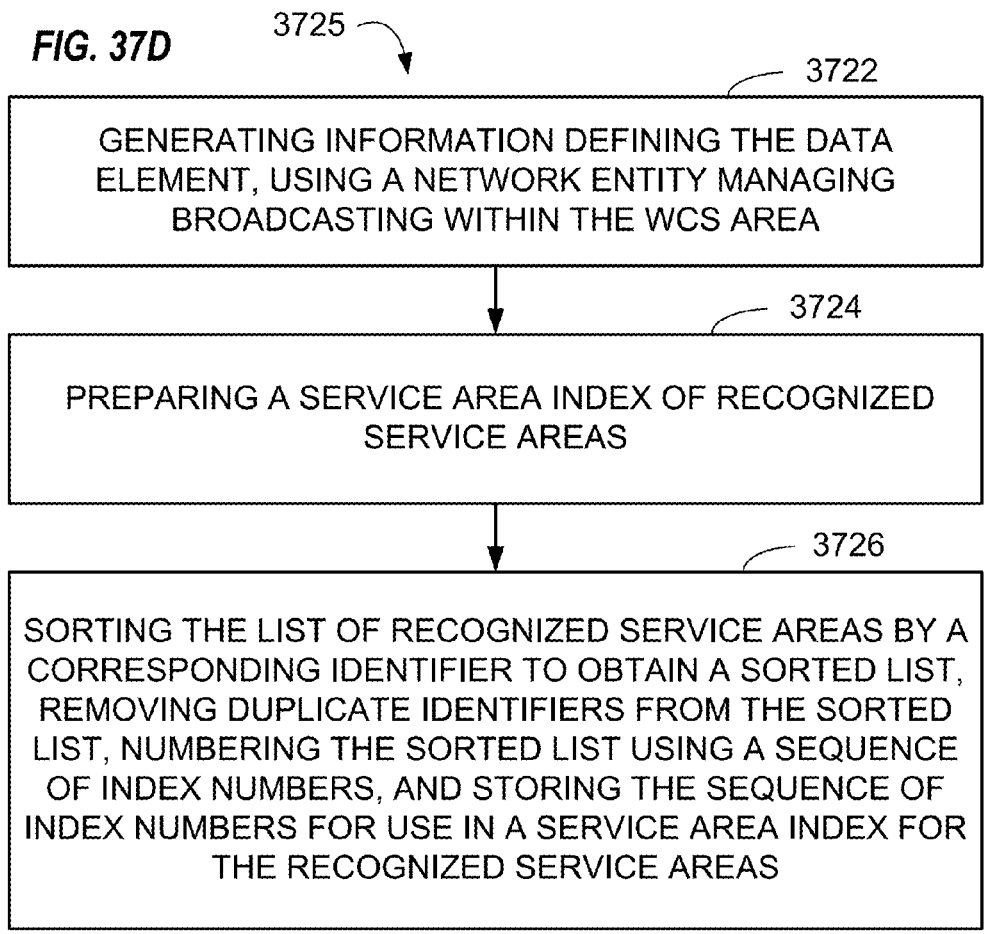

Referring to FIG. 37D, the method may include additional operations 3725 pertaining to the first or second alternative embodiments, for generating a service area index. The additional operations 3725 may include, at 3722, generating information defining the data element, using a network entity managing broadcasting within the WCS area. Generating the information defining the data element 3722 may include, at 3724, preparing a service area index of recognized service areas. The service area index may be prepared by hashing a list of the recognized service areas. The additional operations 3725 may include, at 3726, preparing the service area index by sorting the list of recognized service areas by a corresponding identifier to obtain a sorted list, removing duplicate identifiers from the sorted list, numbering the sorted list using a sequence of index numbers, and storing the sequence of index numbers for use in a service area index for the recognized service areas. A more detailed example of generating a service area index has been provided in the preceding sections.

Figure 37E:
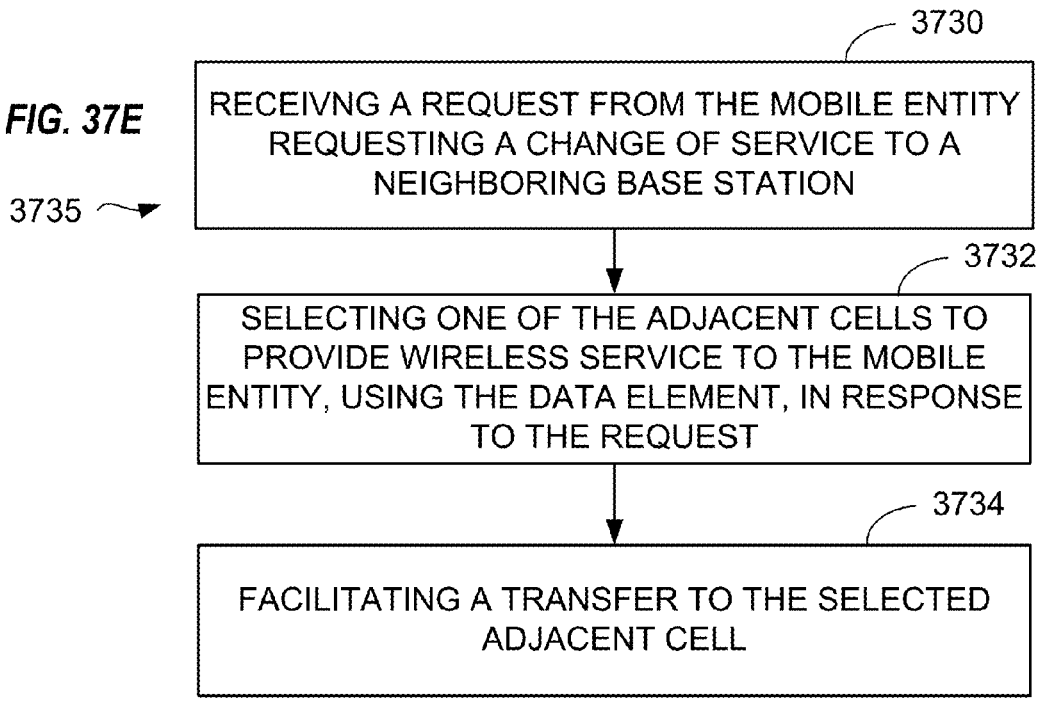

Referring to FIG. 37E, the method may include additional operations 3735 pertaining to all embodiments, for using MBMS service information in a transfer of service to a neighbor base station. These operations 3735 represent an application of mapping information made available to a mobile entity using a method 3700 or similar method, and may be performed in conjunction with, or independently of, such methods. The additional operations 3735 may include, at 3730, receiving a request from the mobile entity requesting a change of service to an adjacent cell. For example, a serving base station may receive the request while the mobile entity is in a connected state. The additional operations 3735 may include, at 3732, selecting an adjacent cell to provide wireless service to the mobile entity, using mapping information such as provided by a mapping data element, in response to the request. For example, the base station may weigh the availability of a desired MBMS service in selecting a target for transferring service to, in addition to conventional quality criteria. The additional operations 3735 may further include, at 3734, facilitating a transfer to the selected adjacent cell.

Referring to FIG. 37F, the method may include additional operations 3745 pertaining to the fourth alternative embodiment, for using a TMGI group identity to provide service mapping information to mobile entities. The additional operations 3745 may include, at 3740, determining, independently of MBSFN areas, sets of service identifiers for the MBMS services to be broadcast in the WCS area, each set indicating a group of MBMS services to be transmitted on a respective one of the adjacent cells. The set of service identifiers may be a TMGI group. Transmitting the data element 3702 of the method 3700 may be performed, at 3742, by providing the sets of service identifiers to the mobile entity using a service announcement procedure. The additional operations 3745 may include, at 3744, providing one or more of the sets of service identifiers for one or more of the adjacent cells to a base station servicing the mobile entity. In an alternative, transmitting the data element from the base station to the mobile entity 3702 of the method 3700 may be performed, at 3744, by providing information mapping each of the one or more sets of service identifiers to a respective one of the adjacent cells.

Referring to FIG. 37G, the method may include additional operations 3755 pertaining to the fifth alternative embodiment, for using a count-based hash mechanism to provide service mapping information to mobile entities. The additional operations 3755 may include, at 3750, advertising a count of adjacent cells that carry respective ones of the MBMS services. The additional operations 3755 may include, at 3752, hashing information mapping at least one of the service identifiers to a corresponding one of the adjacent cells, using a hash function operating on input parameters including the count of adjacent cells to provide the data element as a hashed output. The additional operations 3755 may include, at 3754, hashing the information using a service identifier as an additional one of the input parameters, to provide the hashed output from which at least one of the adjacent cells used for transmitting the service identifier can be determined by the mobile entity.

With reference to FIG. 3800, there is provided an exemplary apparatus 3800 that may be configured as BM-SC in a wireless network, or as a processor or similar device for use within the BM-SC, for facilitating discovery of MBMS over multiple adjacent cells from a network entity of WCS. The apparatus 3800 may include functional blocks that can represent functions implemented by a processor, software, or combination thereof (e.g., firmware).

As illustrated, in one embodiment, the apparatus 3800 may include an electrical component or module 3802 for transmitting a data element configured for a mobile entity within a WCS area, the data element including service identifiers mapped to corresponding cell identifiers to indicate respective MBMS services to be broadcast in the WCS area on adjacent cells that are identified by respective ones or more of the cell identifiers. For example, the electrical component 3802 may include at least one control processor coupled to a network interface or the like and to a memory with instructions for providing the service identifiers mapped to cell identifiers. The electrical component 3802 may be, or may include, a means for transmitting a data element configured for a mobile entity within a WCS area, the data element including service identifiers mapped to corresponding cell identifiers to indicate respective MBMS services to be broadcast in the WCS area on adjacent cells that are identified by respective ones or more of the cell identifiers. Said means may be or may include the at least one control processor operating an algorithm. The algorithm may include, for example, preparing a data element including service identifiers mapped to corresponding cell identifiers to indicate respective MBMS services to be broadcast in the WCS area on adjacent cells that are identified by respective ones or more of the cell identifiers, encoding the data element in a wireless signal, and transmitting the wireless signal using a transmitter component.

Figure 38:
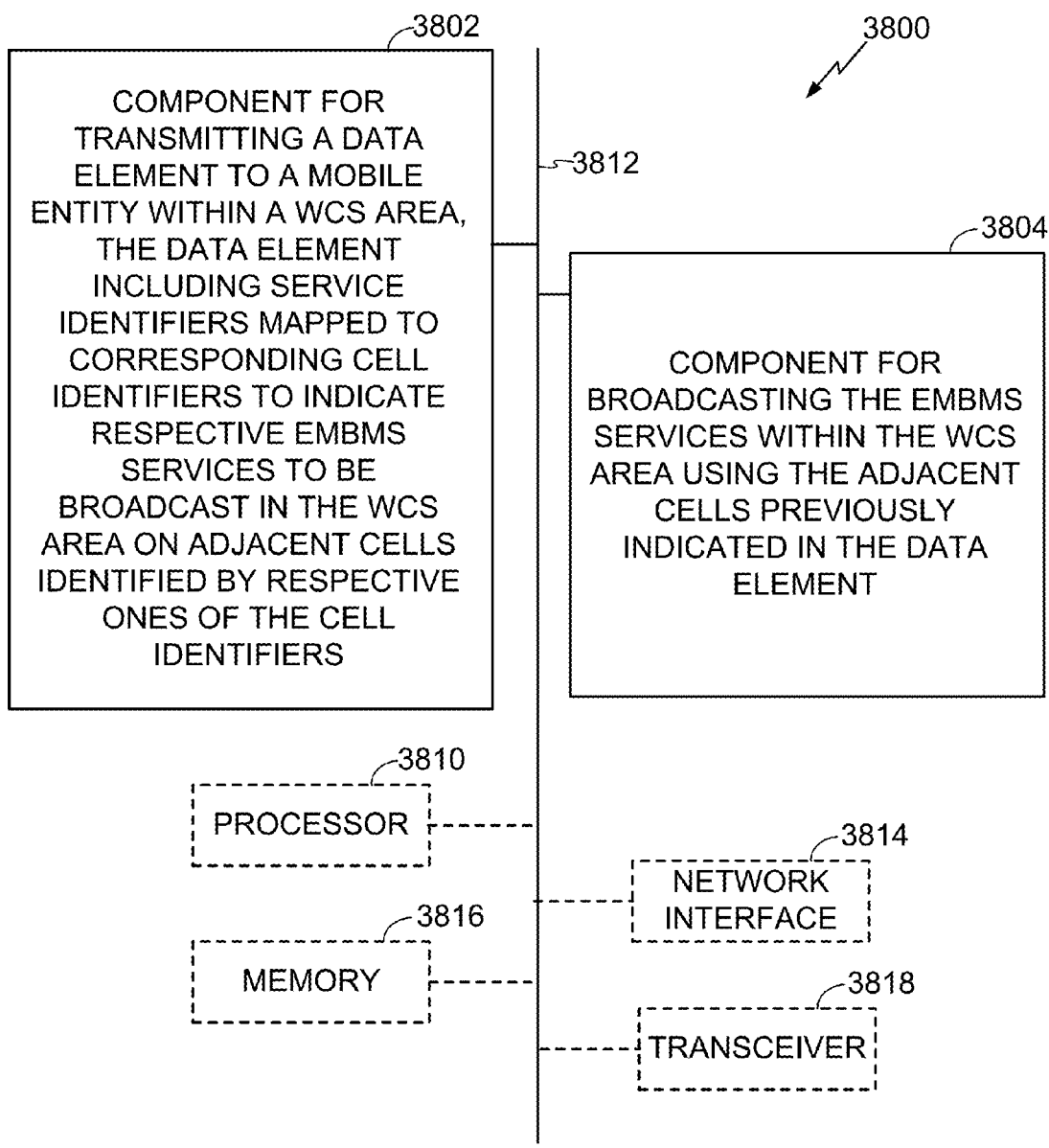
FIG. 38 illustrates an example of an apparatus for implementing the methodologies of FIGS. 37A-G.

The apparatus 3800 may include an electrical component 3804 for broadcasting the MBMS services within the WCS area using the adjacent cells previously indicated in the data element. For example, the electrical component 3804 may include at least one control processor coupled to a memory holding instructions for causing the MBMS services to be broadcast according to the mapped information. The electrical component 3804 may be, or may include, a means for broadcasting the MBMS services within the WCS area using the adjacent cells previously indicated in the data element. Said means may be or may include the at least one control processor operating an algorithm. The algorithm may include, for example, the adjacent cells receiving MBMS content from a multicast network entity, and broadcasting the MBMS content using transmitter components at each adjacent cell. The apparatus 3800 may include similar electrical components for performing any or all of the additional operations 3705, 3715, 3725, 3735, 3745, or 3755 described in connection with FIGS. 37B-G, which for illustrative simplicity are not shown in FIG. 38.

In related aspects, the apparatus 3800 may optionally include a processor component 3810 having at least one processor, in the case of the apparatus 3800 configured as a network entity. The processor 3810, in such case, may be in operative communication with the components 3802-3804 or similar components via a bus 3812 or similar communication coupling. The processor 3810 may effect initiation and scheduling of the processes or functions performed by electrical components 3802-3804.

In further related aspects, the apparatus 3800 may include a network interface component 3814 for communicating with other network entities, and a transceiver 3818 for wirelessly transmitting and receiving data. A stand alone receiver and/or stand alone transmitter may be used in lieu of or in conjunction with the transceiver 3818. The apparatus 3800 may optionally include a component for storing information, such as, for example, a memory device/component 3816. The computer readable medium or the memory component 3816 may be operatively coupled to the other components of the apparatus 3800 via the bus 3812 or the like. The memory component 3816 may be adapted to store computer readable instructions and data for performing the activity of the components 3802-3804, and subcomponents thereof, or the processor 3810, the additional operations 3705, 3715, 3725, 3735, 3745, or 3755, or the methods disclosed herein. The memory component 3816 may retain instructions for executing functions associated with the components 3802-3804. While shown as being external to the memory 3816, it is to be understood that the components 3802-3804 can exist within the memory 3816.

Mobile Device

A mobile device may be configured to use information mapping service identifiers to adjacent cell identifiers to access a broadcast transmission. Accordingly, FIG. 39A illustrates a method 3900 that may be performed by a mobile device of a wireless communications system, for discovering an MBMS service, encompassing at least the alternative embodiments 1-2 and 4-5 discussed above. The MBMS may be broadcast so that multiple mobile devices may receive it. The broadcast protocol may be downlink only, such that any mobile device receiving the broadcast transmission does not provide feedback to the BM-SC. The method 3900 shown in FIG. 39A may include, at 3902, receiving a data element from a network entity within a WCS area, the data element including service identifiers mapped to one or more cell identifiers to indicate respective MBMS services to be broadcast in the WCS area on one or more corresponding adjacent cells that are identified by respective ones or more of the cell identifiers. As noted previously, an adjacent cell may refer to any one or all of a frequency, carrier component, or base station/cell. As such, a "cell identifier" may include one or more of an identifier for a frequency, carrier component, or neighbor cell. Services to be broadcast may include services currently being broadcast, services not yet being broadcast, or both. The method 3900 may further include, at 3904, discovering at least one of the MBMS services broadcast within the WCS area on a corresponding one of adjacent cells, using the data element. For example, the mobile entity may request a transfer to an adjacent cell selected using the mapped information. In addition, the mobile entity may determine whether or not its current cell provides or will provide an MBMS service of interest.

Additional operations 3905, 3915, 3925, 3935, 3945, and 3955 for discovery of MBMS are illustrated in FIGS. 39B-G, for performance by the mobile entity or entities. One or more of these operations 3905, 3915, 3925, 3935, 3945, or 3955 may optionally be performed as part of method 3900. The elements 3905, 3915, 3925, 3935, 3945, or 3955 may be performed in any operative order, or may be encompassed by a development algorithm without requiring a particular chronological order of performance. Operations illustrated in each figure are independently performed and not mutually exclusive. Therefore any one of such operations may be performed regardless of whether another downstream or upstream operation is performed. For example, if the method 3900 includes at least one of the operations 3905, then the method 3900 may terminate after the at least one operation, without necessarily having to include any subsequent downstream operation(s) that may be illustrated. Each of the operations 3905, 3915, 3925, 3935, 3945, and 3955 may pertain to a different one of the embodiments described above, although certain operations, for example the operations 3935 illustrated in FIG. 39E, pertain generally to all embodiments.

Referring to FIG. 39B, the method may include additional operations 3905 pertaining to the first or second alternative embodiments. The additional operations 3905 may include, at 3906, receiving a service area index indicating MBMS service areas supported by a serving base station. For example, the operations 3905 may further include, at 3908, receiving the data element by receiving the service area index in MBMS user services session description metadata together with its associated unique service identifier. The service area index may be in a hashed or compressed form, which the UE may process to recover the index information. The operations 3905 may further include, at 3910, determining a cell identifier for a desired one of the MBMS services, using the service area index, wherein the data element also includes the service area index. The operations 3905 may further include, at 3912, receiving a second service area index indicating MBMS service areas supported by a neighboring base station. As noted, the network may prepare and provide service area indices for base stations (cells) not currently serving the mobile entity. The mobile entity may use these additional indices to request transfer to a neighbor cell providing a desired broadcast service.

Referring to FIG. 39C, the method may include additional operations 3915 pertaining to the first or second alternative embodiments. The additional operations 3915 may include, at 3914, receiving the service area index included in the data element with a service guide, wherein the service guide includes a unique service identifier for each MBMS service in the MBMS service areas, and the data element associates each unique service identifier with a service area index for a corresponding one of the MBMS service areas. The additional operations 3915 may include, at 3916, receiving the data element comprising the service area index in description metadata for an MBMS user services session, together with its associated unique service identifier.

In an alternative pertaining to the second embodiment, the additional operations 3915 may include, at 3918, receiving from a network entity an MBSFNAreaID/MBMS service area map that maps MBSFN area identifiers to the MBMS service areas. Furthermore, the additional operations 3915 may include, at 3920, determining a cell identifier for a desired one of the MBMS services, using the MBSFNAreaID/MBMS service area map with information mapping the MBSFN area identifiers to base station identifiers received from a base station.

Figures 39D, 39E:
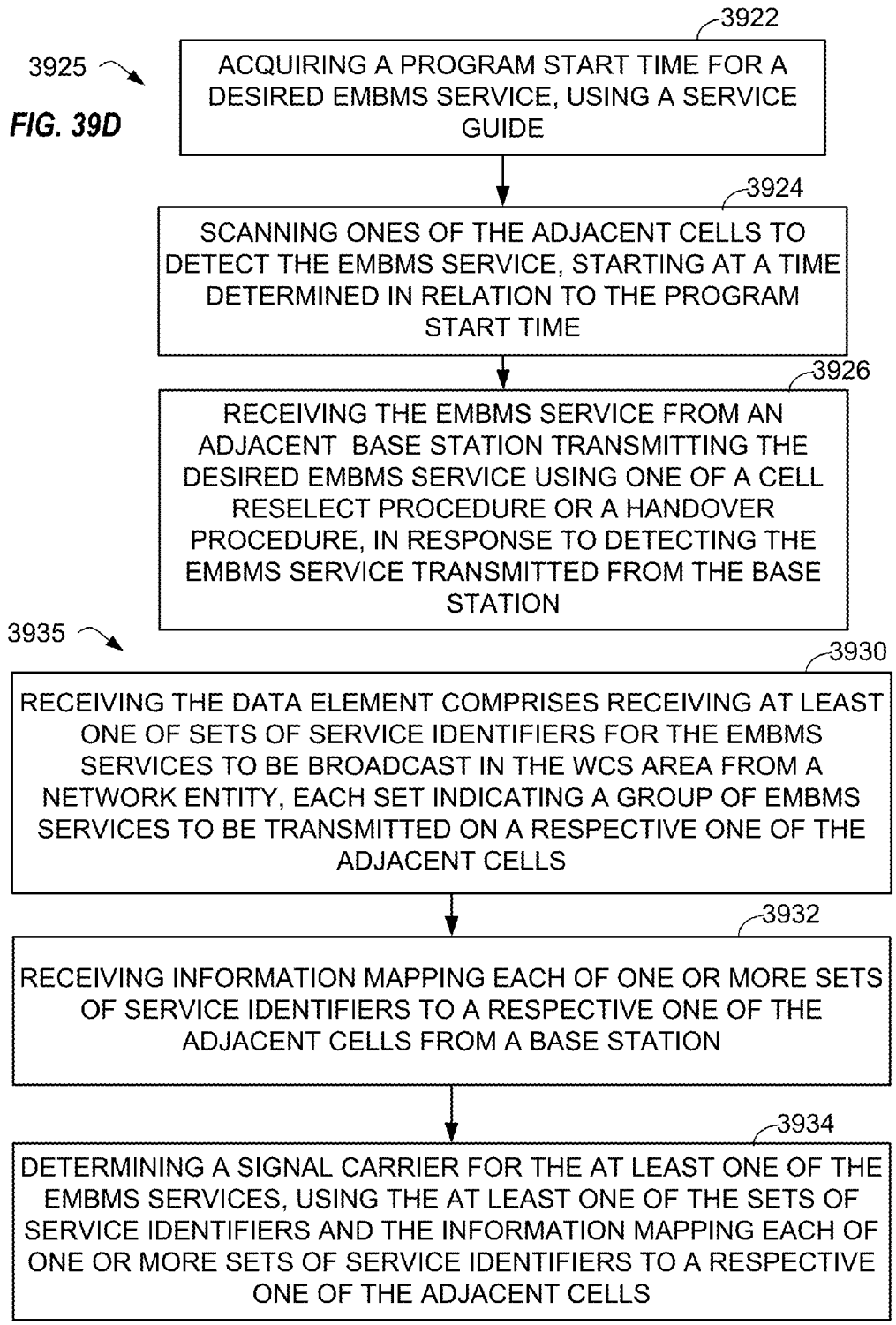

Referring to FIG. 39D, the method may include additional operations 3925 pertaining to the third alternative embodiment, for discovering a broadcast service. These operations 3925 may be performed in conjunction with, or independently of, method 3900 or similar methods. The additional operations 3925 may include, at 3922, acquiring a program start time for a desired MBMS service, using a service guide. The additional operations 3925 may include, at 3924, scanning ones of the adjacent cells to detect the MBMS service, starting at a time determined in relation to the program start time. The additional operations 3925 may include, at 3926, receiving the MBMS service from an adjacent base station transmitting the desired MBMS service using one of a cell reselect procedure or a handover procedure, in response to detecting the MBMS service transmitted from the base station.

Referring to FIG. 39E, the method may include additional operations 3935 pertaining to the fourth alternative embodiment, for using a TMGI group identity to obtain service mapping information. The additional operations 3935 may include, at 3930, receiving the data element including at least one of sets of service identifiers for the MBMS services to be broadcast in the WCS area from a network entity, each set indicating a group of MBMS services to be transmitted on a respective one of the adjacent cells. The set of service identifiers may be a TMGI group. The additional operations 3935 may include, at 3932, receiving the data element by receiving information mapping each of one or more sets of service identifiers to a respective one of the adjacent cells from a base station. The additional operations 3935 may include, at 3934, determining a adjacent cell for the at least one of the MBMS services, using the at least one of the sets of service identifiers and the information mapping each of one or more sets of service identifiers to a respective one of the adjacent cells.

Figure 39F:
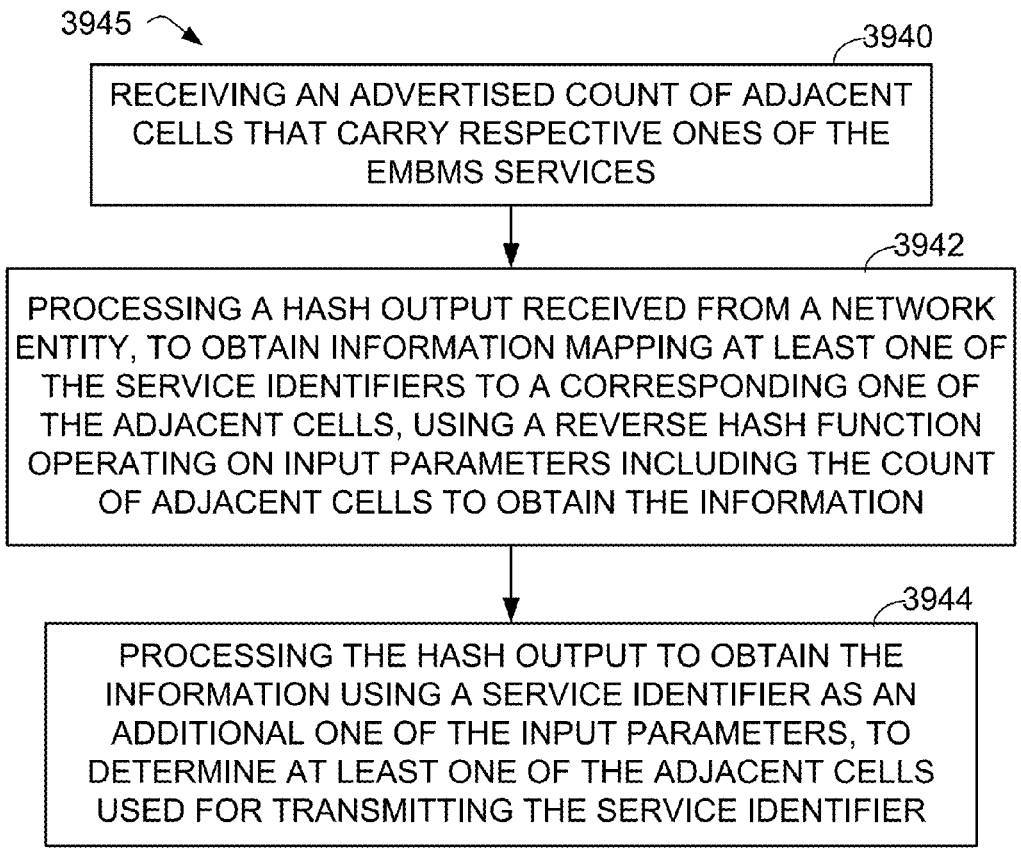

Referring to FIG. 39F, the method may include additional operations 3945 pertaining to the fifth alternative embodiment, for using a count-based hash mechanism to obtain service mapping information. The additional operations 3945 may include, at 3940, receiving an advertised count of adjacent cells that carry respective ones of the MBMS services. The additional operations 3945 may include, at 3942, processing a hash output received from a network entity, to obtain information mapping at least one of the service identifiers to a corresponding one of the adjacent cells, using a reverse hash function operating on input parameters including the count of adjacent cells to obtain the information. The additional operations 3945 may include, at 3944, processing the hash output to obtain the information using a service identifier as an additional one of the input parameters, to determine at least one of the adjacent cells used for transmitting the service identifier.

Figure 39G:
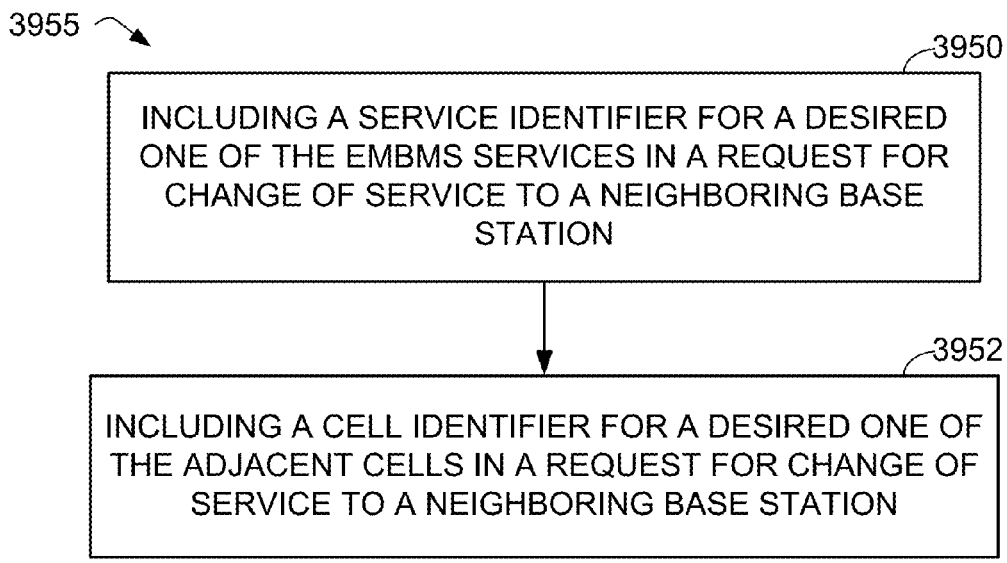

Referring to FIG. 39G, the method may include additional operations 3955 pertaining to all embodiments, for using MBMS service information in a transfer of service to a neighbor base station. These operations 3955 represent an application of mapping information made available to a mobile entity using a method 3900 or similar method, and may be performed in conjunction with, or independently of, such methods. The additional operations 3955 may include, at 3950, including a service identifier for a desired one of the MBMS services in a request for change of service to a neighboring base station. For example, the mobile entity may generate the request while the mobile entity is in an idle state or in a connected state. The additional operations 3955 may include, at 3952, including a cell identifier for a desired one of the adjacent cells in a request for change of service to a neighboring base station. Generally, the mobile entity may include a cell identifier, a broadcast service identifier, or both, in a request for transfer of service to a neighbor cell.

Figure 40:
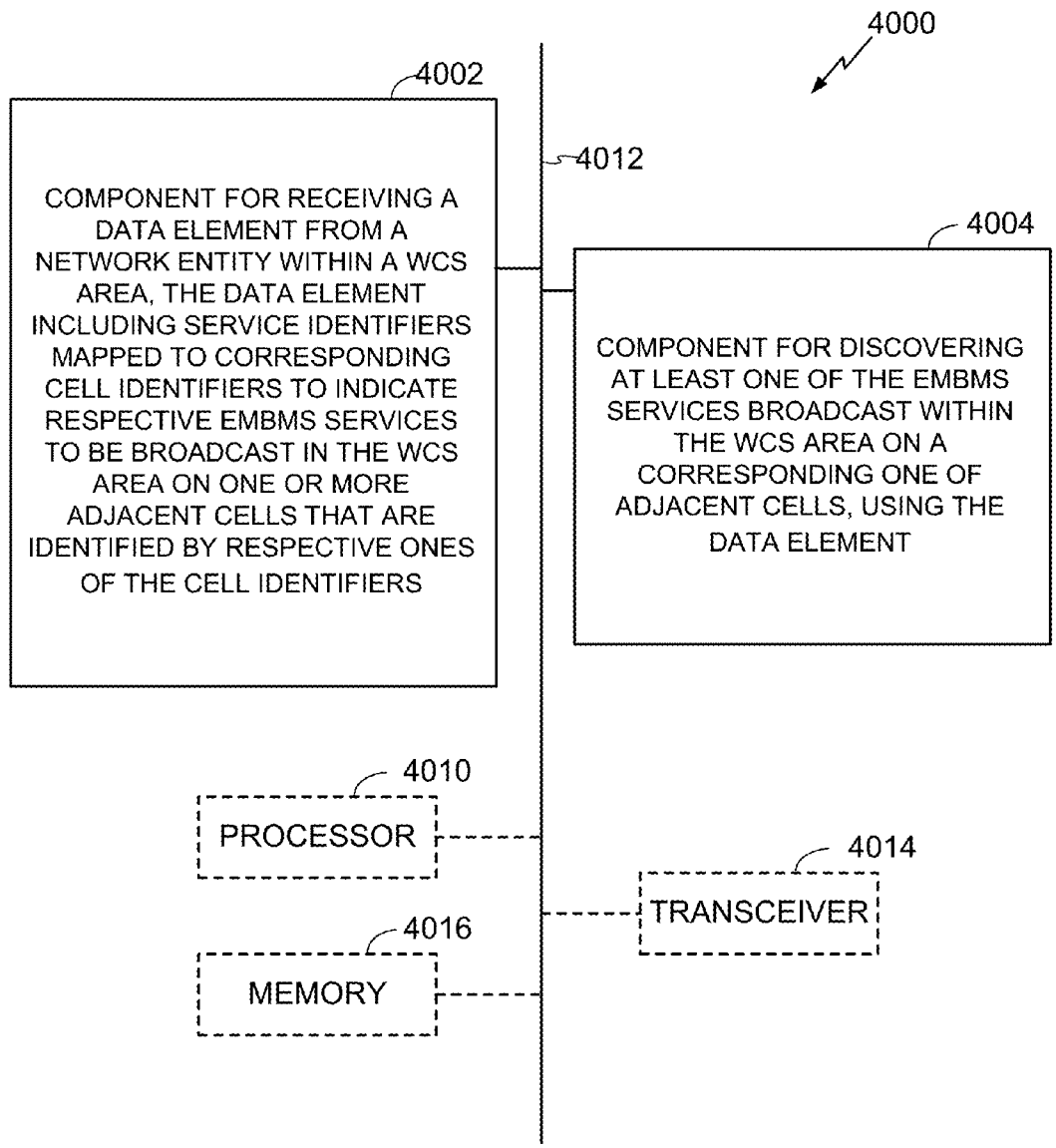
FIG. 40 illustrates an example of an apparatus for implementing the methodologies of FIGS. 39A-G.

With reference to FIG. 40, there is provided an exemplary apparatus 4000 that may be configured as a mobile device in a wireless network, or as a processor or similar device for use within the mobile device, for discovering a broadcast service. The apparatus 4000 may include functional blocks that can represent functions implemented by a processor, software, or combination thereof (e.g., firmware).

As illustrated, in one embodiment, the apparatus 4000 may include an electrical component or module 4002 for receiving a data element from a network entity within a WCS area, the data element including service identifiers mapped to one or more cell identifiers to indicate respective MBMS services to be broadcast in the WCS area on one or more corresponding adjacent cells that are identified by a respective one or more of the cell identifier. For example, the electrical component 4002 may include at least one control processor coupled to a transceiver or the like and to a memory with instructions for receiving and using the data element. The electrical component 4002 may be, or may include, a means for receiving a data element from a network entity within a WCS area, the data element including service identifiers mapped to one or more cell identifiers to indicate respective MBMS services to be broadcast in the WCS area on one or more corresponding adjacent cells that are identified by a respective one or more of the cell identifier. Said means may be or may include the at least one control processor operating an algorithm. The algorithm may include, for example, receiving a wireless signal, decoding the wireless signal to obtain decoded data, and processing the decoded data to identify the data element including service identifiers mapped to one or more cell identifiers to indicate respective MBMS services to be broadcast in the WCS area on one or more corresponding adjacent cells that are identified by a respective one or more of the cell identifier.

The apparatus 4000 may further include an electrical component 4004 for discovering at least one of the MBMS services broadcast within the WCS area on a corresponding one of adjacent cells, using the data element. For example, the electrical component 4004 may include at least one control processor coupled to a transceiver or the like and to a memory holding instructions for determining a cell in which a desired broadcast service is available, or determining whether or not specified services are available in a current cell, using the map information included in the data element. The electrical component 4004 may be, or may include, a means for discovering at least one of the MBMS services broadcast within the WCS area on a corresponding one of adjacent cells, using the data element. Said means may be or may include the at least one control processor operating an algorithm. The algorithm may include, for example, receiving user input indicating an MBMS service of interest, looking up the service of interest to determine one or more adjacent cells providing the service and times at which each service will be broadcast on the respective adjacent cells, selecting at least one of the adjacent cells, receiving a wireless signal from the selected adjacent cell starting at a time determined from the data element, and obtaining MBMS content of interest from the wireless signal. The apparatus 4000 may include similar electrical components for performing any or all of the additional operations 3905, 3915, 3925, 3935, 3945, or 3955 described in connection with FIGS. 39B-G, which for illustrative simplicity are not shown in FIG. 40.

In related aspects, the apparatus 4000 may optionally include a processor component 4010 having at least one processor, in the case of the apparatus 4000 configured as a mobile entity. The processor 4010, in such case, may be in operative communication with the components 4002-4004 or similar components via a bus 4012 or similar communication coupling. The processor 4010 may effect initiation and scheduling of the processes or functions performed by electrical components 4002-4004.

In further related aspects, the apparatus 4000 may include a radio transceiver component 4014. A stand alone receiver and/or stand alone transmitter may be used in lieu of or in conjunction with the transceiver 4014. The apparatus 4000 may optionally include a component for storing information, such as, for example, a memory device/component 4016. The computer readable medium or the memory component 4016 may be operatively coupled to the other components of the apparatus 4000 via the bus 4012 or the like. The memory component 4016 may be adapted to store computer readable instructions and data for performing the activity of the components 4002-4004, and subcomponents thereof, or the processor 4010, the additional operations 3905, 3915, 3925, 3935, 3945, or 3955, or the methods disclosed herein for a mobile device. The memory component 4016 may retain instructions for executing functions associated with the components 4002-4004. While shown as being external to the memory 4016, it is to be understood that the components 4002-4004 can exist within the memory 4016.

\* \* \*

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes both computer storage media and temporary memory media that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where "disks" usually refers to media that encode data magnetically, while "discs" usually refers to media that encodes data optically. Combinations of the above should also be included within the scope of non-transitory computer-readable media.

The previous description of the disclosure is provided to enable any person skilled in the art to make or use the disclosure. Various modifications to the disclosure such as are readily apparent to those skilled in the art, and the generic principles described herein may be applied to such variations without departing from the spirit or scope of the disclosure. Thus, the disclosure is not intended to be limited to the examples and designs described herein but should be accorded the widest scope consistent with the principles and novel features disclosed herein.

What is claimed is:

1. A method for managing transfer of Multimedia Broadcast/Multicast Services (MBMS) over a Single Frequency Network (MBSFN) service and idle mode unicast service for a mobile entity, the method comprising:
    identifying candidate target base stations based on each having paging signal strength and system information signal strength sufficient to support camping on by the mobile entity in idle mode;
    prioritizing the candidate target base stations in a priority order based in part on an MBMS status of the mobile entity and on MBMS services support by respective ones of the candidate target base stations;
    based on determining that none of the candidate target base stations currently supports the MBSFN service for the mobile entity, selecting a target base station that does not currently support the MBSFN service for the mobile entity; and
    transmitting an identifier for use in transferring the MBSFN service and unicast service to the target base station that does not currently support the MBSFN service for the mobile entity.

2. The method of claim 1, further comprising:
    transmitting buffered MBMS content from a source base station to the target base station for unicast transmission to the mobile entity.

3. The method of claim 2, further comprising:
    stopping transmission of the buffered MBMS content to the target base station based on a signal indicating the target base station is receiving MBMS content from another source.

4. The method of claim 1, further comprising:
    scheduling MBMS content for unicast transmission to the mobile entity.

5. The method of claim 4, further comprising:
    handing the unicast transmission of the MBMS content over to the target base station.

6. An apparatus for managing transfer of Multimedia Broadcast/Multicast Services (MBMS) over a Single Frequency Network (MBSFN) service and idle mode unicast service for a mobile entity, the apparatus comprising:
    means for identifying candidate target base stations based on each having paging signal strength and system information signal strength sufficient to support camping on by the mobile entity in idle mode;
    means for prioritizing the candidate target base stations in a priority order based in part on an MBMS status of the mobile entity and on MBMS services support by respective ones of the candidate target base stations;
    means for, based on determining that none of the candidate target base stations currently supports the MBSFN service for the mobile entity, selecting a target base station that does not currently support the MBSFN service for the mobile entity; and
    means for transmitting an identifier for use in transferring the MBSFN service and unicast service to the target base station that does not currently support the MBSFN service for the mobile entity.

7. An apparatus managing transfer of Multimedia Broadcast/Multicast Services (MBMS) over a Single Frequency Network (MBSFN) service and idle mode unicast service for a mobile entity comprising:
    at least one processor configured to:
        identify candidate target base stations based on each having paging signal strength and system information signal strength sufficient to support camping on by the mobile entity in idle mode,
        prioritize the candidate target base stations in a priority order based in part on an MBMS status of the mobile entity and on MBMS services support by respective ones of the candidate target base stations,
        select, based on determining that none of the candidate target base stations currently supports the MBSFN service for the mobile entity, a target base station that does not currently support the MBSFN service for the mobile entity, and
        transmit an identifier for use in transferring the MBSFN service and unicast service to the target base station that does not currently support the MBSFN service for the mobile entity; and
    a memory, coupled to the at least one processor, to store data.

8. The apparatus of claim 7, wherein the at least one processor is further configured to:
    transmit buffered MBMS content from a source base station to the target base station for unicast transmission to the mobile entity.

9. A non-transitory computer-readable medium for managing transfer of Multimedia Broadcast/Multicast Services (MBMS) over a Single Frequency Network (MBSFN) service and idle mode unicast service for a mobile entity, the non-transitory computer readable medium comprising:
one or more instructions that, when executed by at least one processor, cause the at least one processor to:
identify candidate target base stations based on each having paging signal strength and system information signal strength sufficient to support camping on by the mobile entity in idle mode,
prioritize the candidate target base stations in a priority order based in part on an MBMS status of the mobile entity and on MBMS services support by respective ones of the candidate target base stations,
select, based on determining that none of the candidate target base stations currently supports the MBSFN service for the mobile entity, a target base station that does not currently support the MBSFN service for the mobile entity, and
transmit an identifier for use in transferring the MBSFN service and unicast service to the target base station that does not currently support the MBSFN service for the mobile entity.

10. A method for handling, by a mobile entity, transfer of Multimedia Broadcast/Multicast Services (MBMS) over a Single Frequency Network (MBSFN) service and unicast service from a source base station to a target base station of a cellular wireless communications system, the method comprising:
receiving a signal, from the source base station, designating the target base station;
completing a handover to the target base station;
receiving MBMS content, from the target base station, in a unicast transmission for an initial period;
receiving the MBMS content, from the target base station, in unicast transmissions after the initial period when the target base station does not support the MBSFN service for the mobile entity, wherein the MBMS content is received by the target base station, from a network node, when the target base station does not support the MBSFN service for the mobile entity; and
receiving the MBMS content, from the target base station, in a multicast transmission after the initial period when the target base station supports the MBSFN service for the mobile entity.

11. The method of claim 10, further comprising:
receiving the MBMS content in multicast transmissions, from the source base station, prior to completing the handover.

12. The method of claim 10, further comprising:
receiving the MBMS content in unicast transmissions, from the source base station, prior to completing the handover.

13. The method of claim 12,
wherein the target base station supports the MBSFN service for the mobile entity, and wherein the method further comprises:
acquiring Multicast Control Channel (MCCH) signals, from the target base station, for decoding the MBMS content on MBSFN subframes.

14. The method of claim 13, further comprising:
decoding the MBMS content using information from the acquired MCCH signals.

15. An apparatus for handling transfer of Multimedia Broadcast/Multicast Services (MBMS) over a Single Frequency Network (MBSFN) service and unicast service from a source base station to a target base station of a cellular wireless communications system, the apparatus comprising:
means for receiving a signal, from the source base station, designating the target base station;
means for completing a handover to the target base station;
means for receiving MBMS content, from the target base station, in a unicast transmission for an initial period;
means for receiving the MBMS content, from the target base station, in unicast transmissions after the initial period when the target base station does not support the MBSFN service for a mobile entity, wherein the MBMS content is received by the target base station, from a network node, when the target base station does not support the MBSFN service for the mobile entity; and
means for receiving the MBMS content, from the target base station, in a multicast transmission after the initial period when the target base station supports the MBSFN service for the mobile entity.

16. An apparatus for handling transfer of Multimedia Broadcast/Multicast Services (MBMS) over a Single Frequency Network (MBSFN) service and unicast service from a source base station to a target base station, comprising:
at least one processor configured to:
receive a signal, from the source base station, designating the target base station,
complete a handover to the target base station,
receive MBMS content, from the target base station, in a unicast transmission for an initial period,
receive the MBMS content, from the target base station, in unicast transmissions after the initial period when the target base station does not support the MBSFN service for a mobile entity, wherein the MBMS content is received by the target base station, from a network node, when the target base station does not support the MBSFN service for the mobile entity, and
receive the MBMS content, from the target base station, in a multicast transmission after the initial period when the target base station supports the MBSFN service for the mobile entity; and
a memory, coupled to the at least one processor, to store data.

17. The apparatus of claim 16, wherein the at least one processor is further configured to:
receive the MBMS content in multicast transmissions, from the source base station, prior to completing the handover.

18. The apparatus of claim 16, wherein the at least one processor is further configured to:
receive the MBMS content in unicast transmissions, from the source base station, prior to completing the handover.

19. The apparatus of claim 18, wherein the at least one processor is further configured to:
acquire Multicast Control Channel (MCCH) signals, from the target base station, for decoding the MBMS content on MBSFN subframes.

20. A non-transitory computer-readable medium for handling transfer of Multimedia Broadcast/Multicast Services (MBMS) over a Single Frequency Network (MBSFN) service and unicast service at a mobile entity from a source base station to a target base station, the non-transitory computer readable medium comprising:
one or more instructions that, when executed by at least one processor, cause the at least one processor to:
receive a signal, from the source base station, designating the target base station, complete a handover to the target base station, receive MBMS content, from the target base station, in a unicast transmission for an initial period, receive the MBMS content, from the target base station, in unicast transmissions after the initial period when the target base station does not support the MBSFN service for the mobile entity, wherein the MBMS content is received by the target base station, from a network node, when the target base station does not support the MBSFN service for the mobile entity, and receive the MBMS content, from the target base station, in a multicast transmission after the initial period when the target base station supports the MBSFN service for the mobile entity.

* * * * *